(12) United States Patent
Chang et al.

(10) Patent No.: US 10,444,474 B2
(45) Date of Patent: *Oct. 15, 2019

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Chien-Hsun Lai, Taichung (TW); Nai-Yuan Tang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,136

(22) Filed: Mar. 20, 2018

(65) Prior Publication Data
US 2019/0033558 A1  Jan. 31, 2019

(30) Foreign Application Priority Data
Jul. 27, 2017 (TW) .............................. 106125352 A

(51) Int. Cl.
| | |
|---|---|
| *G02B 9/64* | (2006.01) |
| *G02B 27/00* | (2006.01) |
| *H04N 5/232* | (2006.01) |
| *G02B 7/04* | (2006.01) |
| *G02B 13/00* | (2006.01) |
| *G02B 13/04* | (2006.01) |
| *G02B 13/14* | (2006.01) |

(52) U.S. Cl.
CPC ........... *G02B 13/0045* (2013.01); *G02B 7/04* (2013.01); *G02B 9/64* (2013.01); *G02B 13/008* (2013.01); *G02B 13/04* (2013.01); *G02B 13/146* (2013.01); *H04N 5/23212* (2013.01)

(58) Field of Classification Search
CPC .................. G02B 3/04; G02B 9/00–64; G02B 13/002–0045; G02B 13/18
USPC ................. 359/676–695, 708–718, 745–795
See application file for complete search history.

(56) References Cited

U.S. PATENT DOCUMENTS

| | | | |
|---|---|---|---|
| 9,995,910 B1* | 6/2018 | Hudyma | G02B 9/64 |
| 2017/0192200 A1* | 7/2017 | Hsieh | G02B 13/04 |
| 2017/0293110 A1* | 10/2017 | Kim | B60R 11/04 |
| 2018/0039049 A1* | 2/2018 | Lee | G02B 13/0045 |
| 2018/0180844 A1* | 6/2018 | Fu | G02B 1/041 |
| 2018/0239117 A1* | 8/2018 | Lee | G02B 13/06 |

\* cited by examiner

*Primary Examiner* — Nicholas R. Pasko
(74) *Attorney, Agent, or Firm* — Muncy, Geissler, Olds & Lowe, P.C.

(57) ABSTRACT

The invention discloses an eight-piece optical lens for capturing image and an eight-piece optical module for capturing image. In order from an object side to an image side, the optical lens along the optical axis comprises a first lens with refractive power; a second lens with refractive power; a third lens with refractive power; a fourth lens with refractive power; a fifth lens with refractive power; a sixth lens with refractive power; a seventh lens with refractive power; and an eighth lens with refractive power; and at least one of the image side and object side of each of the eight lenses can be aspheric. The optical lens can increase aperture value and improve the imagining quality for use in compact cameras.

20 Claims, 30 Drawing Sheets

OPTICAL IMAGE CAPTURING SYSTEM

CROSS-REFERENCE TO RELATED APPLICATION

This application claims priority from Taiwan Patent Application No. 106125352, filed on Jul. 27, 2017, in the Taiwan Intellectual Property Office, the disclosure of which is hereby incorporated by reference in its entirety for all purposes.

BACKGROUND OF THE INVENTION

1. Field of the Invention

The present invention relates to an optical image capturing system, and more particularly is about a minimized optical image capturing system which can be applied to electronic products.

2. Description of the Related Art

In recent years, as the popularization of portable electronic devices with camera functionalities, it has elevated the demand for optical system. The photosensitive element of ordinary optical system is commonly selected from charge coupled device (CCD) or complementary metal-oxide semiconductor sensor (CMOS Sensor). Besides, as the advancement in semiconductor devices manufacturing technology, the pixel size of the photosensitive element is gradually minimized, and the optical systems make a development about the high pixel field by degrees. Therefore, the demand of the quality of the image is daily increased.

Conventional optical systems of portable electronic devices usually adopt six lenses or seven lenses structure as main structure. However, since the pixel of the portable electronic devices continuously raises, and more end-users are demanding for cameras having large aperture, which is equipped with functionalities such as low light mode or night mode. The conventional optical image capturing systems may not be sufficient to meet those advanced photography requirements.

Therefore, it is an important issue about how to effectively increase the amount of light admitted into the optical image capturing system and further elevate the image quality thereof.

SUMMARY OF THE INVENTION

The aspect of embodiment of the present invention directs to an optical image capturing system and an optical image capturing lens which use combination of refractive powers, convex surfaces and concave surfaces of eight lenses (the convex surface or concave surface in the present invention is the description of the change of geometrical shape of an object side or an image side of each lens at different heights from an optical axis in principle) to further increase the amount of light admitted into the optical image capturing system, and to improve quality of image formation, so as to be applied to minimized electronic products.

In addition, when it comes to the certain application field of optical image formation, there will be a need to conduct the image formation with respect to light sources having the visible light wavelength and the infrared light wavelength, and an example of this kind of application is the IP video surveillance camera, which is equipped with the Day & Night function. The main reason is that the visible light spectrum for human vision is in the wavelength range from 400 to 700 nm, but the image formed on the camera sensor includes infrared light, which is invisible to human eyes. Therefore, based on the circumstances, an IR cut filter removable (ICR) is placed in front of the camera lens of the IP video surveillance camera in order to increase the "fidelity" of the image, which can not only prevent the infrared light and color shift at the daytime, but also allow the infrared light coming into the camera lens at night to elevate luminance. Nevertheless, the ICR elements occupy a significant amount of space and are expensive, which impede to the design and manufacture of miniaturized surveillance cameras in the future.

The type of embodiment of the present disclosure simultaneously directs to an optical image capturing system and an optical image capturing lens, which utilize the refractive power of eight lenses, combination of convex and concave surfaces as well as the selection of materials thereof, so as to make the image capturing system reduce the difference between the image focal length of visible light and the image focal length of infrared light, that is, to achieve the near effect of "confocal" without the ICR elements.

The Lens Parameters Related to the Magnification Rate of the Optical Image Capturing System and the Optical Image Capturing Lens The optical image capturing system and the optical image capturing camera lens may be designed for the application of the biometric characteristics identification, for example, facial recognition. When the embodiment of the present invention is configured to capture image for facial recognition, the infrared light may be selected as the operation wavelength. At the same time a face of about 15 centimeters (cm) wide at a distance of 25-30 cm, at least 30 horizontal pixels can be formed in the horizontal direction of an photosensitive element (pixel size of 1.4 micrometers ($\mu$m)). The linear magnification of the infrared light of the image plane is LM, which meets the following conditions: LM=(30 horizontal pixels)*(1.4 $\mu$m, pixel size)/(15 cm, width of the photographed object); LM$\geq$0.0003. When the visible light is adopted as the operation wavelength, for a face of about 15 cm wide at a distance of 25-30 cm, at least 50 horizontal pixels can be formed in the horizontal direction of a photosensitive element (pixel size of 1.4 micrometers (m)).

The terms together with their numerals for the lens parameters related to the embodiment of the present disclosure are provided in the following paragraphs for reference to subsequent descriptions:

Regarding the visible light spectrum, the present disclosure may select the wavelength of 555 nm as the primary reference wavelength and the basis for the measurement of focus shift; and regarding the infrared light spectrum (700-1000 nm), the present disclosure may select the wavelength of 850 nm as the primary reference wavelength and the basis for the measurement of focus shift.

The optical image capturing system may have a first image plane and a second image plane. The first image plane which is perpendicular to the optical axis is an image plane specifically for visible light, and the through focus modulation transfer rate (value of MTF) at the first spatial frequency has a maximum value at the central field of view of the first image plane; and the second image plane which is perpendicular to the optical axis is an image plane specifically for infrared light, and the through focus modulation transfer rate (value of MTF) at the first spatial frequency has a maximum value at the central of field of view of the second image plane. The optical image capturing system may further have a first average image plane and a second average image plane. The first average image plane which is perpendicular to the optical axis is an image plane specifically for visible light. And the first average image plane is disposed at the average position of the defocusing positions, where the values of MTF of the visible light at the central field of view, 0.3 field of view, and the 0.7 field of view of the optical image capturing system are at their respective maximum at the first spatial frequency. The second average image plane which is perpendicular to the optical axis is an image plane specifically for infrared light. The second average image plane is disposed at the average position of the defocusing positions, where the values of MTF of the infrared light at the central field of view, 0.3 field of view, and the 0.7 field of view of the optical image capturing system are at their respective maximum at the first spatial frequency.

The aforementioned first spatial frequency is set to be an half spatial frequency (half frequency) of the image sensing device (sensor) used in the present disclosure. For example, for an image sensing device including the pixel size of 1.12 m or less, the quarter spatial frequency, half spatial frequency (half frequency) and full spatial frequency (full frequency) in the characteristic diagram of modulation transfer function thereof are at least 110 cycles/mm, 220 cycles/mm and 440 cycles/mm, respectively. Lights at any field of view may be further divided into the sagittal ray and the tangential ray.

The focus shifts, where the through focus MTF values of the visible sagittal ray at central field of view, 0.3 field of view, and 0.7 field of view of the optical image capturing system are at their respective maxima, are respectively expressed as VSFS0, VSFS3, and VSFS7 (unit of measurement: mm). The maximum values of the through focus MTF of the visible sagittal ray at central field of view, 0.3 field of view, and 0.7 field of view are respectively expressed as VSMTF0, VSMTF3, and VSMTF7. The focus shifts, where the through focus MTF values of the visible tangential ray at central field of view, 0.3 field of view, and 0.7 field of view of the optical image capturing system are at their respective maxima, are respectively expressed as VTFS0, VTFS3, and VTFS7 (unit of measurement: mm). The maximum values of the through focus MTF of the visible tangential ray at the central field of view, 0.3 field of view, and 0.7 field of view are respectively expressed as VTMTF0, VTMTF3, and VTMTF7. The average focus shift (position) of both the aforementioned focus shifts of the visible sagittal ray at three fields of view and focus shifts of the visible tangential ray at three fields of view is expressed as AVFS (unit of measurement: mm), which meets the absolute value |(VSFS0+VSFS3+VSFS7+VTFS0+VTFS3+VTFS7)/6|.

The focus shifts, where the through focus MTF values of the infrared sagittal ray at central field of view, 0.3 field of view, and 0.7 field of view of the optical image capturing system are at their respective maxima, are respectively expressed as ISFS0, ISFS3, and ISFS7. The average focus shift (position) of the aforementioned focus shifts of the infrared sagittal ray at three fields of view is expressed as AISFS (unit of measurement: mm). The maximum values of the through focus MTF of the infrared sagittal ray at central field of view, 0.3 field of view, and 0.7 field of view are respectively expressed as ISMTF0, ISMTF3, and ISMTF7. The focus shifts, where the through focus MTF values of the infrared tangential ray at central field of view, 0.3 field of view, and 0.7 field of view of the optical image capturing system are at their respective maxima, are respectively expressed as ITFS0, ITFS3, and ITFS7 (unit of measurement: mm). The average focus shift (position) of the afore-mentioned focus shifts of the infrared tangential ray at three fields of view is expressed as AITFS (unit of measurement: mm). The maximum values of the through focus MTF of the infrared tangential ray at central field of view, 0.3 field of view, and 0.7 field of view are respectively expressed as ITMTF0, ITMTF3, and ITMTF7. The average focus shift (position) of both of the aforementioned focus shifts of the infrared sagittal ray at the three fields of view and focus shifts of the infrared tangential ray at the three fields of view is expressed as AIFS (unit of measurement: mm), which meets the absolute value of |(ISFS0+ISFS3+ISFS7+ITFS0+ITFS3+ITFS7)/6|.

The focus shift between the focal points of the visible light and the focal points of the infrared light at their central fields of view (RGB/IR) of the entire optical image capturing system (i.e. wavelength of 850 nm versus wavelength of 555 nm, unit of measurement: mm) is expressed as FS, which meets the absolute value |(VSFS0+VTFS0)/2−(ISFS0+ITFS0)/2|. The difference (focus shift) between the average focus shift of the visible light at the three fields of view and the average focus shift of the infrared light at the three fields of view (RGB/IR) of the entire optical image capturing system is expressed as AFS (i.e. wavelength of 850 nm versus wavelength of 555 nm, unit of measurement: mm), which meets the absolute value of |AIFS−AVFS|.

The Lens Parameter Related to the Length or the Height

The maximum image height of the optical image capturing system is expressed as HOI. The height of the optical image capturing system is expressed as HOS. The distance from the object side of the first lens of the optical image capturing system to the image side of the eighth lens of the optical image capturing system is expressed as InTL. The distance from a fixed aperture (stop) of the optical image capturing system to the first image plane of the optical image capturing system is expressed as InS. The distance from the first lens of the optical image capturing system to the second lens of the optical image capturing system is expressed as In12 (example). The thickness of the first lens of the optical image capturing system on the optical axis is expressed as TP1 (example).

The Lens Parameter Related to the Material

A coefficient of dispersion of the first lens in the optical image capturing system is expressed as NA1 (example); a refractive index of the first lens is expressed as Nd1 (example).

The Lens Parameter Related to Angle of View

An angle of view is expressed as AF. A half angle of view is expressed as HAF. An angle of a chief ray is expressed as MRA.

The Lens Parameter Related to the Exit/Entrance Pupil

An entrance pupil diameter of the optical image capturing system is expressed as HEP. The maximum effective half diameter (EHD) of any surface of a single lens refers to a perpendicular height between the optical axis and an intersection point, where the incident ray at the maximum angle of view passing through the most marginal entrance pupil intersects with the surface of the lens. For example, the maximum effective half diameter of the object side of the first lens is expressed as EHD11. The maximum effective half diameter of the image side of the first lens is expressed as EHD 12. The maximum effective half diameter of the object side of the second lens is expressed as EHD21. The maximum effective half diameter of the image side of the second lens is expressed as EHD22. The maximum effective half diameters of any surfaces of other lens in the optical image capturing system are expressed in the similar way.

The Lens Parameter Related to the Surface Depth of the Lens

The distance paralleling the optical axis, which is measured from the intersection point where the object side of the eighth lens crosses the optical axis to the terminal point of the maximum effective half diameter of the object side of the eighth lens is expressed as InRS81 (depth of the EHD). The distance paralleling the optical axis, which is measured from the intersection point where the image side of the eighth lens crosses the optical axis to the terminal point of the maximum effective half diameter of the image side of the eighth lens is expressed as InRS82 (depth of the EHD). The depths of the EHD (sinkage values) on the object side or the image side of other lens are expressed in similar way.

The Lens Parameter Related to the Shape of the Lens

The critical point C is a point which is tangential to the tangential plane and perpendicular to the optical axis on the specific surface of the lens except that an intersection point which crosses the optical axis on the specific surface of the lens. In addition to the description above, for example, the perpendicular distance between the critical point C51 on the object side of the fifth lens and the optical axis is HVT51 (example). The perpendicular distance between a critical point C52 on the image side of the fifth lens and the optical axis is HVT52 (example). The perpendicular distance between the critical point C61 on the object side of the sixth lens and the optical axis is HVT61 (example). The perpendicular distance between a critical point C62 on the image side of the sixth lens and the optical axis is HVT62 (example). The perpendicular distances between the critical point on the image side or object side of other lens such as the eighth lens and the optical axis are expressed in similar way.

The inflection point on the object side of the eighth lens that is nearest to the optical axis is expressed as IF811, and the sinkage value of that inflection point IF811 is expressed as SGI811 (example). That is, the sinkage value SGI811 is a horizontal distance paralleling the optical axis, which is measured from the intersection point where the object side of the eighth lens crosses the optical axis to the inflection point nearest to the optical axis on the object side of the eighth lens. The perpendicular distance between the inflection point IF811 and the optical axis is HIF811 (example). The inflection point on the image side of the eighth lens that is nearest to the optical axis is expressed as IF821, and the sinkage value of the inflection point IF821 is expressed as SGI821 (example). That is, the sinkage value SGI821 is a horizontal distance paralleling the optical axis, which is measured from the intersection point where the image side of the eighth lens crosses the optical axis to the inflection point nearest to the optical axis on the image side of the eighth lens. The perpendicular distance between the inflection point IF821 and the optical axis is HIF821 (example).

The inflection point on object side of the eighth lens that is second nearest to the optical axis is expressed as IF812, and the sinkage value of the inflection point IF812 is expressed as SGI812 (example). That is, the sinkage value SGI812 is a horizontal distance paralleling the optical axis, which is measured from the intersection point where the object side of the eighth lens crosses the optical axis to the inflection point second nearest to the optical axis on the object side of the eighth lens. The perpendicular distance between the inflection point IF812 and the optical axis is HIF812 (example). The inflection point on the image side of the eighth lens that is second nearest to the optical axis is expressed as IF822, and the sinkage value of that inflection point IF822 is expressed as SGI822 (example). That is, the sinkage value SGI822 is a horizontal distance paralleling the optical axis, which is measured from the intersection point where the image side of the eighth lens crosses the optical axis to the inflection point second nearest to the optical axis on the image side of the eighth lens. The perpendicular distance between the inflection point IF822 and the optical axis is HIF822 (example).

The inflection point on the object side of the eighth lens that is third nearest to the optical axis is expressed as IF813, and the sinkage value of the inflection point IF813 is expressed as SGI813 (example). That is, the sinkage value SGI813 is a horizontal distance paralleling the optical axis, which is measured from the intersection point where the object side of the eighth lens crosses the optical axis to the inflection point third nearest to the optical axis on the object side of the eighth lens. The perpendicular distance between the inflection point IF813 and the optical axis is HIF813 (example). The inflection point on the image side of the eighth lens that is third nearest to the optical axis is expressed as IF823, and the sinkage value of the inflection point IF823 is expressed as SGI823 (example). That is, the sinkage value SGI823 is a horizontal distance paralleling the optical axis, which is measured from the intersection point where the image side of the eighth lens crosses the optical axis to the inflection point third nearest to the optical axis on the image side of the eighth lens. The perpendicular distance between the inflection point IF823 and the optical axis is HIF823 (example).

The inflection point on the object side of the eighth lens that is fourth nearest to the optical axis is expressed as IF814, and the sinkage value of the inflection point IF814 is expressed as SGI814 (example). That is, the sinkage value SGI814 is a horizontal distance paralleling the optical axis, which is measured from the intersection point where the object side of the eighth lens crosses the optical axis to the inflection point fourth nearest to the optical axis on the object side of the eighth lens. The perpendicular distance between the inflection point IF814 and the optical axis is HIF814 (example). The inflection point on the image side of the eighth lens that is fourth nearest to the optical axis is expressed as IF824, and the sinkage value of the inflection point IF824 is expressed as SGI824 (example). That is, the sinkage value SGI824 is a horizontal distance paralleling the optical axis, which is measured from the intersection point where the image side of the eighth lens crosses the optical axis to the inflection point fourth nearest to the optical axis on the image side of the eighth lens. The perpendicular distance between the inflection point IF824 and the optical axis is HIF824 (example).

The inflection points on the object side or the image side of the other lens and the perpendicular distances between the foregoing inflection points and the optical axis, or the sinkage values of the foregoing inflection points are expressed in the similar way.

The Lens Parameter Related to the Aberration

Optical distortion for image formation in the optical image capturing system is expressed as ODT. TV distortion for image formation in the optical image capturing system is expressed as TDT. Furthermore, the degree of aberration offset can be further described within the limited range of 50% to 100% field of view of the image formation. The offset of the spherical aberration is expressed as DFS. The offset of the coma aberration is expressed as DFC.

The characteristic diagram of modulation transfer function of the optical image capturing system is used for testing and evaluating the contrast ratio and the sharpness ratio of the image. The vertical coordinate axis of the characteristic diagram of modulation transfer function indicates a contrast transfer rate (values are from 0 to 1). The horizontal coordinate axis indicates a spatial frequency (cycles/mm; lp/mm; line pairs per mm). Theoretically, an ideal image capturing system can 100% show the line contrast of a photographed object. However, the values of the contrast transfer rate at the vertical coordinate axis are smaller than 1 in the actual optical image capturing system. In addition, the edge region of the image is generally more difficult to achieve a fine degree of recovery than the central region of the image. The contrast transfer rates (MTF values) with the spatial frequency of 55 cycles/mm at the optical axis, 0.3 field of view and 0.7 field of view of visible light spectrum on the first image plane are respectively expressed as MTFE0, MTFE3 and MTFE7. The contrast transfer rates (MTF values) with the spatial frequency of 110 cycles/mm at the optical axis, 0.3 field of view and 0.7 field of view of visible light spectrum on the first image plane are respectively expressed as MTFQ0, MTFQ3 and MTFQ7. The contrast transfer rates (MTF values) with the spatial frequency of 220 cycles/mm at the optical axis, 0.3 field of view and 0.7 field of view of visible light spectrum on the first image plane are respectively expressed as MTFH0, MTFH3 and MTFH7. The contrast transfer rates (MTF values) with spatial frequency of 440 cycles/mm at the optical axis, 0.3 field of view and 0.7 field of view of visible light spectrum on the first image plane are respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device which pixel size is below and equal to 1.12 micrometers, the quarter spatial frequency, the half spatial frequency (half frequency) and the full spatial frequency (full frequency) of the characteristic diagram of modulation transfer function are respectively at least 110 cycles/mm, 220 cycles/mm and 440 cycles/mm.

If an optical image capturing system needs to satisfy with the images of infrared light spectrum and visible light spectrum simultaneously, such as the requirement for night vision with lower light source, the used wavelength may be 850 nm or 800 nm. Because the main function is to recognize shape of an object formed in black-and-white environment, the high resolution is unnecessary and the spatial frequency which is less than 110 cycles/mm may be selected to evaluate the performance of the specific optical image capturing system on the infrared light spectrum. When the foregoing wavelength 850 nm focuses on the second image plane, the contrast transfer rates (MTF values) with the spatial frequency of 55 cycles/mm where the images are at the optical axis, 0.3 field of view and 0.7 field of view are respectively expressed as MTFI0, MTFI3 and MTFI7. However, because the difference between the infrared wavelength of 850 nm or 800 nm and the general visible light wavelength is large, the optical image capturing system which not only has to focus with respect to the visible light and the infrared light (dual-mode) but also achieves a certain performance on the visible light and the infrared light respectively has a significant difficulty in design.

The present invention provides the optical image capturing system, which is capable of focusing with respect to the visible light and the infrared light (dual-mode) simultaneously and achieving certain performance on the visible light and the infrared light respectively. The object side or the image side of the eighth lens of the optical image capturing system may be provided with the inflection point which can adjust each angle of view incident on the sixth lens and conduct amendment for the optical distortion and TV distortion. Besides, the surface of the eighth lens can be provided with the function of the preferable adjustment about the optical path so as to elevate the image quality.

An optical image capturing system is provided in accordance with the present invention, from an object side to an image side, comprising: a first lens, a second lens, a third lens, a fourth lens, a fifth lens, a sixth lens, a seventh lens, an eighth lens, a first image plane and a second image plane. The first image plane is an image plane specifically for visible light and perpendicular to an optical axis, and a through focus modulation transfer rate (MTF) at central field of view of the first image plane has a maximum value at a first spatial frequency; and the second image plane is an image plane specifically for infrared light and perpendicular to the optical axis, and a through focus modulation transfer rate (MTF) at central field of view of the second image plane has a maximum value at the first spatial frequency. All of the eight lenses have refractive power. Focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from the object side of the first lens to the first image plane is denoted as HOS. A half maximum angle of view of the optical image capturing system is denoted as HAF. The optical image capturing system has a maximum image height HOI perpendicular to the optical axis on the first image plane. The distance on the optical axis between the first image plane and the second image plane is denoted as FS. The thicknesses of the first lens to the eighth lens at height of ½ HEP and in parallel with the optical axis are denoted as ETP1, ETP2, ETP3, ETP4, ETP5, ETP6, ETP7 and ETP8 respectively. The sum of the ETP1 to the ETP8 described above is SETP. The thicknesses of the first lens to the eighth lens on the optical axis are TP1, TP2, TP3, TP4, TP5, TP6, TP7 and TP8 respectively. The sum of the TP1 to the TP8 described above is STP. Conditions as follows are satisfied: $1.0 \leq f/HEP \leq 10.0$, $0 \deg < HAF \leq 150 \deg$, $0.5 \leq SETP/STP < 1$ and $|FS| \leq 100 \ \mu m$.

Another optical image capturing system is provided in accordance with the present invention, from an object side to an image side, comprising: a first lens, a second lens, a third lens, a fourth lens, a fifth lens, a sixth lens, a seventh lens, an eighth lens, a first image plane and a second image plane. The first image plane is an image plane specifically for visible light and perpendicular to an optical axis, and a through focus modulation transfer rate (MTF) at central field of view of the first image plane has a maximum value at a first spatial frequency; and the second image plane is an image plane specifically for infrared light and perpendicular to the optical axis, and a through focus modulation transfer rate (MTF) at central field of view of the second image plane has a maximum value at the first spatial frequency. The first lens has refractive power. The second lens has refractive power. The third lens has refractive power. The fourth lens has refractive power. The fifth lens has refractive power. The sixth lens has refractive power. The seventh lens has refractive power. The eighth lens has refractive power. There is at least one lens made of plastic among the first lens to the eighth lens. The optical image capturing system has a maximum image height HOI perpendicular to the optical axis on the first image plane. There is at least one lens having positive refractive power among the first lens to the eighth lens. The focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from the object side of the first lens to the first image plane is denoted as HOS. A half maximum angle of view of the optical image capturing system is denoted as HAF. The optical image capturing system has a maximum image height HOI perpendicular to the optical axis on the first image plane. The distance on the optical axis between the first image plane and the second image plane is denoted as FS. The horizontal distance in parallel with the optical axis from a coordinate point at ½ HEP height on the object side of the first lens to the first image plane is denoted as ETL. The horizontal distance in parallel with the optical axis from a coordinate point at ½ HEP height on the object side of the first lens to a coordinate point at ½ HEP height on the image side of the eighth lens is denoted as EIN. Conditions as follows are satisfied: 1.0≤f/HEP≤10.0, 0 deg<HAF≤150 deg, 0.2≤EIN/ETL<1, and |FS|100 μm.

Yet another optical image capturing system is further provided in accordance with the present invention, from an object side to an image side, comprising: a first lens, a second lens, a third lens, a fourth lens, a fifth lens, a sixth lens, a seventh lens, an eighth lens, a first average image plane and a second average image plane. The first average image plane is an image plane specifically for visible light and perpendicular to the optical axis, and configured at an average position of the through focus positions where through focus modulation transfer rates (values of MTF) of the visible light at central field of view, 0.3 field of view and 0.7 field of view of the optical image capturing system have their respective maximums at a first spatial frequency; and the second average image plane is an image plane specifically for infrared light and perpendicular to the optical axis, and configured at the average position of the through focus positions, where through focus modulation transfer rates (values of MTF) of the infrared light at central field of view, 0.3 field of view and 0.7 field of view of the optical image capturing system have their respective maximums at the first spatial frequency. The optical image capturing system comprises eight lenses with refractive power. The optical image capturing system has a maximum image height HOI perpendicular to the optical axis on the first average image plane. The first lens has refractive power. The second lens has refractive power. The third lens has refractive power. The fo9er. The fifth lens has refractive power. The sixth lens has refractive power. The seventh lens has refractive power. The eighth lens has refractive power. At least one lens among the first lens to the eighth lens has positive refractive power. The focal lengths of the eight lenses are denoted as f1, f2, f3, f4, f5, f6, f7 and f8 respectively. The focal length of the optical image capturing system is denoted as f. The entrance pupil diameter of the optical image capturing system is denoted as HEP. The distance on the optical axis from an object side of the first lens to the first average image plane is denoted as HOS. A half maximum angle of view of the optical image capturing system is denoted as HAF. The optical image capturing system has a maximum image height HOI perpendicular to the optical axis on the first average image plane. The distance on the optical axis between the first average image plane and the second average image plane is denoted as AFS. The horizontal distance in parallel with the optical axis from a coordinate point at ½ HEP height on the object side of the first lens to the first image plane is denoted as ETL. The horizontal distance in parallel with the optical axis from a coordinate point at ½ HEP height on the object side of the first lens to a coordinate point at ½ HEP height on the image side of the eighth lens is denoted as EIN. Conditions as follows are satisfied: 1≤f/HEP≤10, 0 deg<HAF≤150 deg, 0.2≤EIN/ETL<1, and |AFS|≤100 μm.

A thickness of a single lens at a height of ½ entrance pupil diameter (HEP) particularly affects the corrected aberration on the common area of each field of view of light and the capability of correcting the optical path difference between each field of view of light in the scope of ½ entrance pupil diameter (HEP). The capability of aberration correction is enhanced if the thickness becomes greater, but the difficulty for manufacturing is also increased at the same time. Therefore, it is necessary to control the thickness of a single lens at height of ½ entrance pupil diameter (HEP), in particular to control the ratio relation (ETP/TP) between the thickness (ETP) of the lens at height of ½ entrance pupil diameter (HEP) and the thickness (TP) of the lens on the optical axis to which the surface belongs. For example, the thickness of the first lens at height of ½ entrance pupil diameter (HEP) is expressed as ETP1. The thickness of the second lens at height of ½ entrance pupil diameter (HEP) is expressed as ETP2. The thicknesses of other lens at a height of ½ entrance pupil diameter (HEP) are expressed in the similar way. A sum of ETP1 to ETP8 described above is SETP. The embodiments of the present invention may satisfy the following relation: 0.3≤SETP/EIN<1.

In order to balance the enhancement of the capability of aberration correction and the reduction of the difficulty in manufacturing at the same time, it is particularly necessary to control the proportional relationship (ETP/TP) between the thickness (ETP) of the lens at height of ½ entrance pupil diameter (HEP) and the thickness (TP) of the lens on the optical axis. For example, the thickness of the first lens at height of ½ entrance pupil diameter (HEP) is denoted as ETP1. The thickness of the first lens on the optical axis is denoted as TP1. Thus, the ratio between ETP1 and TP1 is ETP1/TP1. The thickness of the second lens at height of ½ entrance pupil diameter (HEP) is denoted as ETP2. The thickness of the second lens on the optical axis is denoted as TP2. Thus, the ratio between ETP2 and TP2 is ETP2/TP2. The proportional relationships between the thicknesses of other lenses in the optical image capturing system at height of ½ entrance pupil diameter (HEP) and the thicknesses (TP) of the lenses on the optical axis are denoted according to a similar pattern. The embodiments of the present disclosure may satisfy the following formula: 0.2≤ETP/TP≤5.

A horizontal distance between two adjacent lenses at height of ½ entrance pupil diameter (HEP) is denoted as ED. The horizontal distance (ED) described above is parallel with the optical axis of the optical image capturing system and particularly affects the corrected aberration on the common area of each field of view of light and the capability of correcting the optical path difference between each field of view of light at the position of ½ entrance pupil diameter (HEP). The capability of aberration correction may be enhanced if the horizontal distance becomes greater, but the difficulty in manufacturing the lenses is also increased and the degree of 'minimization' to the length of the optical image capturing system is also restricted at the same time. Thus, it is essential to control the horizontal distance (ED) between two specific adjacent lenses at height of ½ entrance pupil diameter (HEP).

In order to balance the enhancement of the capability of aberration correction and the reduction of the difficulty for "minimization" to the length of the optical image capturing system at the same time, it is particularly necessary to control the proportional relationship (ED/IN) of the horizontal distance (ED) between the two adjacent lenses at height of ½ entrance pupil diameter (HEP) to the horizontal distance (IN) between the two adjacent lenses on the optical axis. For example, the horizontal distance between the first lens and the second lens at height of ½ entrance pupil diameter (HEP) is denoted as ED12. The horizontal distance between the first lens and the second lens on the optical axis is denoted as IN12. The ratio between ED12 and IN12 is ED12/IN12. The horizontal distance between the second lens and the third lens at height of ½ entrance pupil diameter (HEP) is denoted as ED23. The horizontal distance between the second lens and the third lens on the optical axis is denoted as IN23. The ratio between ED23 and IN23 is ED23/IN23. The proportional relationships of the horizontal distances between the other two adjacent lenses in the optical image capturing system at height of ½ entrance pupil diameter (HEP) to the horizontal distances between the two adjacent lenses on the optical axis are denoted according to a similar pattern.

The horizontal distance in parallel with the optical axis from a coordinate point at the height of ½ HEP on the image side of the eighth lens to the first image plane is denoted as EBL. The horizontal distance in parallel with the optical axis from the intersection point where the image side of the eighth lens crosses the optical axis to the first image plane is denoted as BL. In order to balance the enhancement of the capability of aberration correction and the reservation of accommodation space for other optical elements, the embodiment of the present disclosure may satisfy the following formula: $0.2 \leq EBL/BL < 1.5$. The optical image capturing system may further include a light filtering element, which is located between the seventh lens and the first image plane. A distance in parallel with the optical axis from a coordinate point at height of ½ HEP on the image side of the eighth lens to the light filtering element is denoted as EIR. A distance in parallel with the optical axis from an intersection point where the image side of the eighth lens crosses the optical axis to the light filtering element is denoted as PIR. The embodiments of the present disclosure may satisfy the following formula: $0.1 \leq EIR/PIR \leq 1.1$.

Besides, the eighth lens may have negative refractive power, and the image side of the eighth lens may be a concave surface. Hereby, this configuration is beneficial to shorten the back focal length of the optical image capturing system in order to keep the optical image capturing system minimized. Moreover, at least one surface of the eighth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
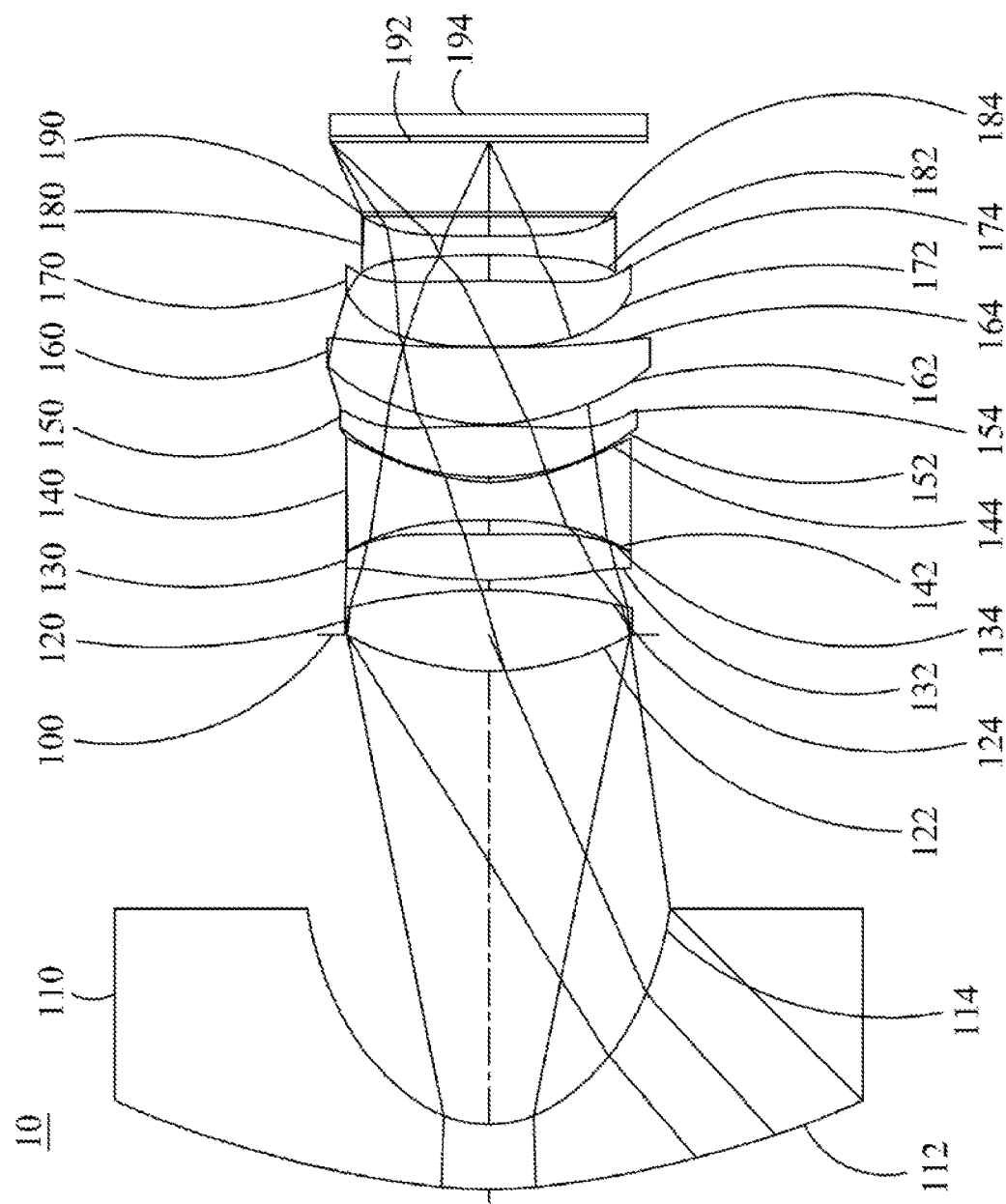
FIG. 1A is a schematic view of the optical image capturing system according to the first embodiment of the present invention.

An optical image capturing system, in the order from an object side to an image side, includes a first lens with refractive power, a second lens with refractive power, a third lens with refractive power, a fourth lens with refractive power, a fifth lens with refractive power, and a sixth lens with refractive power, a seventh lens with refractive power, the eighth lens with refractive power, a first image plane and a second image plane. The optical image capturing system may further include an image sensing element, which is disposed on a first image plane.

The optical image capturing system may use three sets of operation wavelengths, which are respectively 486.1 nm, 587.5 nm and 656.2 nm, and 587.5 nm is served as the primary reference wavelength and a reference wavelength to obtain technical features of the optical image capturing system. The optical image capturing system may also use five sets of wavelengths which are respectively 470 nm, 510 nm, 555 nm, 610 nm and 650 nm, and 555 nm is served as the primary reference wavelength and a reference wavelength to obtain technical features of the optical system.

The optical image capturing system may further include an image sensing device which is disposed on the first image plane. A half diagonal of an effective detection field of the image sensing device (imaging height or the maximum image height of the optical image capturing system) is HOI. The distance on the optical axis from the object side of the first lens to the first image plane is HOS. The following conditions are met: $0.5 \leq HOS/HOI \leq 30$ and $0.5 \leq HOS/f \leq 30$. Preferably, the following conditions may be satisfied: $1.2 \leq HOS/HOI \leq 10$ and $1 \leq HOS/f \leq 10$. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and this configuration is helpful to elevate the image quality.

In the optical image capturing system of the present invention, the aperture may be a front or middle aperture. Wherein, the front aperture is the aperture disposed between a photographed object and the first lens while the middle aperture is the aperture disposed between the first lens and the first image plane. In the case that the aperture is the front aperture, it can make the optical image capturing system generate a longer distance between the exit pupil and the first image plane thereof, such that the optical image capturing system can accommodate more optical elements and the efficiency of the image sensing device in receiving image can be increased; in the case that the aperture is the middle aperture, it is helpful to expand the angle of view of the optical image capturing system, such that the optical image capturing system has an advantage of the wide angle camera lens. The distance from the foregoing aperture to the first image plane is InS. The following condition are met: $0.2 \leq InS/HOS \leq 1.5$. Therefore, this configuration can keep the optical image capturing system miniaturization with the character of wide angle of view at the same time.

In the optical image capturing system of the present invention, the distance from the object side of the first lens to the image side of the eighth lens is InTL. The sum of thicknesses of all lenses with refractive power on the optical axis is $\Sigma TP$. The following condition are met: $0.1 \leq \Sigma TP/InTL \leq 0.9$. Therefore, this configuration can keep the contrast ratio of the optical image capturing system and the yield rate about manufacturing lens at the same time, and provide the proper back focal length to accommodate other elements.

The distance between the first lens and the second lens on the optical axis is IN12. The following condition is satisfied: $IN12/f \leq 5.0$. Hereby, this configuration is helpful to improve the chromatic aberration of the lenses in order to elevate their performance.

The distance between the seventh lens and the eighth lens on the optical axis is IN78. The following condition is satisfied: $IN78/f \leq 0.8$. Hereby, this configuration is helpful to improve the chromatic aberration of the lenses in order to elevate their performance.

The thicknesses of the first lens and the second lens on the optical axis are TP1 and TP2, respectively. The following condition is satisfied: $0.1 \leq (TP1+IN12)/TP2 \leq 10$. Therefore, this configuration is helpful to control the sensitivity of the optical image capturing system, and improve their performance.

The thicknesses of the seventh lens and the eighth lens on the optical axis are TP7 and TP8, respectively, and the distance between the seventh lens and the eighth lens on the optical axis is IN78. The following condition are met: $0.1 \leq (TP8+IN78)/TP7 \leq 10$. Therefore, this configuration is helpful to control the sensitivity of the optical image capturing system, and decrease the total height of the optical image capturing system.

The thicknesses of the third lens, fourth lens and fifth lens on the optical axis are TP3, TP4 and TP5, respectively. The distance between the third lens and the fourth lens on the optical axis is IN34. The distance between the fourth lens and the fifth lens on the optical axis is IN45. The distance between the object side of the first lens and the image side of the eighth lens is InTL. The following condition are met: 0.1≤TP4/(IN34+TP4+IN45)<1. Therefore, this configuration is helpful to slightly correct the aberration of the propagating process of the incident light layer by layer, and decrease the total height of the optical image capturing system.

In the optical image capturing system of the present invention, a perpendicular distance between a critical point C81 on the object side of the eighth lens and the optical axis is HVT81. A perpendicular distance between a critical point C82 on the image side of the eighth lens and the optical axis is HVT82. A horizontal distance on the optical axis from an intersection point where the object side of the eighth lens crosses the optical axis to the critical point C81 is SGC81. A horizontal distance on the optical axis from an intersection point where the image side of the eighth lens crosses the optical axis to the critical point C82 is SGC82. The following conditions can be satisfied: 0 mm≤HVT81≤3 mm; 0 mm<HVT82≤6 mm; 0≤HVT81/HVT82; 0 mm≤|SGC81|≤0.5 mm; 0 mm<|SGC82|≤2 mm, and 0<|SGC82|/(|SGC82|+TP8)≤0.9. Therefore, this configuration is helpful to correct the off-axis aberration effectively.

The optical image capturing system of the present invention meets the following condition: 0.2≤HVT82/HOI≤0.9. Preferably, the following condition can be satisfied: 0.3≤HVT82/HOI≤0.8. Therefore, this configuration is helpful to correct the aberration of surrounding field of view for the optical image capturing system.

The optical image capturing system of the present invention meets the following condition: 0≤HVT82/HOS≤0.5. Preferably, the following condition can be satisfied: 0.2≤HVT82/HOS≤0.45. Therefore, this configuration is helpful to correct the aberration of surrounding field of view for the optical image capturing system.

In the optical image capturing system of the present invention, the distance in parallel with the optical axis from an inflection point on the object side of the eighth lens that is nearest to the optical axis to an intersection point where the object side of the eighth lens crosses the optical axis is expressed as SGI811. The distance in parallel with the optical axis from an inflection point on the image side of the eighth lens that is nearest to the optical axis to an intersection point where the image side of the eighth lens crosses the optical axis is expressed as SGI821. The following conditions are satisfied: 0<SGI811/(SGI811+TP8)≤0.9 and 0<SGI821/(SGI821+TP8)≤0.9. Preferably, the following conditions may be met: 0.1≤SGI811/(SGI811+TP8)≤0.6 and 0.1≤SGI821/(SGI821+TP8)≤0.6.

The distance in parallel with the optical axis from an inflection point on the object side of the eighth lens that is second nearest to the optical axis to the intersection point where the object side of the eighth lens crosses the optical axis is expressed as SGI812. The distance in parallel with the optical axis from an inflection point on the image side of the eighth lens that is second nearest to the optical axis to the intersection point where the image side of the eighth lens crosses the optical axis is expressed as SGI822. The following conditions are satisfied: 0<SGI812/(SGI812+TP8)≤0.9 and 0<SGI822/(SGI822+TP8)≤0.9. Preferably, the following conditions may be satisfied: 0.1≤SGI812/(SGI812+TP8)≤0.6 and 0.1≤SGI822/(SGI822+TP8)≤0.6.

The perpendicular distance between the inflection point on the object side of the eighth lens that is the nearest to the optical axis and the optical axis is expressed as HIF811. The perpendicular distance between an intersection point where the image side of the eighth lens crosses the optical axis and the inflection point on the image side of the eighth lens that is the nearest to the optical axis is expressed as HIF821. The following conditions are met: 0.001 mm<|HIF811|≤7.5 mm and 0.001 mm≤|HIF821|≤7.5 mm. Preferably, the following conditions may be satisfied: 0.1 mm≤|HIF811|≤5 mm and 0.1 mm≤|HIF821|≤5 mm.

The perpendicular distance between an inflection point on the object side of the eighth lens that is second nearest to the optical axis and the optical axis is expressed as HIF812. The distance perpendicular to the optical axis between the intersection point where the image side of the eighth lens crosses the optical axis and an inflection point on the image side of the eighth lens that is second nearest to the optical axis is expressed as HIF822. The following conditions are satisfied: 0.001 mm≤|HIF812|≤7.5 mm and 0.001 mm≤|HIF822|≤7.5 mm. Preferably, the following conditions may be satisfied: 0.1 mm≤|HIF822|≤6 mm and 0.1 mm≤|HIF812|≤6 mm.

The perpendicular distance between an inflection point on the object side of the eighth lens that is third nearest to the optical axis and the optical axis is expressed as HIF813. The distance perpendicular to the optical axis between an intersection point where the image side of the eighth lens crosses the optical axis and an inflection point on the image side of the eighth lens that is third nearest to the optical axis is expressed as HIF823. The following conditions are satisfied: 0.001 mm≤|HIF813|≤7.5 mm and 0.001 mm≤|HIF823|≤7.5 mm. Preferably, the following conditions may be satisfied: 0.1 mm≤|HIF823|≤7 mm and 0.1 mm≤|HIF813|≤7 mm.

The perpendicular distance between the inflection point on the object side of the eighth lens that is fourth nearest to the optical axis and the optical axis is expressed as HIF814. The distance perpendicular to the optical axis between the intersection point where the image side of the eighth lens crosses the optical axis and an inflection point on the image side of the eighth lens that is fourth nearest to the optical axis is expressed as HIF824. The following conditions are satisfied: 0.001 mm≤|HIF814|≤7.5 mm and 0.001 mm≤|HIF824|≤7.5 mm. Preferably, the following conditions may be satisfied: 0.1 mm≤|HIF824|≤7.25 mm and 0.1 mm≤|HIF814|≤7.25 mm.

In one embodiment of the optical image capturing system of the present invention, it can be helpful to correct the chromatic aberration of the optical image capturing system by arranging the lens with high coefficient of dispersion and low coefficient of dispersion in an interlaced manner.

The Aspheric equation for the lens can be represented by:

$$z = ch^2/[1+[1-(k+1)c^2h^2]^{0.5}] + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + \quad (1),$$

wherein z is a position value of the position along the optical axis and at the height h which refers to the surface apex; k is the cone coefficient, c is the reciprocal of curvature radius, and A4, A6, A8, A10, A12, A14, A16, A18, and A20 are high order aspheric coefficients.

In the optical image capturing system provided by the present invention, the lens may be made of glass or plastic. If the lens is made of the plastic, it can reduce the cost of manufacturing as well as the weight of the lens effectively. If lens is made of glass, it can control the heat effect and increase the design space of the configuration of the lens with refractive powers in the optical image capturing system. Besides, the object side and the image side of the first lens through eighth lens may be aspheric, which can gain more control variables and even reduce the number of the used lens in contrast to traditional glass lens in addition to the use of reducing the aberration. Therefore, the total height of the optical image capturing system can be reduced effectively.

Furthermore, in the optical image capturing system provided by the present disclosure, when the surface of lens is a convex surface, the surface of that lens is basically a convex surface in the vicinity of the optical axis. When the surface of lens is a concave surface, the surface of that lens is basically a concave surface in the vicinity of the optical axis.

The optical image capturing system of the present invention can be applied to the optical image capturing system with automatic focus based on the demand and have the characters of the good aberration correction and the good quality of image. Thereby, the optical image capturing system can expand the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the photographing.

In the optical image capturing system of the present invention, at least one lens among the first lens, second lens, third lens, fourth lens, fifth lens, sixth lens, seventh lens and eighth lens may further be a light filtering element for light with wavelength of less than 500 nm based on the design requirements. The light filtering element may be achieved by coating film on at least one surface of that lens with certain filtering function, or forming that lens with material that can filter light with short wavelength.

The first image plane or the second image plane of the optical image capturing system of the present invention may be a plane or a curved surface based on the design requirement. When the first image plane or the second image plane is a curved surface (e.g. a spherical surface with curvature radius), it is helpful to decrease the required incident angle that make the rays focus on the first image plane or the second image plane. In addition to the aid in achieving the miniaturization of the length of the optical image capturing system (TTL), this configuration is helpful to elevate the relative illumination at the same time.

According to the foregoing implementation method, the specific embodiments with figures are presented in detail as below.

The First Embodiment

Figure 1B:
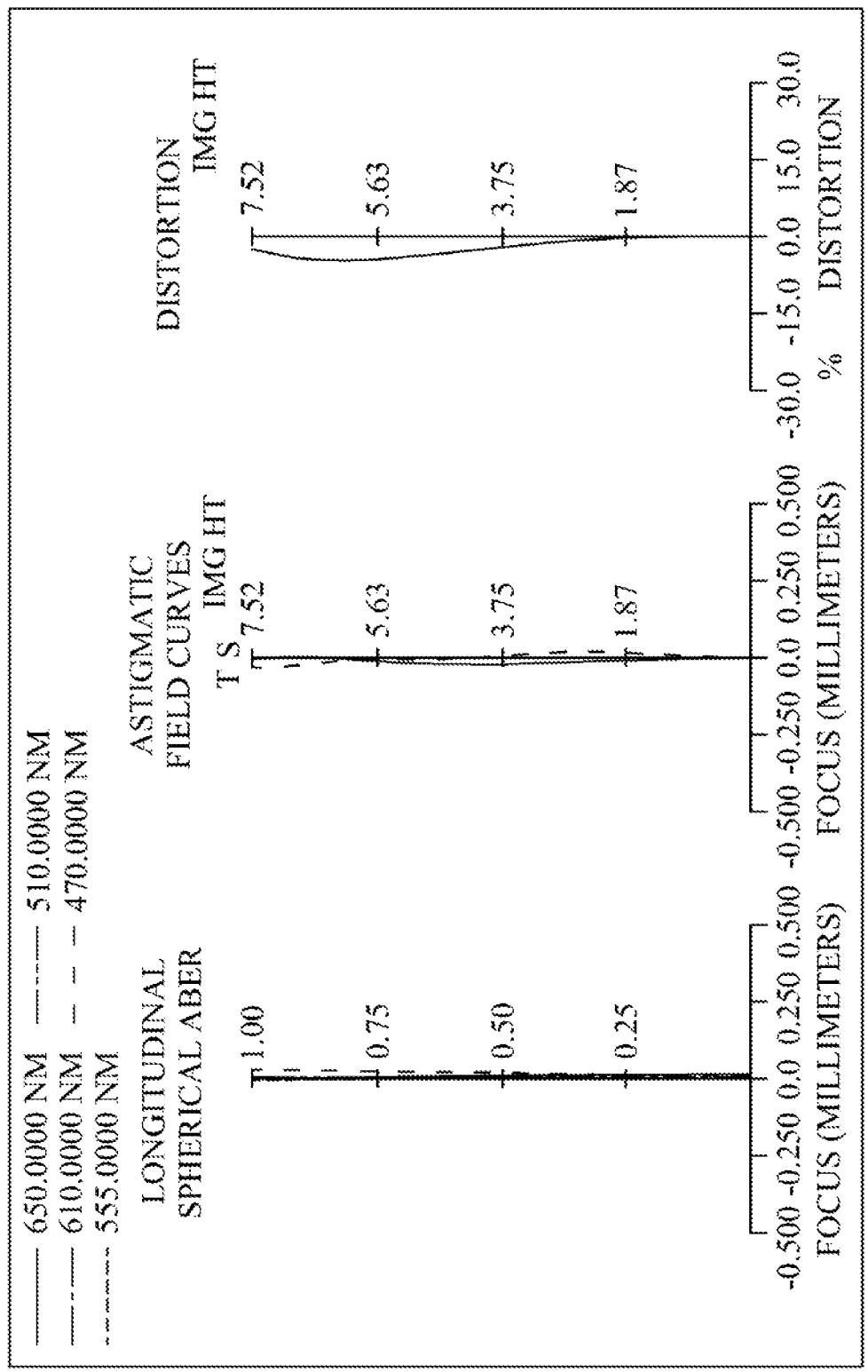
FIG. 1B shows the longitudinal spherical aberration curves, astigmatic field curves, and optical distortion curve of the optical image capturing system in the order from left to right according to the first embodiment of the present invention.
Figure 1C:
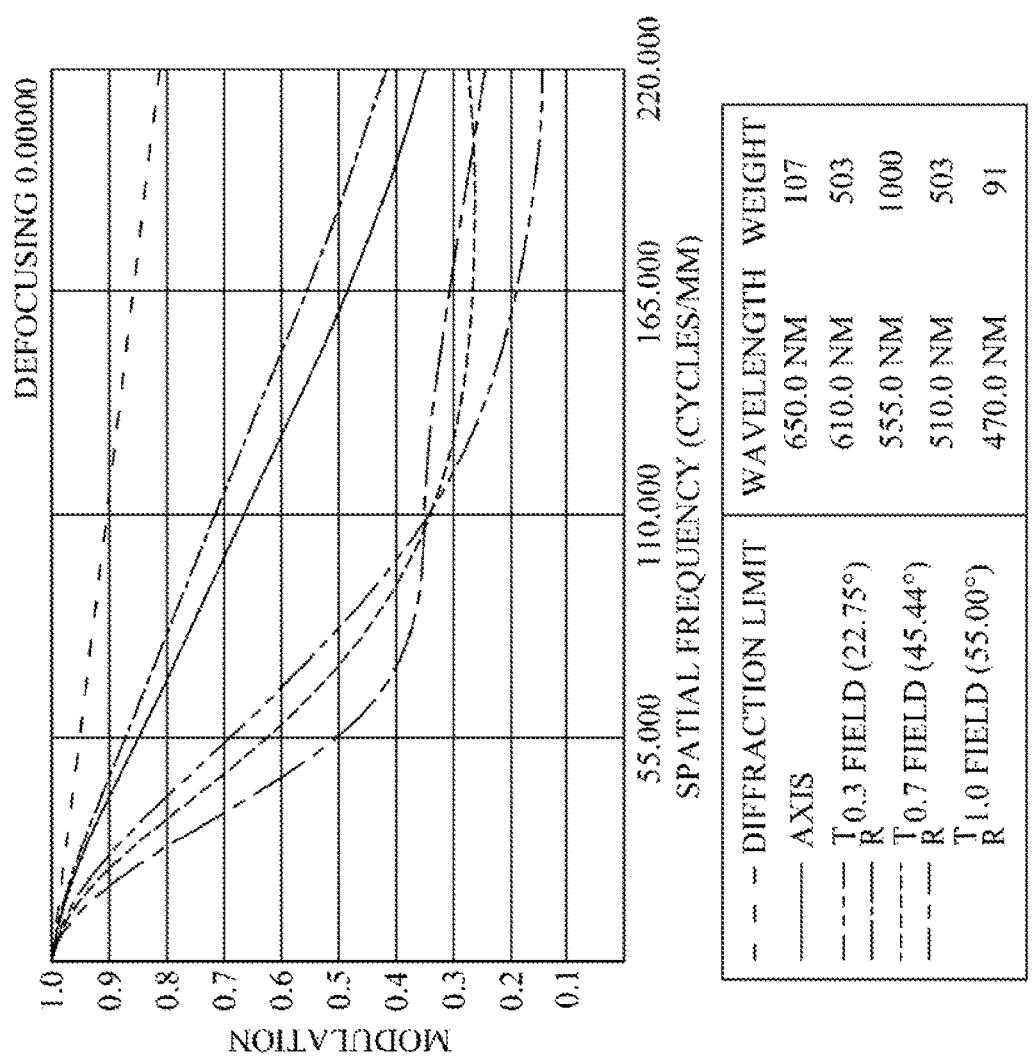
FIG. 1C is a characteristic diagram of modulation transfer of the visible light spectrum according to the first embodiment of the present disclosure.
Figure 1D:
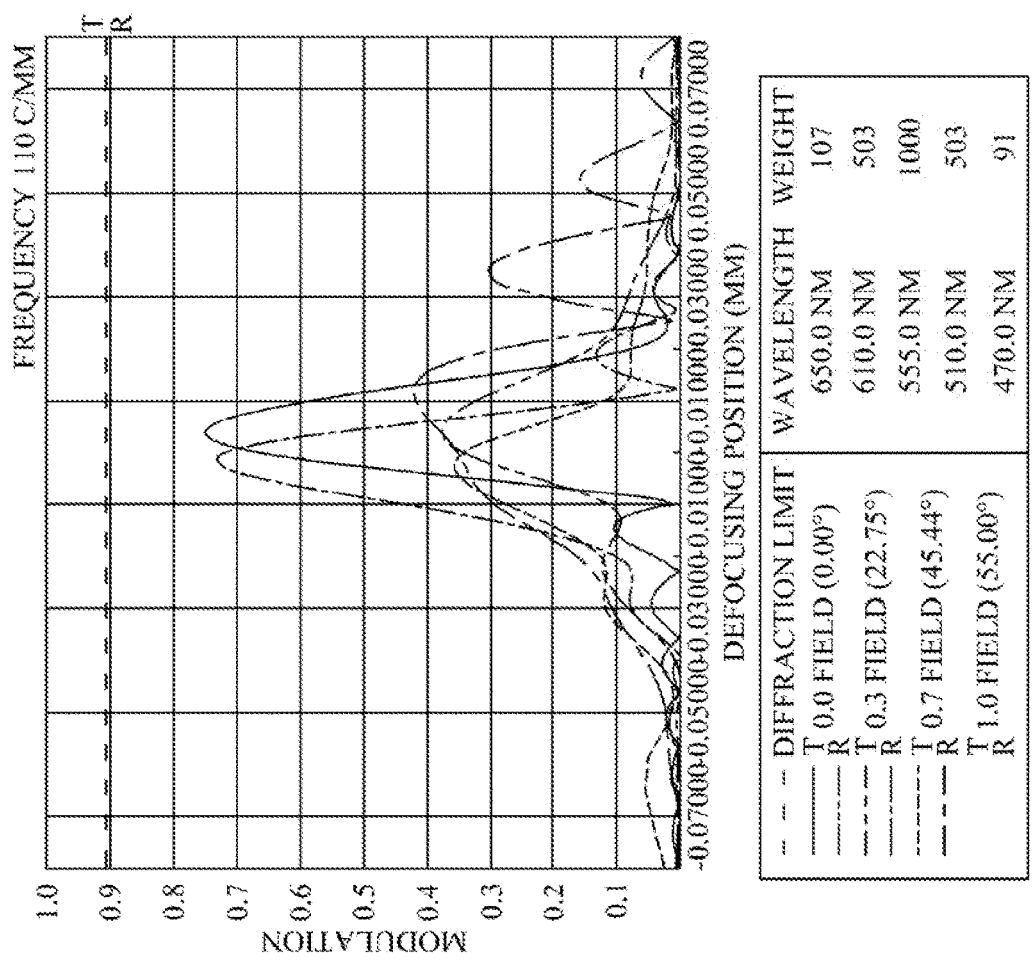
FIG. 1D is a diagram illustrating the through focus MTF values for the visible light spectrum at central field of view, 0.3 field of view and 0.7 field of view according to the first embodiment of the present disclosure.
Figure 1E:
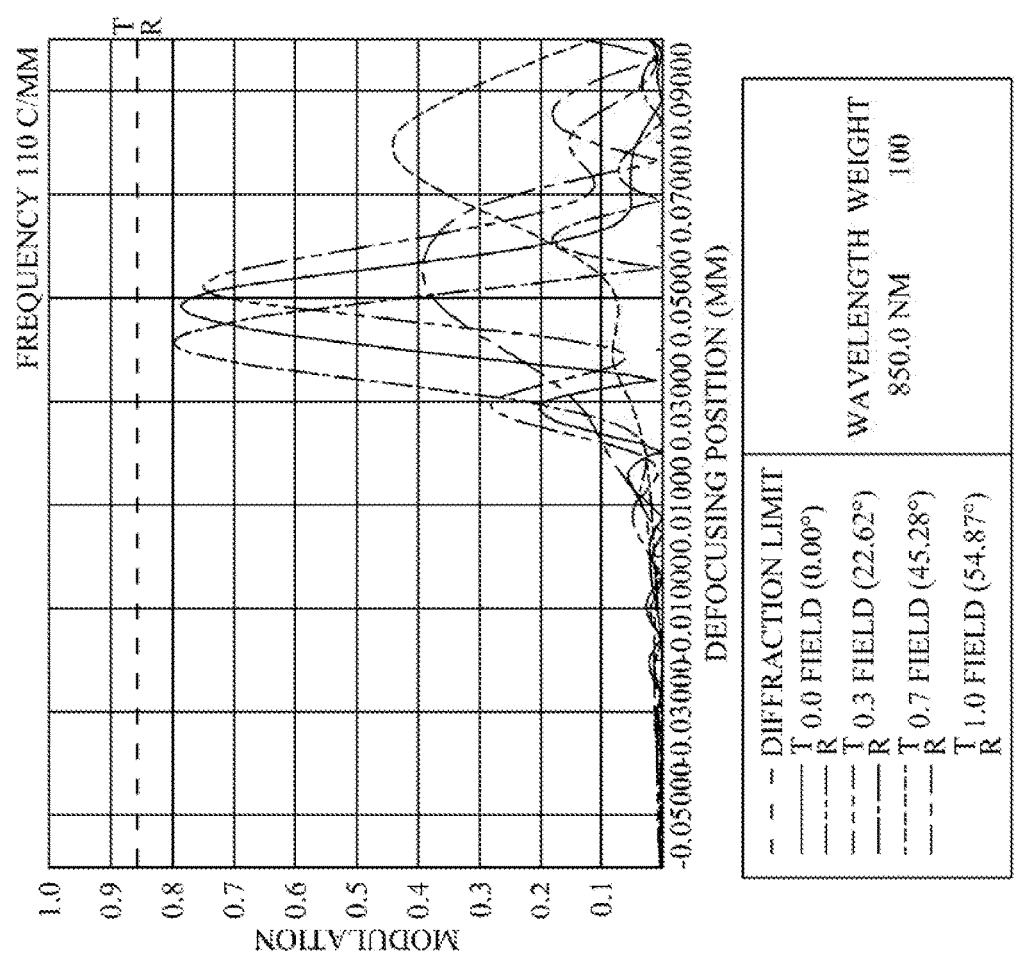
FIG. 1E is a diagram illustrating the through focus MTF values for the infrared light spectrum at central field of view, 0.3 field of view and 0.7 field of view according to the first embodiment of the present disclosure.

Please refer to FIG. 1A and FIG. 1B, wherein FIG. 1A is a schematic view of the optical image capturing system according to the first embodiment of the present invention and FIG. 1B shows the longitudinal spherical aberration curves, astigmatic field curves, and optical distortion curve of the optical image capturing system in the order from left to right according to the first embodiment of the present invention. FIG. 1C is a characteristic diagram of modulation transfer of the visible light spectrum according to the first embodiment of the present disclosure. FIG. 1D is a diagram illustrating the through focus MTF values for the visible light spectrum at central field of view, 0.3 field of view and 0.7 field of view according to the first embodiment of the present disclosure. FIG. 1E is a diagram illustrating the through focus MTF values for the infrared light spectrum at central field of view, 0.3 field of view and 0.7 field of view according to the first embodiment of the present disclosure.

As shown in FIG. 1A, in order from an object side to an image side, the optical image capturing system includes a first lens 110, an aperture 100, a second lens 120, a third lens 130, a fourth lens 140, a fifth lens 150, a sixth lens 160, a seventh lens 170, an eighth lens 180, an infrared filter 190, a first image plane 192, a second image plane and an image sensing element 194.

The first lens 110 has negative refractive power and is made of plastic. An object side 112 of the first lens 110 is a convex surface and an image side 114 of the first lens 110 is a concave surface, and both the object side 112 and the image side 114 of the first lens 110 are aspheric. The thickness of the first lens on the optical axis is denoted as TP1. The thickness of the first lens at height of ½ entrance pupil diameter (HEP) is denoted as ETP1.

The horizontal distance paralleling the optical axis from an inflection point on the object side of the first lens which is nearest to the optical axis to an intersection point where the object side of the first lens crosses the optical axis is expressed as SGI111. The horizontal distance paralleling the optical axis from an inflection point on the image side of the first lens which is nearest to the optical axis to an intersection point where the image side of the first lens crosses the optical axis is expressed as SGI121.

The horizontal distance in parallel with the optical axis from an inflection point on the object side of the first lens that is second nearest to the optical axis to the intersection point where the object side of the first lens crosses the optical axis is expressed as SGI112. The horizontal distance in parallel with the optical axis from an inflection point on the image side of the first lens that is second nearest to the optical axis to the intersection point where the image side of the first lens crosses the optical axis is expressed as SGI122.

The perpendicular distance from the inflection point on the object side of the first lens that is nearest to the optical axis to the optical axis is expressed as HIF111. The distance perpendicular to the optical axis from the inflection point on the image side of the first lens that is nearest to the optical axis to the intersection point where the image side of the first lens crosses the optical axis is expressed as HIF121.

The perpendicular distance from the inflection point on the object side of the first lens that is second nearest to the optical axis to the optical axis is expressed as HIF112. The distance perpendicular to the optical axis from the inflection point on the image side of the first lens that is second nearest to the optical axis to an intersection point where the image side of the first lens crosses the optical axis is expressed as HIF122.

The second lens 120 has positive refractive power and is made of plastic. An object side 122 of the second lens 120 is a convex surface and an image side 124 of the second lens 120 is a convex surface, and both the object side 122 and the image side 124 of the second lens 120 are aspheric. The thickness of the second lens on the optical axis is denoted as TP2. The thickness of the second lens at height of ½ entrance pupil diameter (HEP) is denoted as ETP2.

The horizontal distance in parallel with the optical axis from an inflection point on the object side of the second lens that is nearest to the optical axis to an intersection point where the object side of the second lens crosses the optical axis is expressed as SGI211. The horizontal distance in parallel with the optical axis from an inflection point on the image side of the second lens that is nearest to the optical axis to an intersection point where the image side of the second lens crosses the optical axis is expressed as SGI221.

The perpendicular distance from the inflection point on the object side of the second lens that is nearest to the optical axis to the optical axis is expressed as HIF211. The distance perpendicular to the optical axis from the inflection point on the image side of the second lens that is nearest to the optical axis to the intersection point where the image side of the second lens crosses the optical axis is expressed as HIF221.

The third lens 130 has positive refractive power and is made of plastic. An object side 132 of the third lens 130 is a convex surface and an image side 134 of the third lens 130 is a concave surface, and both the object side 132 and the image side 134 of the third lens 130 are aspheric. Both the object side 132 and the image side 134 of the third lens 130 have one inflection point. The thickness of the third lens on the optical axis is denoted as TP3. The thickness of the third lens at height of ½ entrance pupil diameter (HEP) is denoted as ETP3.

The horizontal distance in parallel with the optical axis from an inflection point on the object side of the third lens that is nearest to the optical axis to an intersection point where the object side of the third lens crosses the optical axis is expressed as SGI311. The horizontal distance in parallel with the optical axis from an inflection point on the image side of the third lens that is nearest to the optical axis to an intersection point where the image side of the third lens crosses the optical axis is expressed as SGI321. The following conditions are satisfied: SGI311=0.3764 mm, |SGI311|/(|SGI311|+TP3)=0.1428, SGI321=0.0129 mm and |SGI321|/(|SGI321|+TP3)=0.0057.

The horizontal distance in parallel with the optical axis from an inflection point on the object side of the third lens that is second nearest to the optical axis to the intersection point where the object side of the third lens crosses the optical axis is expressed as SGI312. The horizontal distance in parallel with the optical axis from an inflection point on the image side of the third lens that is second nearest to the optical axis to the intersection point where the image side of the third lens crosses the optical axis is expressed as SGI322.

The perpendicular distance between the inflection point on the object side of the third lens that is nearest to the optical axis and the optical axis is expressed as HIF311. The distance perpendicular to the optical axis between the inflection point on the image side of the third lens that is nearest to the optical axis and the intersection point where the image side of the third lens crosses the optical axis is expressed as HIF321. The following conditions are satisfied: HIF311=4.4550 mm, HIF311/HOI=0.5940, HIF321=1.3867 mm and HIF321/HOI=0.1849.

The perpendicular distance between the inflection point on the object side of the third lens that is second nearest to the optical axis and the optical axis is expressed as HIF312. The distance perpendicular to the optical axis between the inflection point on the image side of the third lens that is second nearest to the optical axis and the intersection point where the image side of the third lens crosses the optical axis is expressed as HIF322.

The fourth lens 140 has negative refractive power and is made of plastic. An object side 142 of the fourth lens 140 is a concave surface and an image side 144 of the fourth lens 140 is a concave surface, and both the object side 142 and the image side surface 144 of the fourth lens 140 are aspheric. The thickness of the fourth lens on the optical axis is denoted as TP4. The thickness of the fourth lens at height of ½ entrance pupil diameter (HEP) is denoted as ETP4.

The horizontal distance in parallel with the optical axis from an inflection point on the object side of the fourth lens that is nearest to the optical axis to the intersection point where the object side of the fourth lens crosses the optical axis is expressed as SGI411. The horizontal distance in parallel with the optical axis from an inflection point on the image side of the fourth lens that is nearest to the optical axis to the intersection point where the image side of the fourth lens crosses the optical axis is expressed as SGI421.

The horizontal distance in parallel with the optical axis from an inflection point on the object side of the fourth lens that is second nearest to the optical axis to the intersection point where the object side of the fourth lens crosses the optical axis is expressed as SGI412. The horizontal distance in parallel with the optical axis from an inflection point on the image side of the fourth lens that is second nearest to the optical axis to the intersection point where the image side of the fourth lens crosses the optical axis is expressed as SGI422.

The perpendicular distance between the inflection point on the object side of the fourth lens that is nearest to the optical axis and the optical axis is expressed as HIF411. The distance perpendicular to the optical axis between the inflection point on the image side of the fourth lens that is nearest to the optical axis and the intersection point where the image side of the fourth lens crosses the optical axis is expressed as HIF421.

The perpendicular distance between the inflection point on the object side of the fourth lens that is second nearest to the optical axis and the optical axis is expressed as HIF412. The distance perpendicular to the optical axis between the inflection point on the image side of the fourth lens that is second nearest to the optical axis and the intersection point where the image side of the fourth lens crosses the optical axis is expressed as HIF422.

The fifth lens 150 has positive refractive power and is made of plastic. An object side 152 of the fifth lens 150 is a convex surface and an image side 154 of the fifth lens 150 is a convex surface, and both the object side 152 and the image side 154 of the fifth lens 150 are aspheric. The image side 154 of the fifth lens 150 has one inflection point. The thickness of the fifth lens on the optical axis is denoted as TP5. The thickness of the fifth lens at height of ½ entrance pupil diameter (HEP) is denoted as ETP5.

The horizontal distance in parallel with the optical axis from an inflection point on the object side of the fifth lens that is nearest to the optical axis to the intersection point where the object side of the fifth lens crosses the optical axis is expressed as SGI511. The horizontal distance in parallel with the optical axis from an inflection point on the image side of the fifth lens that is nearest to the optical axis to the intersection point where the image side of the fifth lens crosses the optical axis is expressed as SGI521. The following conditions are satisfied: SGI521=−0.0777 mm and |SGI521|/(|SGI521|+TP5)=0.0296.

The horizontal distance in parallel with the optical axis from an inflection point on the object side of the fifth lens that is second nearest to the optical axis to the intersection point where the object side of the fifth lens crosses the optical axis is expressed as SGI512. The horizontal distance in parallel with the optical axis from an inflection point on the image side of the fifth lens that is second nearest to the optical axis to the intersection point where the image side of the fifth lens crosses the optical axis is expressed as SGI522.

The perpendicular distance between the optical axis and the inflection point on the object side of the fifth lens that is nearest to the optical axis is expressed as HIF511. The perpendicular distance between the optical axis and the inflection point on the image side of the fifth lens that is nearest to the optical axis is expressed as HIF521. The following conditions are satisfied: HIF521=2.1725 mm and HIF521/HOI=0.2897.

The perpendicular distance between the inflection point on the object side of the fifth lens that is second nearest to the optical axis and the optical axis is expressed as HIF512. The perpendicular distance between the inflection point on the image side of the fifth lens that is second nearest to the optical axis and the optical axis is expressed as HIF522.

The sixth lens 160 has positive refractive power and is made of plastic. An object side 162 of the sixth lens 160 is a convex surface and an image side 164 of the sixth lens 160 is a concave surface, and both the object side 162 and the image side 164 of the sixth lens 160 have one inflection point. Therefore, the incident angle of each field of view on the sixth lens can be effectively adjusted and the spherical aberration can thus be improved. The thickness of the sixth lens on the optical axis is denoted as TP6. The thickness of the sixth lens at height of ½ entrance pupil diameter (HEP) is denoted as ETP6.

The horizontal distance in parallel with the optical axis from an inflection point on the object side of the sixth lens that is nearest to the optical axis to an intersection point where the object side of the sixth lens crosses the optical axis is expressed as SGI611. The horizontal distance in parallel with the optical axis from an inflection point on the image side of the sixth lens that is nearest to the optical axis to an intersection point where the image side of the sixth lens crosses the optical axis is expressed as SGI621. The following conditions are met: SGI621=0.3579 mm and |SGI621|/(|SGI621|+TP6)=0.0867.

The perpendicular distance between the inflection point on the object side of the sixth lens that is nearest to the optical axis and the optical axis is expressed as HIF611. The perpendicular distance between the inflection point on the image side of the sixth lens that is nearest to the optical axis and the optical axis is expressed as HIF621. The following conditions are met: HIF621=6.3642 mm and HIF621/HOI=0.8486.

The seventh lens 170 has positive refractive power and is made of plastic. An object side 172 of the seventh lens 170 is a convex surface and an image side 174 of the seventh lens 170 is a convex surface. Hereby, this configuration is beneficial to shorten the back focal length in order to keep the optical image capturing system minimized. Besides, the image side 174 of the seventh lens 170 has one inflection point. The thickness of the seventh lens on the optical axis is denoted as TP7. The thickness of the seventh lens at height of ½ entrance pupil diameter (HEP) is denoted as ETP7.

The horizontal distance in parallel with the optical axis from an inflection point on the object side of the seventh lens that is nearest to the optical axis to an intersection point where the object side of the seventh lens crosses the optical axis is expressed as SGI711. The horizontal distance in parallel with the optical axis from an inflection point on the image side of the seventh lens that is nearest to the optical axis to an intersection point where the image side of the seventh lens crosses the optical axis is expressed as SGI721. The following conditions are met: SGI721=−0.0364 mm and |SGI721|/(|SGI721|+TP7)=0.0111.

The perpendicular distance between the inflection point on the object side of the seventh lens that is nearest to the optical axis and the optical axis is expressed as HIF711. The perpendicular distance between the inflection point on the image side of the seventh lens that is nearest to the optical axis and the optical axis is expressed as HIF721. The following conditions are met: HIF721=2.5166 mm and HIF721/HOI=0.3355.

The eighth lens 180 has negative refractive power and is made of plastic. An object side 182 of the eighth lens 180 is a concave surface and an image side 184 of the eighth lens 180 is a concave surface. Hereby, this configuration is beneficial to shorten the back focal length in order to keep the optical image capturing system minimized. The thickness of the eighth lens on the optical axis is denoted as TP8. The thickness of the eighth lens at height of ½ entrance pupil diameter (HEP) is denoted as ETP8.

The horizontal distance in parallel with the optical axis from an inflection point on the object side of the eighth lens that is nearest to the optical axis to an intersection point where the object side of the eighth lens crosses the optical axis is expressed as SGI811. The horizontal distance in parallel with the optical axis from an inflection point on the image side of the eighth lens that is nearest to the optical axis to an intersection point where the image side of the eighth lens crosses the optical axis is expressed as SGI821.

The perpendicular distance between the inflection point on the object side of the eighth lens that is nearest to the optical axis and the optical axis is expressed as HIF811. The perpendicular distance between the inflection point on the image side of the eighth lens that is nearest to the optical axis and the optical axis is expressed as HIF821.

In the present embodiment, the distance in parallel with the optical axis from a coordinate point on the object side of the first lens at the height of ½ HEP to the first image plane is denoted as ETL. The distance in parallel with the optical axis from a coordinate point on the object side of the first lens at the height of ½ HEP to a coordinate point on the image side of the eighth lens at the height of ½ HEP is denoted as EIN. The following conditions are satisfied: ETL=51.501 mm, EIN=46.863 mm, and EIN/ETL=0.910.

The present embodiment satisfies the following conditions: ETP1=3.556 mm, ETP2=3.685 mm, ETP3=2.169 mm, ETP4=2.302 mm, ETP5=2.260 mm, ETP6=3.565, ETP7=3.104 and ETP8=1.002 mm. The sum of the aforementioned ETP1 to ETP8 is denoted as SETP, and SETP=21.644 mm. TP1=3.180 mm, TP2=3.990 mm, TP3=2.259 mm, TP4=1.878 mm, TP5=2.551 mm, TP6=3.772 mm, TP7=3.236 mm and TP8=0.927 mm. The sum of the aforementioned TP1 to TP8 is denoted as STP, and STP=21.794 mm. Wherein, SETP/STP=0.993 and SETP/EIN=0.462.

In the present embodiment, the proportional relationship (ETP/TP) between the thickness (ETP) of each lens at the height of ½ entrance pupil diameter (HEP) and the thickness (TP) of the lens to which the surface belongs on the optical axis is specifically manipulated, in order to achieve a balance between the manufacturability about lens and the capability of aberration correction. The following conditions are satisfied: ETP1/TP1=1.118, ETP2/TP2=0.924, ETP3/TP3=0.960, ETP4/TP4=1.226, ETP5/TP5=0.886, ETP6/TP6=0.945, ETP7/TP7=0.9595 and ETP8/TP8=1.080.

In the present embodiment, the horizontal distance between two adjacent lenses at the height of ½ entrance pupil diameter (HEP) is manipulated, in order to achieve a balance among the degree of "miniaturization" for the length HOS of the optical image capturing system, the manufacturability about lens and the capability of aberration correction. In particular, the proportional relationship (ED/IN) of the horizontal distance (ED) between the two adjacent lenses at the height of ½ entrance pupil diameter (HEP) to the horizontal distance (IN) between the two adjacent lenses on the optical axis is controlled. The following conditions are satisfied: the horizontal distance in parallel with the optical axis between the first lens and the second lens at the height of ½ HEP is denoted as ED12, and ED12=22.059 mm; the horizontal distance in parallel with the optical axis between the second lens and the third lens at the height of ½ HEP is denoted as ED23, and ED23=0.709 mm; the horizontal distance in parallel with the optical axis between the third lens and the fourth lens at the height of ½ HEP is denoted as ED34, and ED34=0.563 mm; the horizontal distance in parallel with the optical axis between the fourth lens and the fifth lens at the height of ½ HEP is denoted as ED45, and ED45=1.444 mm; the horizontal distance in parallel with the optical axis between the fifth lens and the sixth lens at the height of ½ HEP is denoted as ED56, and ED56=0.381 mm; the horizontal distance in parallel with the optical axis between the sixth lens and the seventh lens at the height of ½ HEP is denoted as ED67, and ED67=0.110 mm; and the horizontal distance in parallel with the optical axis between the seventh lens and the eighth lens at the height of ½ HEP is denoted as ED78, and ED78=1.253 mm. The sum of the aforementioned ED12 to ED78 is denoted as SED, and SED=25.219 mm.

The horizontal distance between the first lens and the second lens on the optical axis is denoted as IN12, wherein IN12=22.350 mm and the ratio between ED12 and IN12 is ED12/IN12=0.987. The horizontal distance between the second lens and the third lens on the optical axis is denoted as IN23, wherein IN23=0.480 mm and the ratio between ED23 and IN23 is ED23/IN23=0.2341476. The horizontal distance between the third lens and the fourth lens on the optical axis is denoted as IN34, wherein IN34=0.712 mm and the ratio between ED34 and IN34 is ED34/IN34=0.791. The horizontal distance between the fourth lens and the fifth lens on the optical axis is denoted as IN45, wherein IN45=0.234 mm and the ratio between ED45 and IN45 is ED45/IN45=0.616. The horizontal distance between the fifth lens and the sixth lens on the optical axis is denoted as IN56, wherein IN56=0.050 mm and the ratio between ED56 and IN56 is ED56/IN56=7.630. The horizontal distance between the sixth lens and the seventh lens on the optical axis is denoted as IN67, wherein IN67=0.050 mm and the ratio between ED67 and IN67 is ED67/IN67=2.192. The horizontal distance between the seventh lens and the eighth lens on the optical axis is denoted as IN78, wherein IN78=1.278 mm and the ratio between ED78 and IN78 is ED78/IN78=0.981. The sum of the aforementioned IN12 to IN78 is denoted as SIN, wherein SIN=8.418 mm and SED/SIN=1.003.

In the present embodiment, conditions as follows are additionally satisfied: ED12/ED23=31.131, ED23/ED34=1.258, ED34/ED45=3.902, ED45/ED56=0.378, ED56/ED67=0.481, ED67/ED78=0.087, IN12/IN23=46.552, IN23/IN34=0.675, IN34/IN45=3.036, IN45/IN56=4.689, IN56/IN67=1.000, and IN67/IN78=0.039.

The horizontal distance in parallel with the optical axis from a coordinate point on the image side of the eighth lens at the height of ½ HEP to the first image plane is denoted as EBL, and EBL=4.638 mm. The horizontal distance in parallel with the optical axis from the intersection point where the optical axis crosses the image side of the eighth lens to the first image plane is denoted as BL, and BL=4.6574 mm. The embodiment of the present disclosure may satisfy the following condition: EBL/BL=0.9958. In the present embodiment, the distance in parallel with the optical axis from a coordinate point on the image side of the eighth lens at the height of ½ HEP to the infrared filter is denoted as EIR, and EIR=0.980 mm. The distance in parallel with the optical axis from the intersection point where the optical axis crosses the image side of the eighth lens to the infrared filter is denoted as PIR, and PIR=1.000 mm. The following condition is also satisfied: EIR/PIR=0.980.

In the present embodiment, related characteristics of inflection point and descriptions below are defined on a basis of the primary reference wavelength 555 nm.

The infrared filter 190 is made of glass. The infrared filter 190 is disposed between the eighth lens 180 and the first image plane 192, and this configuration does not affect the focal length of the optical image capturing system.

In the optical image capturing system of the first embodiment, the focal length of the optical image capturing system is f, the entrance pupil diameter of the optical image capturing system is HEP, and a half maximum angle of view of the optical image capturing system is HAF. The values of the parameters are shown as below: f=5.3947 mm, f/HEP=1.2 and HAF=55°.

The ratio of the focal length f of the optical image capturing system to the focal length fp of each lens with positive refractive power is PPR. The ratio of the focal length f of the optical image capturing system to the focal length fn of each lens with negative refractive power is NPR. In the optical image capturing system of the first embodiment, a sum of the PPR of all lenses with positive refractive power is ΣPPR and a sum of the NPR of all lenses with negative refractive power is ΣNPR. The following conditions are also satisfied: |f/f1|=0.4204, |f/f2|=0.3695, |f/f3|=0.0986, |f/f4|=0.6333, |f/f5|=0.3560, |f/f6|=0.2635, |f/f7|=0.1252, and |f/f8|=0.0715.

In the optical image capturing system of the first embodiment, the distance from the object side 112 of the first lens to the image side 184 of the eighth lens is InTL. The distance from the object side 112 of the first lens to the first image plane 192 is HOS. The distance from the aperture 100 to the first image plane 192 is InS. The half diagonal of an effective detection field of the image sensing element 194 is HOI. The distance from the image side 184 of the eighth lens to the first image plane 192 is BFL. The following conditions are met: InTL+BFL=HOS, HOS=51.6062 mm, InTL=46.9488 mm, HOI=7.5 mm, HOS/HOI=6.8808, HOS/f=9.5661, InS=24.2924 mm and InS/HOS=0.4707.

In the optical image capturing system of the first embodiment, a total thickness of all lenses with refractive power on the optical axis is ΣTP. The following conditions are met: ΣTP=21.7939 mm and ΣTP/InTL=0.4642. Therefore, this configuration can keep the contrast ratio of the optical image capturing system and the yield rate about manufacturing lens at the same time, and provide the proper back focal length so as to accommodate other elements.

In the optical image capturing system of the first embodiment, a sum of focal lengths of all lenses with positive refractive power is ΣPP. The following conditions are satisfied: ΣPP=f2+f3+f5+f6+f7=148.001 mm and f2/(f2+f3+f5+f6+f7)=0.0986. Hereby, this configuration is helpful to distribute the positive refractive power of the second lens 120 to other lens with positive refractive power in an appropriate way, so as to suppress the generation of noticeable aberrations in the propagating process of the incident light in the optical image capturing system.

In the optical image capturing system of the first embodiment, the sum of focal lengths of all lenses with negative refractive power is ΣNP. The following conditions are met: ΣNP=f1+f4+f8=−96.8161 mm and f1/(f1+f3+f6)=0.1325. Hereby, this configuration is helpful to distribute the negative refractive power of the eighth lens to other lens with negative refractive power in an appropriate way, so as to suppress the generation of noticeable aberrations in the propagating process of the incident light in the optical image capturing system.

In the optical image capturing system of the first embodiment, the distance between the first lens 110 and the second lens 120 on the optical axis is IN12. The following conditions are met: IN12=22.3504 mm and IN12/f=4.1430. Therefore, this configuration is helpful to improve the chromatic aberration of the lenses in order to elevate their performance.

In the optical image capturing system of the first embodiment, the thicknesses of the first lens 110 and the second lens 120 on the optical axis are TP1 and TP2, respectively. The following conditions are satisfied: TP1=3.1800 mm, TP2=3.9903 mm and (TP1+IN12)/TP2=6.3981. Therefore, this configuration is helpful to control the sensitivity generated by the optical image capturing system and elevate its performance.

In the optical image capturing system of the first embodiment, the thicknesses of the sixth lens 160, the seventh lens 170 and the eighth lens 180 on the optical axis are TP6, TP7 and TP8, respectively. The distance between the sixth lens 160 and the seventh lens 170 on the optical axis is IN67. The distance between the seventh lens 170 and the eighth lens 180 on the optical axis is IN78. The following conditions are satisfied: TP6=3.7720 mm, TP7=3.2362 mm, TP8=0.9274 mm and (TP8+IN78)/TP7=0.6815. Therefore, this configuration is helpful to control the sensitivity generated by the optical image capturing system and reduce the total height of the optical image capturing system.

In the optical image capturing system of the first embodiment, the thicknesses of the third lens 130, fourth lens 140 and fifth lens 150 on the optical axis are TP3, TP4 and TP5, respectively. The distance between the third lens 130 and the fourth lens 140 on the optical axis is IN34. The distance between the fourth lens 140 and the fifth lens 150 on the optical axis is IN45. The distance from the object side 112 of the first lens to the image side 184 of the eighth lens is InTL. The following conditions are satisfied: TP3=2.2593 mm, TP4=1.8776 mm, TP5=2.5511 mm, IN34=0.7118 mm, IN45=0.2345 mm and (TP3+TP4+TP5)/ΣTP=0.3069. Therefore, this configuration is helpful to slightly correct the aberration of the propagating process of the incident light layer by layer and decrease the total height of the optical image capturing system.

In the optical image capturing system of the first embodiment, the horizontal distance in parallel with the optical axis from a maximum effective half diameter position on the object side 172 of the seventh lens to an intersection point where the object side 172 of the seventh lens crosses the optical axis is InRS71. The horizontal distance in parallel with the optical axis from a maximum effective half diameter position on the image side 174 of the seventh lens to an intersection point where the image side 174 of the seventh lens crosses the optical axis is InRS72. The thickness of the seventh lens 170 on the optical axis is TP7. The following conditions are satisfied: InRS71=2.7049 mm, InRS72=0.3270 mm, and |InRS72|/TP7=0.1010. Hereby, this configuration is favorable to the manufacturing and forming of lens and keeping the miniaturization of the optical image capturing system effectively.

In the optical image capturing system of the first embodiment, the perpendicular distance between a critical point on the object side 172 of the seventh lens and the optical axis is HVT71. The perpendicular distance between a critical point on the image side 174 of the seventh lens and the optical axis is HVT72. The following conditions are satisfied: HVT71=0 mm, HVT72=3.7869 mm and HVT71/HVT72=0.

In the optical image capturing system of the first embodiment, the horizontal distance in parallel with the optical axis from a maximum effective half diameter position on the object side 182 of the eighth lens to an intersection point where the object side 182 of the eighth lens crosses the optical axis is InRS81. The horizontal distance in parallel with the optical axis from a maximum effective half diameter position on the image side 184 of the eighth lens to an intersection point where the image side 184 of the eighth lens crosses the optical axis is InRS82. The thickness of the eighth lens 180 on the optical axis is TP8. The following conditions are satisfied: InRS81=−0.8396 mm, InRS82=0.9232 mm, and |InRS82|/TP8=0.9954. Hereby, this configuration is favorable to the manufacturing and forming of lens and keeping the miniaturization of the optical image capturing system effectively.

In the optical image capturing system of the first embodiment, the perpendicular distance between a critical point on the object side 182 of the eighth lens and the optical axis is HVT81. The perpendicular distance between a critical point on the image side 184 of the eighth lens and the optical axis is HVT82. The following conditions are satisfied: HVT81=0 mm and HVT82=0 mm.

In the optical image capturing system of the first embodiment, TV distortion and optical distortion for image formation in the optical image capturing system are TDT and ODT, respectively. The following conditions are satisfied: TDT=1.9874% and ODT=−4.6109%.

In the present embodiment of the disclosure, the light of any field of view may be further divided into the sagittal ray and tangential ray, and the spatial frequency of 110 cycles/mm serves as the benchmark for assessing the focus shifts and the values of MTF. The focus shifts, where the through focus MTF values of the visible sagittal ray at central field of view, 0.3 field of view and 0.7 field of view of the optical image capturing system are at their respective maximums, are denoted as VSFS0, VSFS3 and VSFS7 (the unit of measurement: mm), respectively, wherein the values of VSFS0, VSFS3 and VSFS7 equal to 0.000 mm, 0.000 mm and 0.010 mm, respectively. The maximum values of the through focus MTF of the visible sagittal ray at central field of view, 0.3 field of view and 0.7 field of view are denoted as VSMTF0, VSMTF3 and VSMTF7, respectively, wherein the values of VSMTF0, VSMTF3 and VSMTF7 equal to 0.667, 0.717 and 0.418, respectively. The focus shifts, where the through focus MTF values of the visible tangential ray at central field of view, 0.3 field of view and 0.7 field of view of the optical image capturing system are at their respective maximums, are denoted as VTFS0, VTFS3 and VTFS7 (the unit of measurement: mm), respectively, wherein the values of VTFS0, VTFS3 and VTFS7 equal to 0.000 mm, 0.000 mm, and 0.000 mm, respectively. The maximum values of the through focus MTF of the visible tangential ray at central field of view, 0.3 field of view and 0.7 field of view are denoted as VTMTF0, VTMTF3 and VTMTF7, respectively, wherein the values of VTMTF0, VTMTF3 and VTMTF7 equal to 0.667, 0.345 and 0.343, respectively. The average focus shift (position) of the aforementioned focus shifts of the visible sagittal ray at three fields of view and focus shifts of the visible tangential ray at three fields of view is denoted as AVFS (the unit of measurement: mm), which meets the absolute value |(VSFS0+VSFS3+VSFS7+VTFS0+VTFS3+VTFS7)/6|=|0.002 mm|.

The focus shifts, where the through focus MTF values of the infrared sagittal ray at central field of view, 0.3 field of view and 0.7 field of view of the optical image capturing system are at their respective maximums, are denoted as ISFS0, ISFS3 and ISFS7 (the unit of measurement: mm), respectively, wherein the values of ISFS0, ISFS3 and ISFS7 equal to 0.050 mm, 0.040 mm, and 0.060 mm, respectively. The average focus shift (position) of the aforementioned focus shifts of the infrared sagittal ray at three fields of view is denoted as AISFS. The maximum values of the through focus MTF of the infrared sagittal ray at central field of view, 0.3 field of view and 0.7 field of view are denoted as ISMTF0, ISMTF3, and ISMTF7, respectively, wherein the values of ISMTF0, ISMTF3 and ISMTF7 equal to 0.768, 0.785 and 0.382, respectively. The focus shifts, where the through focus MTF values of the infrared tangential ray at central field of view, 0.3 field of view and 0.7 field of view of the optical image capturing system are at their respective maximums, are denoted as ITFS0, ITFS3 and ITFS7 (the unit of measurement: mm), respectively, wherein the values of ITFS0, ITFS3 and ITFS7 equal to 0.050, 0.050 and 0.080, respectively. The average focus shift (position) of the aforementioned focus shifts of the infrared tangential ray at three fields of view is denoted as AITFS (the unit of measurement: mm). The maximum values of the through focus MTF of the infrared tangential ray at central field of view, 0.3 field of view and 0.7 field of view are denoted as ITMTF0, ITMTF3 and ITMTF7, respectively, wherein the values of ITMTF0, ITMTF3 and ITMTF7 equal to 0.768, 0.714 and 0.441, respectively. The average focus shift (position) of the aforementioned focus shifts of the infrared sagittal ray at three fields of view and the focus shifts of the infrared tangential ray at the three fields of view is denoted as AIFS (the unit of measurement: mm), which meets the absolute value of $|(ISFS0+ISFS3+ISFS7+ITFS0+ITFS3+ITFS7)/6|=|0.055$ mm|.

The focus shift between the focal points for the visible light and the infrared light at their central fields of view (RGB/IR) of the entire optical image capturing system (i.e. the wavelength of 850 nm versus the wavelength of 555 nm, the unit of measurement: mm) is denoted as FS (the distance between the first and second image planes on the optical axis), which meets the absolute value of $|(VSFS0+VTFS0)/2-(ISFS0+ITFS0)/2|=|0.050$ mm|. The difference (focus shift) between the average focus shift of the visible light at the three fields of view and the average focus shift of the infrared light at the three fields of view (RGB/IR) of the entire optical image capturing system (i.e. the wavelength of 850 nm versus the wavelength of 555 nm, the unit of measurement: mm) is denoted as AFS (the distance on the optical axis between the first average image plane and the second average image plane), which meets the absolute value of $|AIFS-AVFS|=|0.053$ mm|.

In the optical image capturing system of the present embodiment, the modulation transfer rates (values of MTF) for the visible light at the spatial frequency of 55 cycles/mm at positions of the optical axis, 0.3 HOI and 0.7 HOI on the first image plane are denoted as MTFE0, MTFE3 and MTFE7 respectively. The following conditions are satisfied: MTFE0 is about 0.85, MTFE3 is about 0.69 and MTFE7 is about 0.63. The modulation transfer rates (values of MTF) for the visible light at the spatial frequency of 110 cycles/mm at positions of the optical axis, 0.3 HOI and 0.7 HOI on the first image plane are denoted as MTFQ0, MTFQ3 and MTFQ7 respectively. The following conditions are satisfied: MTFQ0 is about 0.67, MTFQ3 is about 0.35 and MTFQ7 is about 0.35. The modulation transfer rates (values of MTF) for the visible light at the spatial frequency of 220 cycles/mm at positions of the optical axis, 0.3 HOI and 0.7 HOI on the first image plane are denoted as MTFH0, MTFH3 and MTFH7 respectively. The following conditions are satisfied: MTFH0 is about 0.35, MTFH3 is about 0.15 and MTFH7 is about 0.28.

The contents in Table 1 and Table 2 below should be incorporated into the reference of the present embodiment.

TABLE 1

Lens Parameters for the First Embodiment
f(focal length) = 5.3947 mm; f/HEP = 1.2; HAF(half angle of view) = 55 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 24.10442007 | 3.180 | Plastic | 1.565 | 58.00 | −12.832 |
| 2 | | 5.320562553 | 24.134 | | | | |
| 3 | Aperture | 1E+18 | −1.783 | | | | |
| 4 | Second Lens | 13.43633803 | 3.990 | Plastic | 1.583 | 30.20 | 14.600 |
| 5 | | −21.01336968 | 0.480 | | | | |
| 6 | Third Lens | 20.93757518 | 2.259 | Plastic | 1.565 | 58.00 | 54.695 |
| 7 | | 61.98504985 | 0.712 | | | | |
| 8 | Fourth Lens | −20.77669725 | 1.878 | Plastic | 1.661 | 20.40 | −8.519 |
| 9 | | 8.099983384 | 0.234 | | | | |
| 10 | Fifth Lens | 12.45426537 | 2.551 | Plastic | 1.565 | 58.00 | 15.154 |
| 11 | | −25.62260651 | 0.050 | | | | |
| 12 | Sixth Lens | 9.802286731 | 3.772 | Plastic | 1.565 | 58.00 | 20.476 |
| 13 | | 54.30873521 | 0.050 | | | | |
| 14 | Seventh Lens | 30.35740823 | 3.236 | Plastic | 1.514 | 56.80 | 43.076 |
| 15 | | −79.78586782 | 1.278 | | | | |
| 16 | Eighth Lens | −52.80596025 | 0.927 | Plastic | 1.661 | 20.40 | −75.465 |

TABLE 1-continued

Lens Parameters for the First Embodiment
f(focal length) = 5.3947 mm; f/HEP = 1.2; HAF(half angle of view) = 55 deg

| Surface No | Curvature Radius | | Thickness (mm) | Material | Refractive Index | Coefficient of Dispersion | Focal Length |
|---|---|---|---|---|---|---|---|
| 17 | | 1076.551341 | 1.000 | | | | |
| 18 | Infrared Filter | 1E+18 | 0.200 | BK_7 | 1.517 | 64.2 | |
| 19 | | 1E+18 | 3.461 | | | | |
| 20 | First Image Plane | 1E+18 | −0.004 | | | | |

Reference Wavelength (d-line): 555 nm

TABLE 2

Aspheric Coefficients in the First Embodiment
Table 2: Aspheric Coefficients

| Surface No | 1 | 2 | 4 | 5 | 6 | 7 |
|---|---|---|---|---|---|---|
| k | 0.000000E+00 | −6.347312E−01 | −1.241374E−01 | −3.925011E+00 | −1.239230E+01 | −3.576321E+02 |
| A4 | 0.000000E+00 | −6.373974E−05 | 1.757700E−05 | 1.645307E−04 | −1.638014E−04 | −5.472226E−04 |
| A6 | 0.000000E+00 | −3.330954E−07 | −7.768740E−08 | −2.230896E−06 | 3.137297E−06 | 1.041401E−07 |
| A8 | 0.000000E+00 | −1.225711E−08 | −8.480514E−09 | −9.713856E−09 | −5.543217E−08 | 5.418047E−09 |
| A10 | 0.000000E+00 | 1.019380E−10 | 1.014779E−10 | 3.194310E−10 | 4.404053E−11 | −2.150144E−10 |
| A12 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 |

| Surface No | 8 | 9 | 10 | 11 | 12 | 13 |
|---|---|---|---|---|---|---|
| k | 4.660401E+00 | −1.419080E+00 | 1.160063E+00 | −1.787274E+00 | −3.359494E+00 | 2.480422E+01 |
| A4 | −6.458760E−05 | −4.511984E−04 | 1.086597E−04 | 6.054571E−04 | −3.568053E−05 | −2.309982E−04 |
| A6 | −4.557334E−06 | 8.036379E−06 | −5.142695E−06 | 7.623918E−06 | 4.573090E−07 | 1.039199E−05 |
| A8 | 1.153474E−07 | −1.013564E−07 | 1.029807E−07 | −1.174933E−07 | 8.372695E−08 | −1.687118E−07 |
| A10 | −8.824977E−10 | 9.022617E−10 | −1.163426E−09 | 1.684909E−10 | −5.325352E−10 | 7.972063E−10 |
| A12 | 0.000000E+00 | 0.000000E+00 | 0.000000E+00 | 0.000000E+00 | 0.000000E+00 | 0.000000E+00 |
| A14 | 0.000000E+00 | | | | | |

| Surface No | 14 | 15 | 16 | 17 |
|---|---|---|---|---|
| k | 1.896298E+01 | 5.000000E+01 | −4.277708E+01 | −5.000000E+01 |
| A4 | 6.114576E−04 | 4.127602E−05 | −5.583548E−03 | 1.240671E−04 |
| A6 | 6.870081E−06 | 8.686605E−06 | 1.948110E−04 | −4.949077E−05 |
| A8 | −2.542782E−07 | −1.910974E−08 | −1.486947E−05 | 2.088854E−06 |
| A10 | 3.090262E−09 | 1.618760E−09 | −6.501246E−08 | −1.438383E−08 |
| A12 | 0.000000E+00 | 0.000000E+00 | 0.000000E+00 | 0.000000E+00 |
| A14 | | | 0.000000E+00 | 0.000000E+00 |

Table 1 is the detailed structural data for the first embodiment in FIG. 1A, of which the unit for the curvature radius, the thickness, the distance, and the focal length is millimeters (mm). Surfaces 0-16 illustrate the surfaces from the object side to the image side in the optical image capturing system. Table 2 shows the aspheric coefficients of the first embodiment, where k is the cone coefficient in the aspheric surface equation, and A1-A20 are respectively the first to the twentieth order aspheric surface coefficients. Besides, the tables in the following embodiments correspond to their respective schematic views and the diagrams of aberration curves, and definitions of the parameters in these tables are similar to those in the Table 1 and the Table 2, so the repetitive details will not be given here.

Second Embodiment

Figure 2A:
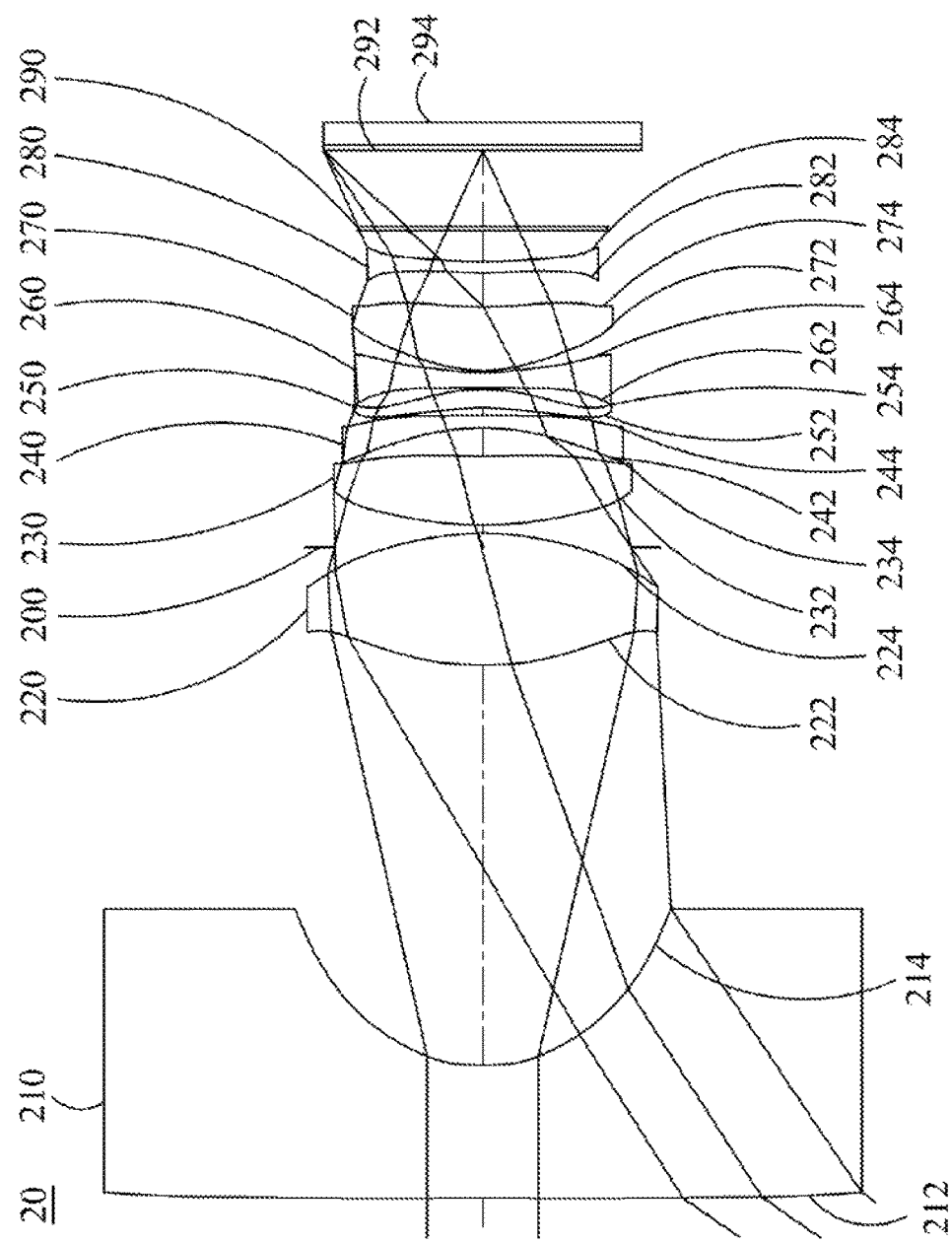
FIG. 2A is a schematic view of the optical image capturing system according to the second embodiment of the present invention.
Figure 2B:
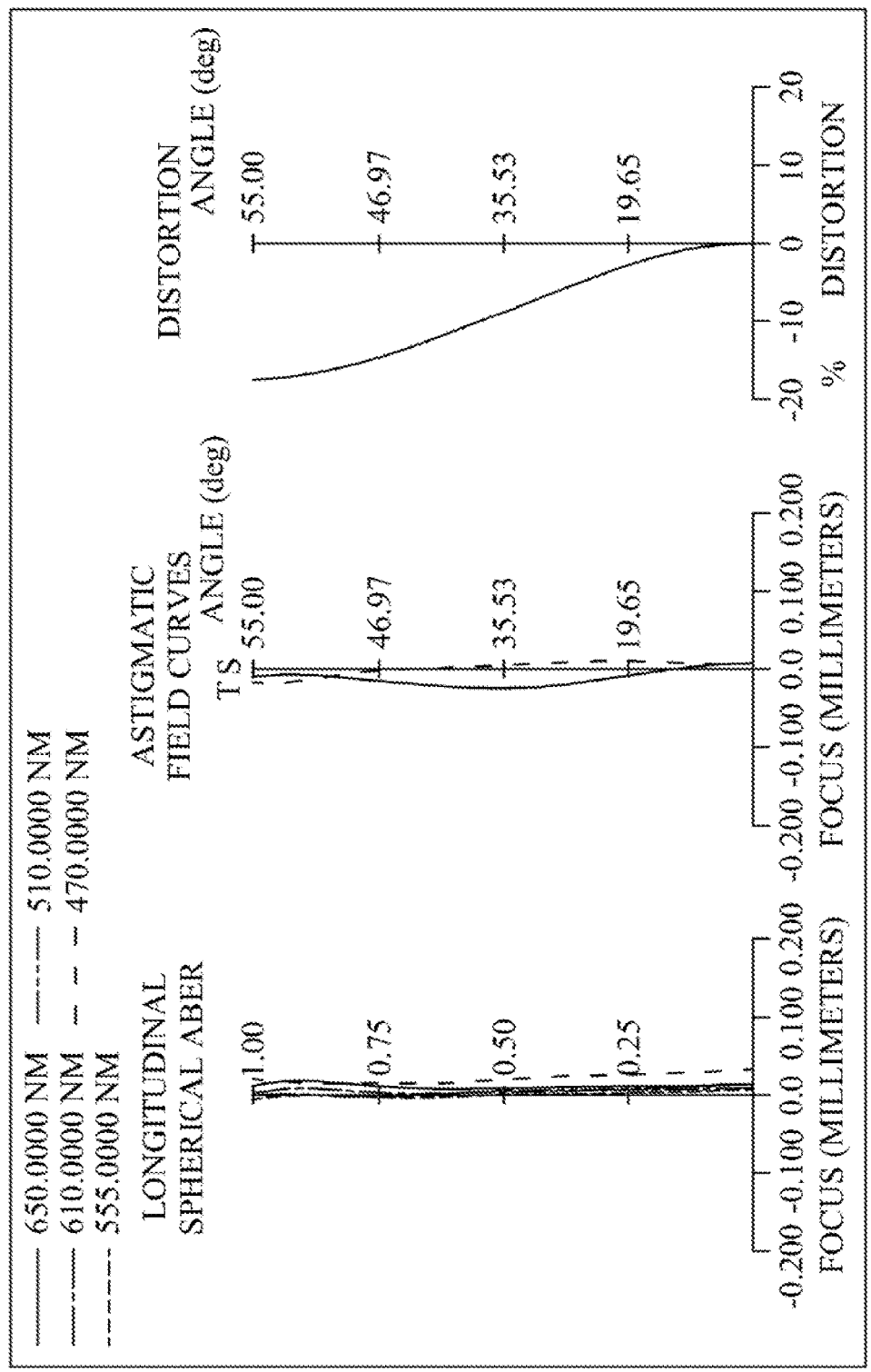
FIG. 2B shows the longitudinal spherical aberration curves, astigmatic field curves, and optical distortion curve of the optical image capturing system in the order from left to right according to the second embodiment of the present invention.
Figure 2C:
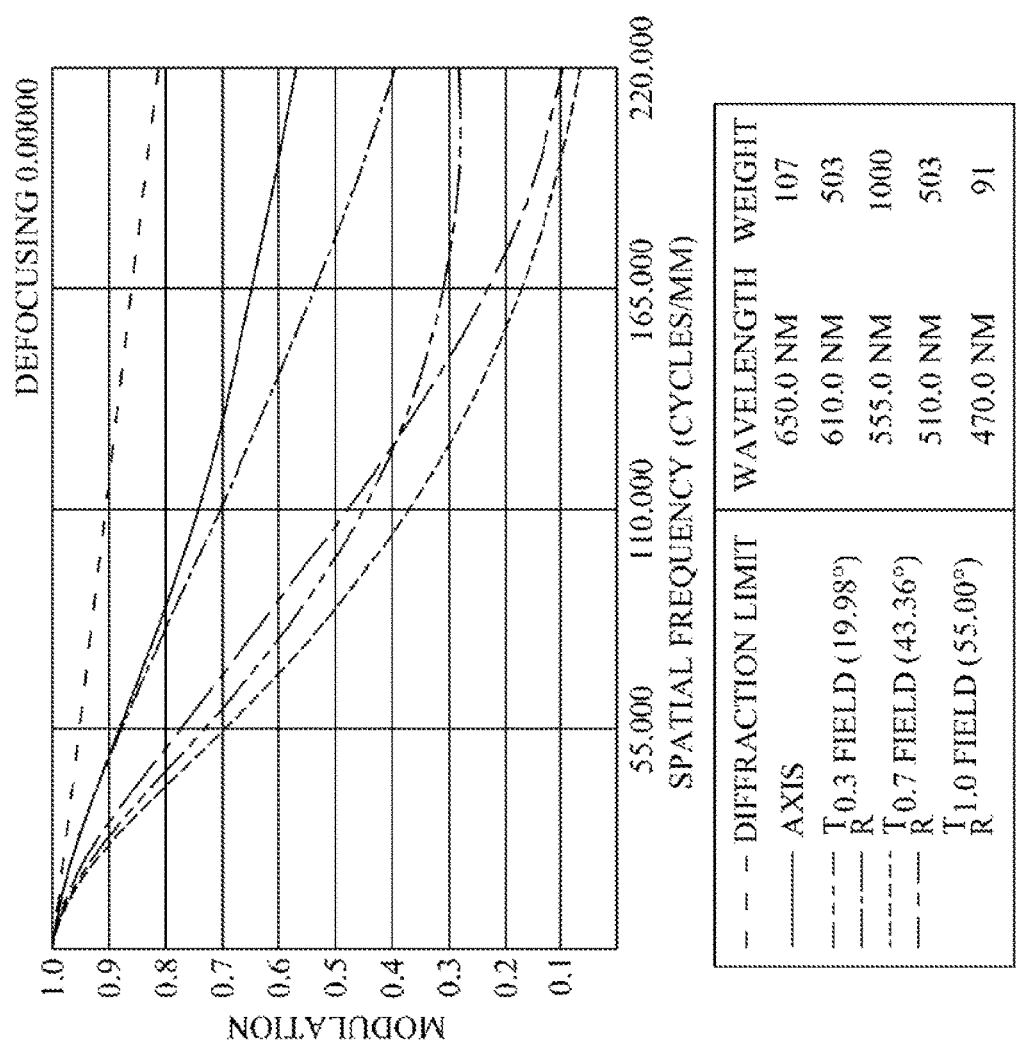
FIG. 2C is a characteristic diagram of modulation transfer of the visible light spectrum according to the second embodiment of the present disclosure.
Figure 2D:
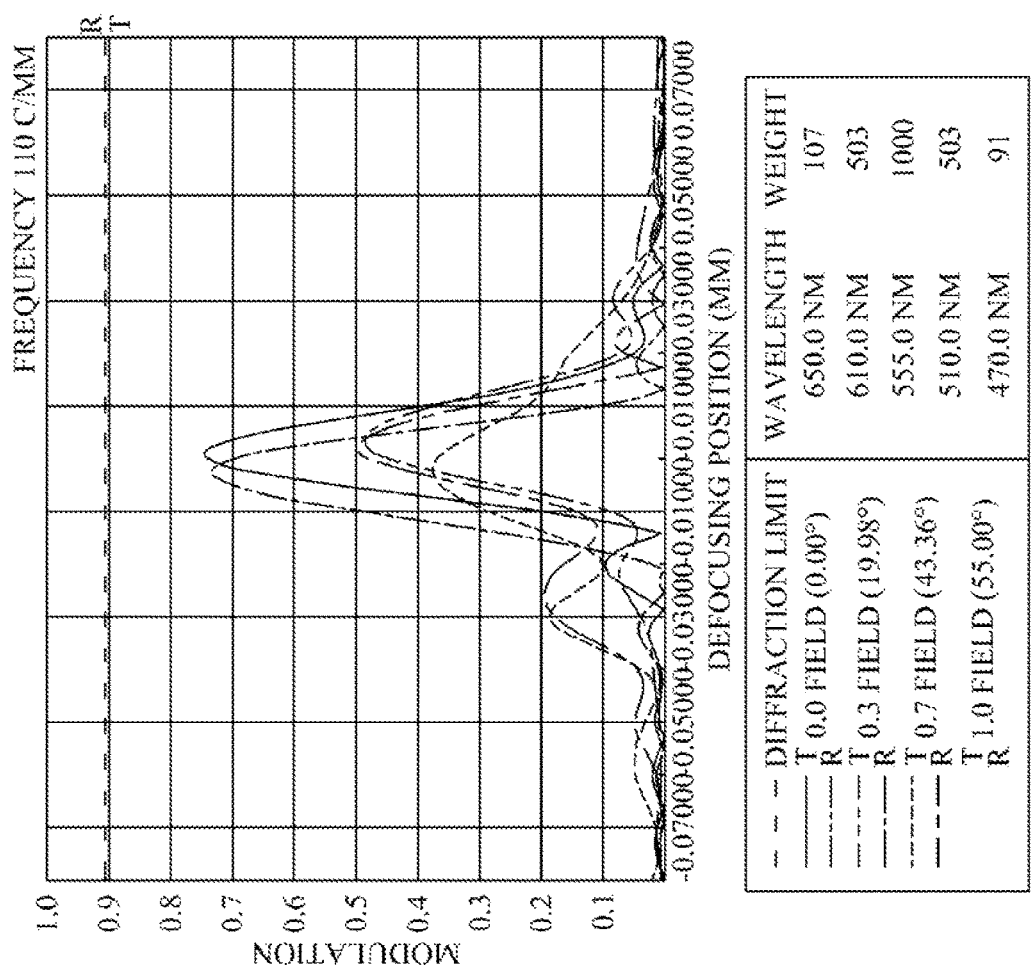
FIG. 2D is a diagram illustrating the through focus MTF values for the visible light spectrum at central field of view, 0.3 field of view and 0.7 field of view according to the second embodiment of the present disclosure.
Figure 2E:
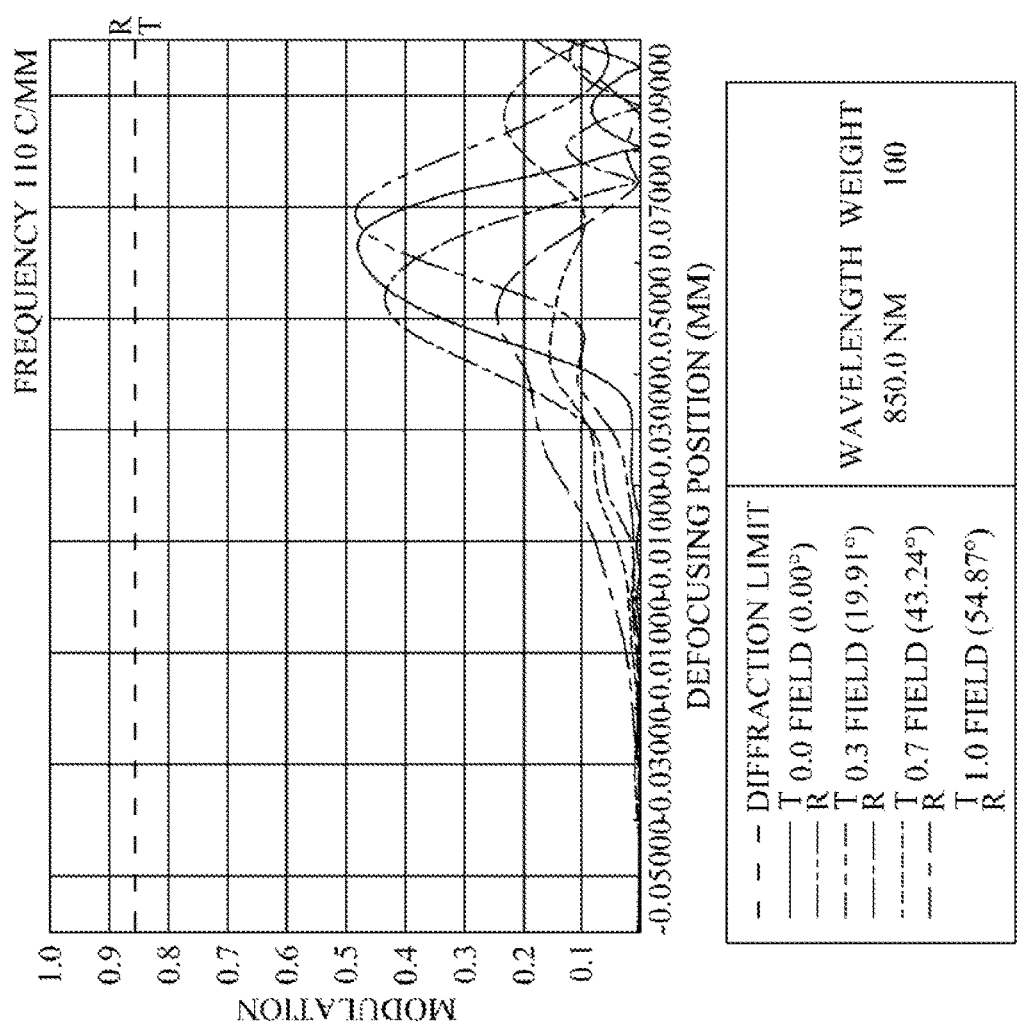
FIG. 2E is a diagram illustrating the through focus MTF values for the infrared light spectrum at central field of view, 0.3 field of view and 0.7 field of view according to the second embodiment of the present disclosure.

Please refer to FIG. 2A and FIG. 2B, wherein FIG. 2A is a schematic view of the optical image capturing system according to the second embodiment of the present invention and FIG. 2B shows the longitudinal spherical aberration curves, astigmatic field curves, and optical distortion curve of the optical image capturing system in the order from left to right according to the second embodiment of the present invention. FIG. 2C is a characteristic diagram of modulation transfer of the visible light spectrum according to the second embodiment of the present disclosure. FIG. 2D is a diagram illustrating the through focus MTF values for the visible light spectrum at central field of view, 0.3 field of view and 0.7 field of view according to the first embodiment of the present disclosure. FIG. 2E is a diagram illustrating the through focus MTF values for the infrared light spectrum at central field of view, 0.3 field of view and 0.7 field of view according to the second embodiment of the present disclosure.

As shown in FIG. 2A, in the order from the object side to the image side, the optical image capturing system includes a first lens 210, a second lens 220, an aperture 200, a third lens 230, a fourth lens 240, a fifth lens 250, a sixth lens 260, a seventh lens 270, an eighth lens 280, an infrared filter 290, a first image plane 292, a second image plane and an image sensing element 294.

The first lens 210 has negative refractive power and is made of plastic. The object side 212 of the first lens 210 is a concave surface and the image side 214 of the first lens 210 is a concave surface. Both the object side 212 and the image side 214 of the first lens 210 are aspheric. The object side 212 of the first lens 210 has one inflection point.

The second lens 220 has positive refractive power and is made of plastic. The object side 222 of the second lens 220 is a convex surface and the image side 224 of the second lens 220 is a convex surface. Both the object side 222 and the image side 224 of the second lens 220 are aspheric. The object side 222 of the second lens 220 has one inflection point.

The third lens 230 has positive refractive power and is made of plastic. The object side 232 of the third lens 230 is a convex surface and the image side 234 of the third lens 230 is a concave surface. Both the object side 232 and the image side 234 of the third lens 230 are aspheric. The image side 234 of the third lens 230 has two inflection points.

The fourth lens 240 has negative refractive power and is made of plastic. The object side 242 of the fourth lens 240 is a concave surface and the image side 244 of the fourth lens 240 is a concave surface. Both the object side 242 and the image side 244 of the fourth lens 240 are aspheric. The object side 242 of the fourth lens 240 has one inflection point and the image side 244 of the fourth lens 240 has two inflection points.

The fifth lens 250 has positive refractive power and is made of plastic. The object side 252 of the fifth lens 250 is a concave surface and the image side 254 of the fifth lens 250 is a convex surface. Both the object side 252 and the image side 254 of the fifth lens 250 are aspheric. Both the object side 252 and the image side 254 of the fifth lens 250 have one inflection point.

The sixth lens 260 has negative refractive power and is made of plastic. The object side 262 of the sixth lens 260 is a convex surface and the image side 264 of the sixth lens 260 is a concave surface. Both the object side 262 and the image side 264 of the sixth lens 260 are aspheric. Both the object side 262 and the image side 264 of the sixth lens 260 have one inflection point. Hereby, the incident angle on the sixth lens 260 at each field of view may be effectively adjusted so as to improve the aberration.

The seventh lens 270 has positive refractive power and is made of plastic. The object side 272 of the seventh lens is a convex surface and the image side 274 of the seventh lens is a concave surface. Both the object side 272 and the image side 274 of the seventh lens are aspheric. Hereby, this configuration is beneficial to shorten the back focal length of the optical image capturing system so as to keep its miniaturization. Besides, the image side 274 of the seventh lens has two inflection points. This configuration can reduce the incident angle of the off-axis rays effectively, thereby further correcting the off-axis aberration.

The eighth lens 280 has positive refractive power and is made of plastic. The object side 282 of the eighth lens is a convex surface and the image side 284 of the eighth lens is a concave surface. Both the object side 282 and the image side 284 of the eighth lens are aspheric. Hereby, this configuration is beneficial to shorten the back focal length of the optical image capturing system so as to keep its miniaturization. Besides, the object side 282 of the eighth lens has one inflection point. This configuration can reduce the incident angle of the off-axis rays effectively, thereby further correcting the off-axis aberration.

The infrared filter 290 is made of glass and is disposed between the eighth lens 280 and the first image plane 292. The infrared filter 290 does not affect the focal length of the optical image capturing system.

The contents in Table 3 and Table 4 below should be incorporated into the reference of the present embodiment.

TABLE 3

Lens Parameters for the Second Embodiment
f(focal length) = 6.3764 mm; f/HEP = 1.2; HAF(half angle of view) = 55.0002 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | −1158.176318 | 6.332 | Plastic | 1.565 | 58.00 | −13.326 |
| 2 | | 7.617712959 | 19.118 | | | | |
| 3 | Second Lens | 13.37024126 | 6.256 | Plastic | 1.565 | 54.50 | 13.023 |
| 4 | | −13.69509741 | −0.632 | | | | |
| 5 | Aperture | 1E+18 | 1.027 | | | | |
| 6 | Third Lens | 15.5909139 | 3.306 | Plastic | 1.565 | 58.00 | 45.728 |
| 7 | | 36.12772478 | 1.367 | | | | |
| 8 | Fourth Lens | −10.15029831 | 0.566 | Plastic | 1.661 | 20.40 | −13.255 |
| 9 | | 69.91832335 | 0.353 | | | | |
| 10 | Fifth Lens | −14.71547398 | 0.910 | Plastic | 1.565 | 58.00 | 32.640 |
| 11 | | −8.379458163 | 0.050 | | | | |
| 12 | Sixth Lens | 136.4586744 | 0.774 | Plastic | 1.661 | 20.40 | −30.906 |
| 13 | | 17.86369798 | 0.050 | | | | |

TABLE 3-continued

Lens Parameters for the Second Embodiment
f(focal length) = 6.3764 mm; f/HEP = 1.2; HAF(half angle of view) = 55.0002 deg

| Surface No | Curvature Radius | Thickness (mm) | Material | Refractive Index | Coefficient of Dispersion | Focal Length |
|---|---|---|---|---|---|---|
| 14 | Seventh Lens 6.433934702 | 3.051 | Plastic | 1.565 | 58.00 | 16.081 |
| 15 | 18.12431707 | 1.627 | | | | |
| 16 | Eighth Lens 30.67967561 | 0.525 | Plastic | 1.661 | 20.40 | 199.278 |
| 17 | 39.61629946 | 1.500 | | | | |
| 18 | Infrared Filter 1E+18 | 0.200 | BK_7 | 1.517 | 64.2 | |
| 19 | 1E+18 | 3.625 | | | | |
| 20 | First Image Plane 1E+18 | −0.008 | | | | |

Reference Wavelength (d-line): 555 nm

TABLE 4

The Aspheric Coefficients of the Second Embodiment
Table 4: Aspheric Coefficients

| Surface No | 1 | 2 | 3 | 4 | 6 | 7 |
|---|---|---|---|---|---|---|
| k | 5.000000E+01 | −4.007026E−01 | −3.689479E−01 | 5.210603E−01 | 3.559240E−02 | −7.591468E+00 |
| A4 | 8.745338E−06 | 4.480147E−05 | −7.353891E−05 | 2.637359E−04 | −1.821115E−04 | −8.465862E−04 |
| A6 | −3.776418E−08 | −1.721456E−08 | −1.054626E−06 | −3.804444E−06 | 8.969530E−07 | 9.176486E−06 |
| A8 | 9.650521E−11 | 4.170810E−09 | −1.640488E−08 | 3.077317E−08 | −2.359672E−08 | −4.634651E−08 |
| A10 | −8.234251E−14 | −9.460550E−11 | −8.438237E−11 | −1.539478E−10 | 1.403294E−09 | 6.216642E−10 |
| A12 | 0.000000E+00 | 0.000000E+00 | 0.000000E+00 | 0.000000E+00 | 0.000000E+00 | 0.000000E+00 |

| Surface No | 8 | 9 | 10 | 11 | 12 | 13 |
|---|---|---|---|---|---|---|
| k | 3.573161E−02 | −4.104538E+01 | −5.000000E+01 | −4.604627E+00 | −5.000000E+01 | −4.991656E+01 |
| A4 | 6.983037E−04 | −6.559872E−04 | −1.243135E−04 | 3.982165E−04 | −5.218646E−04 | 3.107251E−04 |
| A6 | −1.260809E−05 | 2.037929E−06 | 3.920058E−06 | −2.778222E−06 | −5.099145E−06 | 8.339285E−06 |
| A8 | 1.372702E−07 | 2.811369E−08 | 1.485200E−07 | 1.185545E−07 | 1.929204E−07 | −1.937994E−07 |
| A10 | 2.008860E−10 | 7.477176E−10 | 2.015974E−09 | 4.349302E−09 | −5.270665E−09 | −3.252633E−09 |
| A12 | 0.000000E+00 | 0.000000E+00 | 0.000000E+00 | 0.000000E+00 | 0.000000E+00 | 0.000000E+00 |

| Surface No | 14 | 15 | 16 | 17 |
|---|---|---|---|---|
| k | −7.206758E+00 | −7.069013E+00 | −5.000000E+01 | 6.618714E+00 |
| A4 | 4.497917E−04 | −1.065016E−03 | −5.344279E−04 | 2.287351E−05 |
| A6 | −1.374238E−05 | 2.020802E−05 | −8.414056E−06 | −3.150623E−07 |
| A8 | 1.340484E−07 | −9.454363E−07 | 2.234396E−08 | 5.208044E−07 |
| A10 | 3.920312E−09 | 1.946195E−08 | −1.657816E−09 | −6.182816E−09 |
| A12 | 0.000000E+00 | 0.000000E+00 | 0.000000E+00 | 0.000000E+00 |

In the second embodiment, the form of the aspheric surface equation therein is presented as that in the first embodiment. Besides, the definition of parameters in the following tables is equivalent to that in the first embodiment, so that the repetitive details are not stated here.

The following conditional values may be obtained according to the data in Table 3 and Table 4.

Second Embodiment (Primary Reference Wavelength = 555 nm)

| MTFE0 | MTFE3 | MTFE7 | MTFQ0 | MTFQ3 | MTFQ7 |
|---|---|---|---|---|---|
| 0.85 | 0.69 | 0.63 | 0.67 | 0.35 | 0.35 |
| ETP1 | ETP2 | ETP3 | ETP4 | ETP5 | ETP6 |
| 6.809 | 5.745 | 3.144 | 0.908 | 0.729 | 0.956 |
| ETP7 | ETP8 | ETL | EBL | EIN | EIR |
| 2.724 | 0.541 | 50.003 | 5.225 | 44.778 | 1.408 |
| PIR | EIN/ETL | SETP/EIN | EIR/PIR | BL | EBL/BL |
| 1.500 | 0.896 | 0.481 | 0.939 | 5.3167 | 0.9828 |
| ETP1/TP1 | ETP2/TP2 | ETP3/TP3 | ETP4/TP4 | ETP5/TP5 | ETP6/TP6 |
| 1.075 | 0.918 | 0.951 | 1.602 | 0.801 | 1.234 |
| ETP7/TP7 | ETP8/TP8 | ED78 | | ED78/IN78 | |
| 0.893 | 1.030 | 1.563 | | 0.960 | |
| SETP | STP | SETP/STP | SED | SIN | SED/SIN |
| 21.555 | 21.722 | 0.992 | 23.223 | 22.961 | 1.011 |
| ED12 | ED23 | ED34 | ED45 | ED56 | ED67 |
| 18.905 | 0.864 | 0.986 | 0.147 | 0.418 | 0.339 |
| ED12/IN12 | ED23/IN23 | ED34/IN34 | ED45/IN45 | ED56/IN56 | ED67/IN67 |
| 0.989 | 2.187 | 0.721 | 0.417 | 8.356 | 6.779 |
| |f/f1| | |f/f2| | |f/f3| | |f/f4| | |f/f5| | |f/f6| |
| 0.4785 | 0.4896 | 0.1394 | 0.4810 | 0.1954 | 0.2063 |
| |f/f7| | |f/f8| | |f1/f2| | |f2/f3| | |f6/f7| | |f7/f8| |

-continued

| Second Embodiment (Primary Reference Wavelength = 555 nm) | | | | | |
|---|---|---|---|---|---|
| 0.3965 | 0.0320 | 1.0233 | 0.2848 | 1.9219 | 0.0807 |
| IN12/f | IN78/f | (TP1 + IN12)/TP2 | | (TP8 + IN78)/TP7 | |
| 2.9982 | 0.2552 | 4.0682 | | 0.7055 | |
| HOS | InTL | HOS/HOI | InS/HOS | ODT % | TDT % |
| 50.0000 | 44.6833 | 6.6667 | 0.3785 | −17.5935 | 7.4738 |
| HVT11 | HVT12 | HVT21 | HVT22 | HVT31 | HVT32 |
| 5.4701 | 0.0000 | 7.8404 | 0.0000 | 0.0000 | 3.0541 |
| HVT41 | HVT42 | HVT51 | HVT52 | HVT61 | HVT62 |
| 0.0000 | 2.3428 | 4.9474 | 5.2576 | 1.8317 | 0.0000 |
| HVT71 | HVT72 | HVT81 | HVT82 | HVT82/HOI | HVT82/HOS |
| 0.0000 | 3.7425 | 3.1632 | 0.0000 | 0.0000 | 0.0000 |
| VSFS0 | VSFS3 | VSFS7 | VTFS0 | VTFS3 | VTFS7 |
| 0.000 mm | 0.000 mm | 0.000 mm | 0.000 mm | 0.000 mm | 0.000 mm |
| VSMTF0 | VSMTF3 | VSMTF7 | VTMTF0 | VTMTF3 | VTMTF7 |
| 0.742 | 0.703 | 0.478 | 0.742 | 0.449 | 0.369 |
| ISFS0 | ISFS3 | ISFS7 | ITFS0 | ITFS3 | ITFS7 |
| 0.060 mm | 0.050 mm | 0.050 mm | 0.060 mm | 0.070 mm | 0.090 mm |
| ISMTF0 | ISMTF3 | ISMTF7 | ITMTF0 | ITMTF3 | ITMTF7 |
| 0.472 | 0.419 | 0.245 | 0.472 | 0.482 | 0.224 |
| FS | | AIFS | AVFS | | AFS |
| 0.060 mm | | 0.063 mm | 0.000 mm | | 0.063 mm |

The following conditional values may be obtained according to the data in Table 3 and Table 4.

| Values Related to Inflection Point of Second Embodiment (Primary Reference Wavelength = 555 nm) | | | | | | | |
|---|---|---|---|---|---|---|---|
| HIF111 | 3.0139 | HIF111/HOI | 0.4019 | SGI111 | −0.0032 | \|SGI111\|/(\|SGI111\| + TP1) | 0.0005 |
| HIF211 | 5.5188 | HIF211/HOI | 0.7358 | SGI211 | 1.0570 | \|SGI211\|/(\|SGI211\| + TP2) | 0.1445 |
| HIF321 | 1.6988 | HIF321/HOI | 0.2265 | SGI321 | 0.0330 | \|SGI321\|/(\|SGI321\| + TP3) | 0.0099 |
| HIF322 | 6.1144 | HIF322/HOI | 0.8152 | SGI322 | −0.253842 | \|SGI322\|/(\|SGI322\| + TP3) | 0.0713 |
| HIF411 | 5.9363 | HIF411/HOI | 0.7915 | SGI411 | −1.3869 | \|SGI411\|/(\|SGI411\| + TP4) | 0.7100 |
| HIF421 | 1.3432 | HIF421/HOI | 0.1791 | SGI421 | 0.0107 | \|SGI421\|/(\|SGI421\| + TP4) | 0.0186 |
| HIF422 | 6.0427 | HIF422/HOI | 0.8057 | SGI422 | −0.4328 | \|SGI422\|/(\|SGI422\| + TP4) | 0.4331 |
| HIF511 | 3.2882 | HIF511/HOI | 0.4384 | SGI511 | −0.2645 | \|SGI511\|/(\|SGI511\| + TP5) | 0.2251 |
| HIF521 | 3.3722 | HIF521/HOI | 0.4496 | SGI521 | −0.5507 | \|SGI521\|/(\|SGI521\| + TP5) | 0.3769 |
| HIF611 | 1.0656 | HIF611/HOI | 0.1421 | SGI611 | 0.0035 | \|SGI611\|/(\|SGI611\| + TP6) | 0.0045 |
| HIF621 | 4.8554 | HIF621/HOI | 0.6474 | SGI621 | 0.6176 | \|SGI621\|/(\|SGI621\| + TP6) | 0.4437 |
| HIF721 | 2.1128 | HIF721/HOI | 0.2817 | SGI721 | 0.1009 | \|SGI721\|/(\|SGI721\| + TP7) | 0.0320 |
| HIF722 | 5.1581 | HIF722/HOI | 0.6877 | SGI722 | 0.0733 | \|SGI722\|/(\|SGI722\| + TP7) | 0.0235 |
| HIF811 | 1.8666 | HIF811/HOI | 0.2489 | SGI811 | 0.0476 | \|SGI811\|/(\|SGI811\| + TP8) | 0.0830 |

Third Embodiment

Figure 3A:
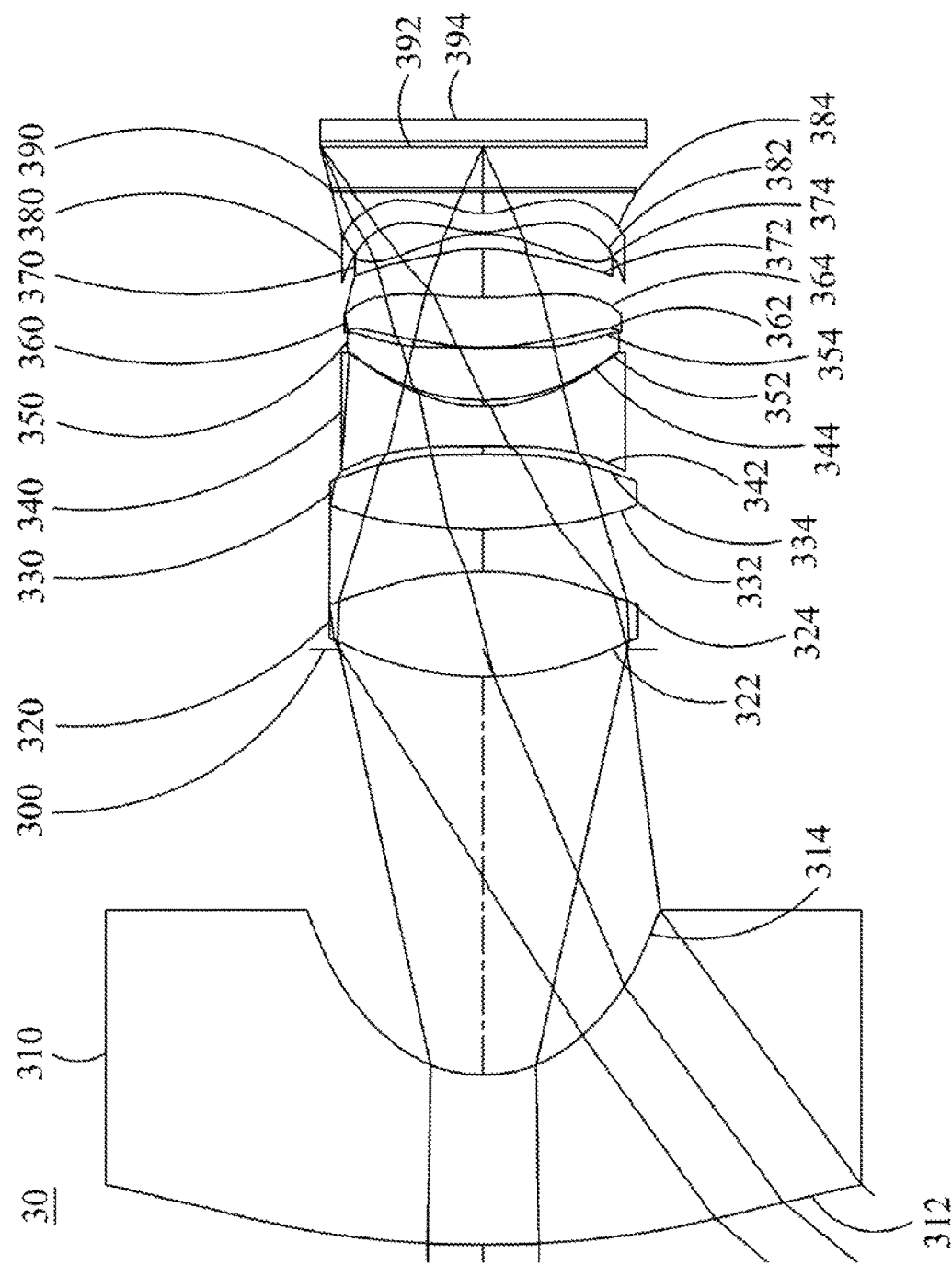
FIG. 3A is a schematic view of the optical image capturing system according to the third embodiment of the present invention.
Figure 3B:
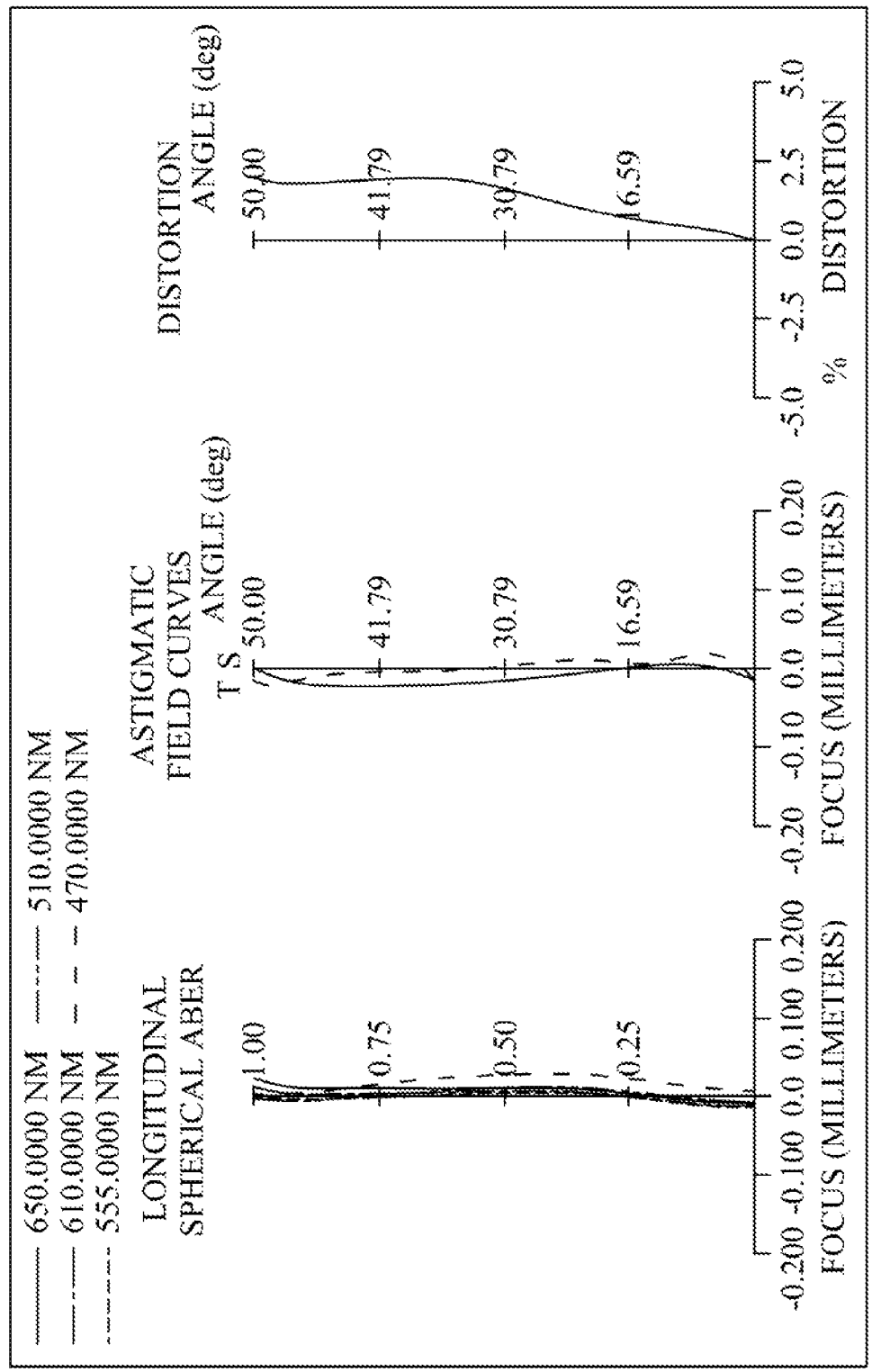
FIG. 3B shows the longitudinal spherical aberration curves, astigmatic field curves, and optical distortion curve of the optical image capturing system in the order from left to right according to the third embodiment of the present invention.
Figure 3C:
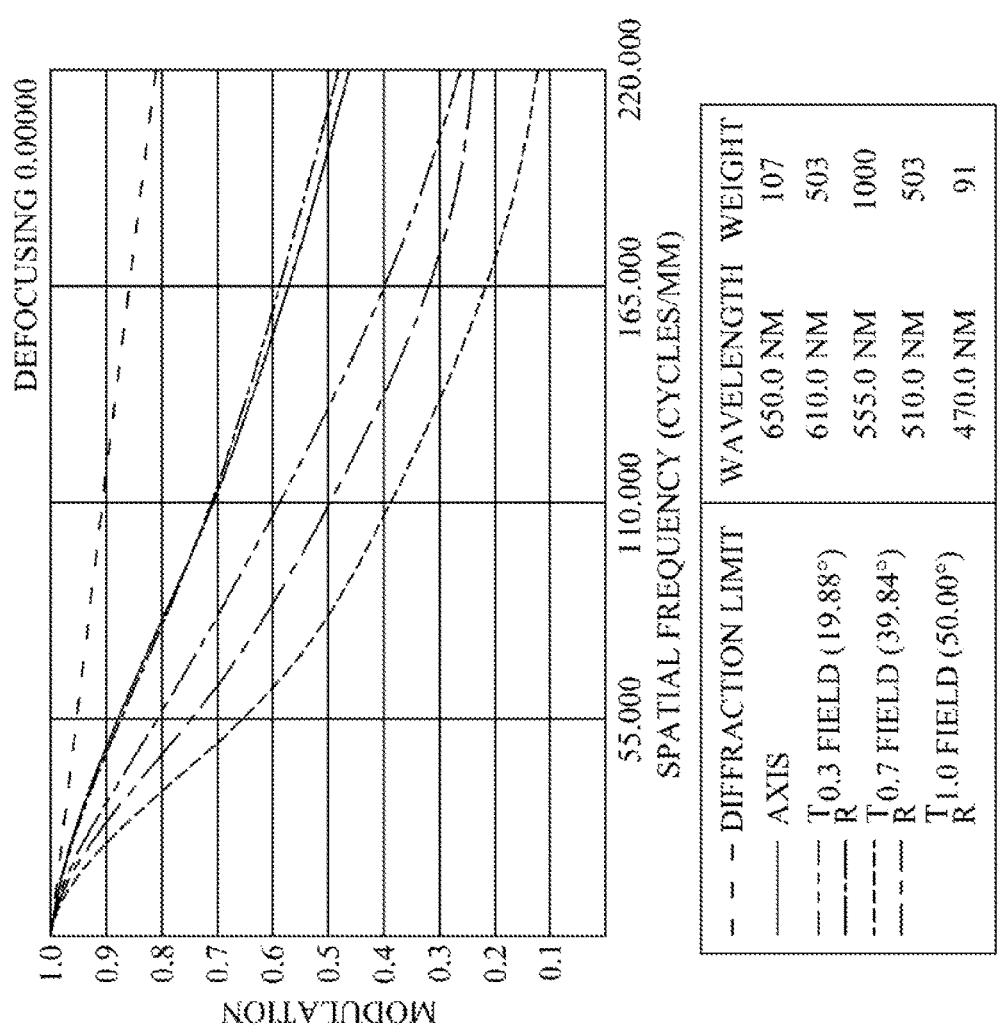
FIG. 3C is a characteristic diagram of modulation transfer of the visible light spectrum according to the third embodiment of the present disclosure.
Figure 3D:
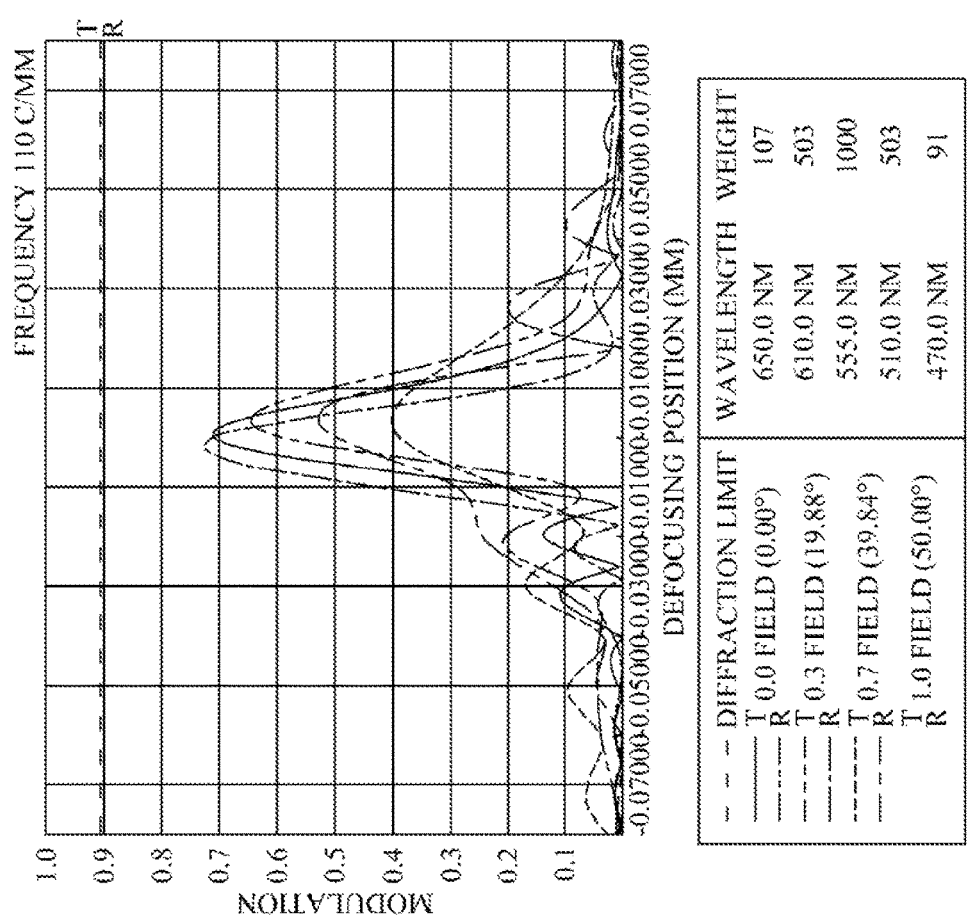
FIG. 3D is a diagram illustrating the through focus MTF values for the visible light spectrum at central field of view, 0.3 field of view and 0.7 field of view according to the third embodiment of the present disclosure.
Figure 3E:
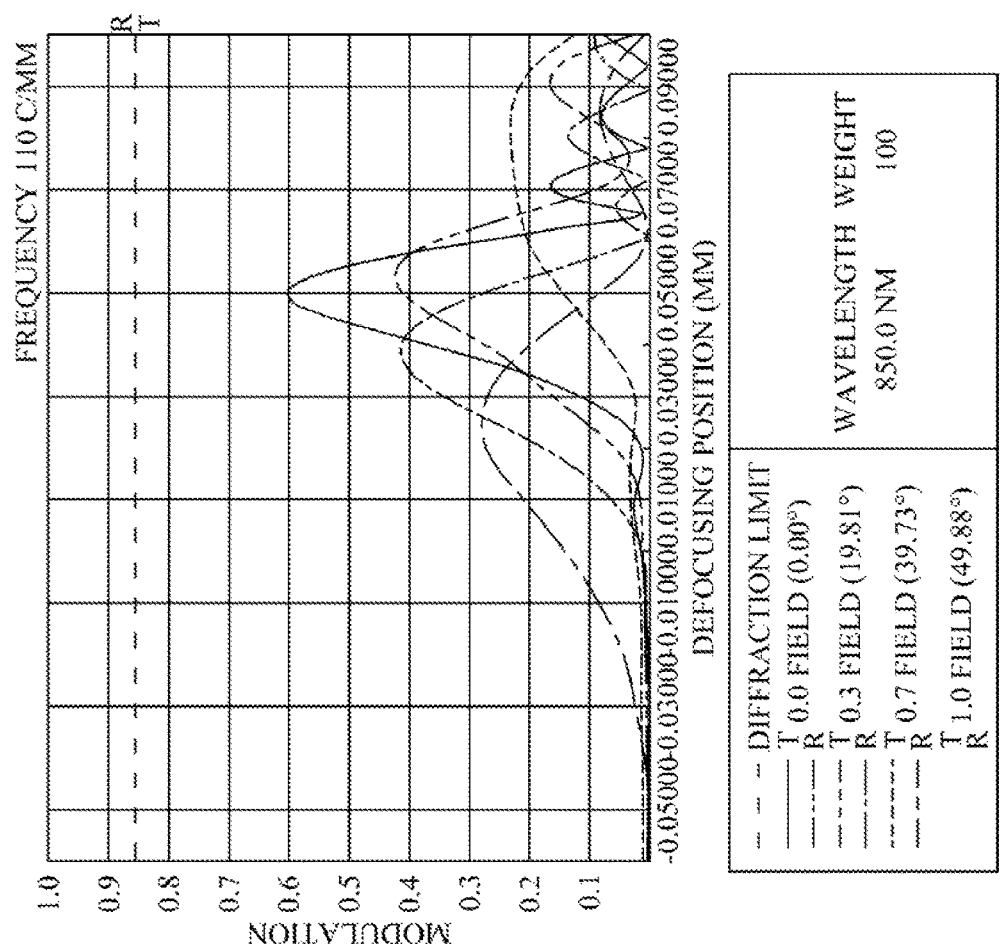
FIG. 3E is a diagram illustrating the through focus MTF values for the infrared light spectrum at central field of view, 0.3 field of view and 0.7 field of view according to the third embodiment of the present disclosure.

Please refer to FIG. 3A and FIG. 3B, wherein FIG. 3A is a schematic view of the optical image capturing system according to the third embodiment of the present invention and FIG. 3B shows the longitudinal spherical aberration curves, astigmatic field curves, and optical distortion curve of the optical image capturing system in the order from left to right according to the third embodiment of the present invention. FIG. 3C is a characteristic diagram of modulation transfer of the visible light spectrum according to the third embodiment of the present disclosure. FIG. 3D is a diagram illustrating the through focus MTF values for the visible light spectrum at central field of view, 0.3 field of view and 0.7 field of view according to the first embodiment of the present disclosure. FIG. 3E is a diagram illustrating the through focus MTF values for the infrared light spectrum at central field of view, 0.3 field of view and 0.7 field of view according to the third embodiment of the present disclosure.

As shown in FIG. 3A, in the order from an object-side surface to an image-side surface, the optical image capturing system includes a first lens 310, an aperture 300, a second lens 320, a third lens 330, a fourth lens 340, a fifth lens 350, a sixth lens 360, a seventh lens 370, an eighth lens 380, an infrared filter 390, a first image plane 392, a second image plane and an image sensing element 394.

The first lens 310 has negative refractive power and is made of plastic. The object side 312 of the first lens 310 is a convex surface and the image side 314 of the first lens 310 is a concave surface. Both the object side 312 and the image side 314 of the first lens 310 are aspheric. The object side 312 of the first lens 310 has one inflection point.

The second lens 320 has positive refractive power and is made of plastic. The object side 322 of the second lens 320 is a convex surface and the image side 324 of the second lens 320 is a convex surface. Both the object side 322 and the image side 324 of the second lens 320 are aspheric.

The third lens 330 has positive refractive power and is made of plastic. The object side 332 of the third lens 330 is a convex surface and the image side 334 of the third lens 330 is a convex surface. Both the object side 332 and the image side 334 of the third lens are aspheric. The image side 334 of the third lens has one inflection point.

The fourth lens 340 has negative refractive power and is made of plastic. The object side 342 of the fourth lens 340 is a concave surface and the image side 344 of the fourth lens 340 is a concave surface. Both the object side 342 and the image side 344 of the fourth lens 340 are aspheric. The object side 342 of the fourth lens has one inflection point.

The fifth lens 350 has positive refractive power and is made of plastic. The object side 352 of the fifth lens 350 is a convex surface and the image side 354 of the fifth lens 350 is a convex surface. Both the object side 352 and the image side 354 of the fifth lens 350 are aspheric. The image side 354 of the fifth lens 350 has two inflection points.

The sixth lens 360 has positive refractive power and is made of plastic. The object side 362 of the sixth lens 360 is a convex surface and the image side 364 of the sixth lens 360 is a concave surface. Both the object side 362 and the image side 364 of the sixth lens 360 are aspheric. Both the object side 362 and the image side 364 of the sixth lens 360 have one inflection point. Hereby, the incident angle on the sixth lens 360 at each field of view may be effectively adjusted so as to improve the aberration.

The seventh lens 370 has positive refractive power and is made of plastic. The object side 372 of the seventh lens is a concave surface and the image side 374 of the seventh lens is a convex surface. Both the object side 372 and the image side 374 of the seventh lens are aspheric. Hereby, the configuration is beneficial to shorten the back focal length of the optical image capturing system so as to keep its miniaturization. Besides, both the object side 372 and the image side 374 of the seventh lens have one inflection point and the incident angle of the off-axis rays can be reduced effectively, thereby further correcting the off-axis aberration.

The eighth lens 380 has negative refractive power and is made of plastic. The object side 382 of the eighth lens is a convex surface and the image side 384 of the eighth lens is a concave surface. Both the object side 382 and the image side 384 of the eighth lens are aspheric. Hereby, the configuration is beneficial to shorten the back focal length of the optical image capturing system so as to keep its miniaturization. Besides, both the object side 382 and the image side 384 of the eighth lens have one inflection point, and the incident angle of the off-axis rays can be reduced effectively, thereby further correcting the off-axis aberration.

The infrared filter 390 is made of glass and is disposed between the eighth lens 380 and the first image plane 392. The infrared filter 390 does not affect the focal length of the optical image capturing system.

The contents in Table 5 and Table 6 below should be incorporated into the reference of the present embodiment.

TABLE 5

Lens Parameters for the Third Embodiment
f(focal length) = 6.1648 mm; f/HEP = 1.2; HAF(half angle of view) = 49.9999 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 54.81314607 | 7.995 | Plastic | 1.565 | 58.00 | −13.317 |
| 2 | | 6.284050813 | 20.021 | | | | |
| 3 | Aperture | 1E+18 | −1.328 | | | | |
| 4 | Second Lens | 12.99154508 | 4.937 | Plastic | 1.565 | 54.50 | 12.905 |
| 5 | | −14.44355481 | 2.003 | | | | |
| 6 | Third Lens | 23.52813799 | 3.515 | Plastic | 1.543 | 56.50 | 25.779 |
| 7 | | −32.99833585 | 0.386 | | | | |
| 8 | Fourth Lens | −50.57829115 | 1.874 | Plastic | 1.661 | 20.40 | −8.706 |
| 9 | | 6.65502044 | 0.304 | | | | |
| 10 | Fifth Lens | 9.990243724 | 2.438 | Plastic | 1.565 | 58.00 | 17.515 |
| 11 | | −1429.027789 | 0.050 | | | | |
| 12 | Sixth Lens | 12.71223434 | 2.349 | Plastic | 1.565 | 58.00 | 62.073 |
| 13 | | 18.57368315 | 2.245 | | | | |
| 14 | Seventh Lens | −5.41231417 | 0.748 | Plastic | 1.565 | 58.00 | 23.578 |
| 15 | | −4.044623666 | 0.050 | | | | |
| 16 | Eighth Lens | 3.980510886 | 0.896 | Plastic | 1.661 | 20.40 | −89.901 |
| 17 | | 3.396424336 | 1.000 | | | | |
| 18 | Infrared Filter | 1E+18 | 0.200 | BK_7 | 1.517 | 64.2 | |
| 19 | | 1E+18 | 1.884 | | | | |
| 20 | First Image Plane | 1E+18 | 0.014 | | | | |

Reference Wavelength (d-line): 555 nm

TABLE 6

The Aspheric Coefficients of the Third Embodiment
Table 6: Aspheric Coefficients

| Surface No | 1 | 2 | 4 | 5 | 6 | 7 |
|---|---|---|---|---|---|---|
| k | 3.370127E+00 | −5.723285E−01 | −4.300995E−01 | 4.644583E−01 | −6.551540E+00 | 9.035099E+00 |
| A4 | 1.699406E−05 | 1.245508E−04 | −4.871245E−05 | 1.893597E−04 | −1.133139E−04 | −2.387423E−04 |
| A6 | −1.069473E−07 | 9.426423E−07 | −1.984065E−07 | −5.041696E−07 | 4.541605E−06 | −4.205935E−07 |
| A8 | 1.465769E−10 | 5.492683E−09 | −1.267792E−08 | −1.354202E−08 | −6.808611E−08 | 2.041335E−08 |
| A10 | −5.695906E−14 | −1.307686E−10 | 1.198372E−10 | 2.365872E−10 | 1.041814E−09 | 3.522812E−10 |
| A12 | 0.000000E+00 | 0.000000E+00 | 0.000000E+00 | 0.000000E+00 | 0.000000E+00 | 0.000000E+00 |

| Surface No | 8 | 9 | 10 | 11 | 12 | 13 |
|---|---|---|---|---|---|---|
| k | 2.915106E+01 | −1.711866E−01 | 8.989668E−01 | 5.000000E+01 | −1.060362E+01 | −1.916015E+01 |
| A4 | −2.386921E−04 | −8.347412E−04 | 1.414611E−04 | 6.603477E−04 | −2.840374E−04 | −8.231024E−04 |
| A6 | −6.549488E−06 | 5.094793E−06 | −9.569978E−06 | 1.266918E−05 | 6.019801E−06 | −1.152206E−05 |
| A8 | 3.567825E−08 | −9.231836E−08 | 2.012949E−07 | −4.607499E−07 | 5.758939E−07 | 4.484477E−07 |
| A10 | 1.071550E−09 | −1.433059E−09 | −4.444287E−09 | 5.721538E−10 | −1.745097E−08 | −6.051907E−09 |
| A12 | 0.000000E+00 | 0.000000E+00 | 0.000000E+00 | 0.000000E+00 | 0.000000E+00 | 0.000000E+00 |

TABLE 6-continued

The Aspheric Coefficients of the Third Embodiment
Table 6: Aspheric Coefficients

| Surface No | 14 | 15 | 16 | 17 |
|---|---|---|---|---|
| k | −2.550824E+01 | −6.658597E+00 | −1.222669E+01 | −9.226652E+00 |
| A4 | 1.628115E−04 | −1.756415E−04 | −1.875923E−03 | −2.022724E−03 |
| A6 | −2.234133E−05 | 1.309262E−05 | −1.205117E−05 | 1.561214E−05 |
| A8 | 1.681755E−07 | 2.328071E−07 | 9.303431E−07 | −1.440317E−08 |
| A10 | 4.641000E−09 | −1.041996E−10 | −1.977824E−08 | −3.400772E−09 |
| A12 | 0.000000E+00 | 0.000000E+00 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the conditional expressions can be obtained from the data in Table 5 and Table 6.

Third Embodiment (Primary Reference Wavelength = 555 nm)

| MTFE0 | MTFE3 | MTFE7 | MTFQ0 | MTFQ3 | MTFQ7 |
|---|---|---|---|---|---|
| 0.88 | 0.81 | 0.65 | 0.71 | 0.58 | 0.38 |
| ETP1 | ETP2 | ETP3 | ETP4 | ETP5 | ETP6 |
| 8.475 | 4.461 | 3.269 | 2.430 | 2.122 | 2.247 |
| ETP7 | ETP8 | ETL | EBL | EIN | EIR |
| 0.506 | 0.979 | 51.519 | 2.608 | 48.912 | 0.510 |
| PIR | EIN/ETL | SETP/EIN | EIR/PIR | BL | EBL/BL |
| 1.000 | 0.949 | 0.501 | 0.510 | 3.0976 | 0.8419 |
| ETP1/TP1 | ETP2/TP2 | ETP3/TP3 | ETP4/TP4 | ETP5/TP5 | ETP6/TP6 |
| 1.060 | 0.904 | 0.930 | 1.297 | 0.870 | 0.956 |
| ETP7/TP7 | ETP8/TP8 | ED78 | ED78/IN78 | | |
| 0.677 | 1.093 | 1.040 | 20.802 | | |
| SETP | STP | SETP/STP | SED | SIN | SED/SIN |
| 24.489 | 24.753 | 0.989 | 24.423 | 23.730 | 1.029 |
| ED12 | ED23 | ED34 | ED45 | ED56 | ED67 |
| 18.406 | 2.360 | 0.419 | 0.172 | 0.249 | 1.777 |
| ED12/IN12 | ED23/IN23 | ED34/IN34 | ED45/IN45 | ED56/IN56 | ED67/IN67 |
| 0.985 | 1.178 | 1.086 | 0.566 | 4.982 | 0.791 |
| \|f/f1\| | \|f/f2\| | \|f/f3\| | \|f/f4\| | \|f/f5\| | \|f/f6\| |
| 0.4629 | 0.4777 | 0.2391 | 0.7081 | 0.3520 | 0.0993 |
| \|f/f7\| | \|f/f8\| | \|f1/f2\| | \|f2/f3\| | \|f6/f7\| | \|f7/f8\| |
| 0.2615 | 0.0686 | 1.0319 | 0.5006 | 2.6327 | 0.2623 |
| IN12/f | IN78/f | (TP1 + IN12)/TP2 | | (TP8 + IN78)/TP7 | |
| 3.0322 | 0.0081 | 5.4059 | | 1.2659 | |
| HOS | InTL | HOS/HOI | InS/HOS | ODT % | TDT % |
| 51.5805 | 48.4829 | 6.8774 | 0.4568 | 2.0066 | 0.2173 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 0.0000 | 0.0000 | 0.5127 | 5.7997 | 3.3875 |
| HVT71 | HVT72 | HVT81 | HVT82 | HVT82/HOI | HVT82/HOS |
| 0.0000 | 5.2230 | 3.3227 | 3.6251 | 0.4833 | 0.0703 |
| VSFS0 | VSFS3 | VSFS7 | VTFS0 | VTFS3 | VTFS7 |
| 0.000 mm | 0.000 mm | 0.000 mm | 0.000 mm | 0.000 mm | 0.000 mm |
| VSMTF0 | VSMTF3 | VSMTF7 | VTMTF0 | VTMTF3 | VTMTF7 |
| 0.708 | 0.711 | 0.497 | 0.708 | 0.590 | 0.388 |
| ISFS0 | ISFS3 | ISFS7 | ITFS0 | ITFS3 | ITFS7 |
| 0.050 mm | 0.040 mm | 0.020 mm | 0.050 mm | 0.050 mm | 0.080 mm |
| ISMTF0 | ISMTF3 | ISMTF7 | ITMTF0 | ITMTF3 | ITMTF7 |
| 0.602 | 0.413 | 0.272 | 0.602 | 0.410 | 0.232 |
| FS | | AIFS | | AVFS | AFS |
| 0.050 mm | | 0.048 mm | | 0.000 mm | 0.048 mm |

The following values for the conditional expressions can be obtained from the data in Table 5 and Table 6.

Values Related to Inflection Point of Third Embodiment (Primary Reference Wavelength = 555 nm)

| HIF111 | 14.2439 | HIF111/HOI | 1.8992 | SGI111 | 2.0473 | \|SGI111\|/(\|SGI111\| + TP1) | 0.2039 |
|---|---|---|---|---|---|---|---|
| HIF321 | 6.6357 | HIF321/HOI | 0.8848 | SGI321 | −1.1173 | \|SGI321\|/(\|SGI321\| + TP3) | 0.2412 |
| HIF521 | 0.2964 | HIF521/HOI | 0.0395 | SGI521 | −0.000026 | \|SGI521\|/(\|SGI521\| + TP5) | 0.0000 |
| HIF522 | 5.2345 | HIF522/HOI | 0.6979 | SGI522 | 0.4959 | \|SGI522\|/(\|SGI522\| + TP5) | 0.1690 |
| HIF611 | 4.7523 | HIF611/HOI | 0.6336 | SGI611 | 0.6738 | \|SGI611\|/(\|SGI611\| + TP6) | 0.2229 |
| HIF621 | 1.9439 | HIF621/HOI | 0.2592 | SGI621 | 0.0848 | \|SGI621\|/(\|SGI621\| + TP6) | 0.0348 |
| HIF711 | 5.3259 | HIF711/HOI | 0.7101 | SGI711 | −1.0622 | \|SGI711\|/(\|SGI711\| + TP7) | 0.5869 |
| HIF721 | 3.0998 | HIF721/HOI | 0.4133 | SGI721 | −0.7741 | \|SGI721\|/(\|SGI721\| + TP7) | 0.5087 |
| HIF811 | 1.5576 | HIF811/HOI | 0.2077 | SGI811 | 0.2189 | \|SGI811\|/(\|SGI811\| + TP8) | 0.1963 |
| HIF821 | 1.6199 | HIF821/HOI | 0.2160 | SGI821 | 0.2731 | \|SGI821\|/(\|SGI821\| + TP8) | 0.2335 |

Fourth Embodiment

Figure 4A:
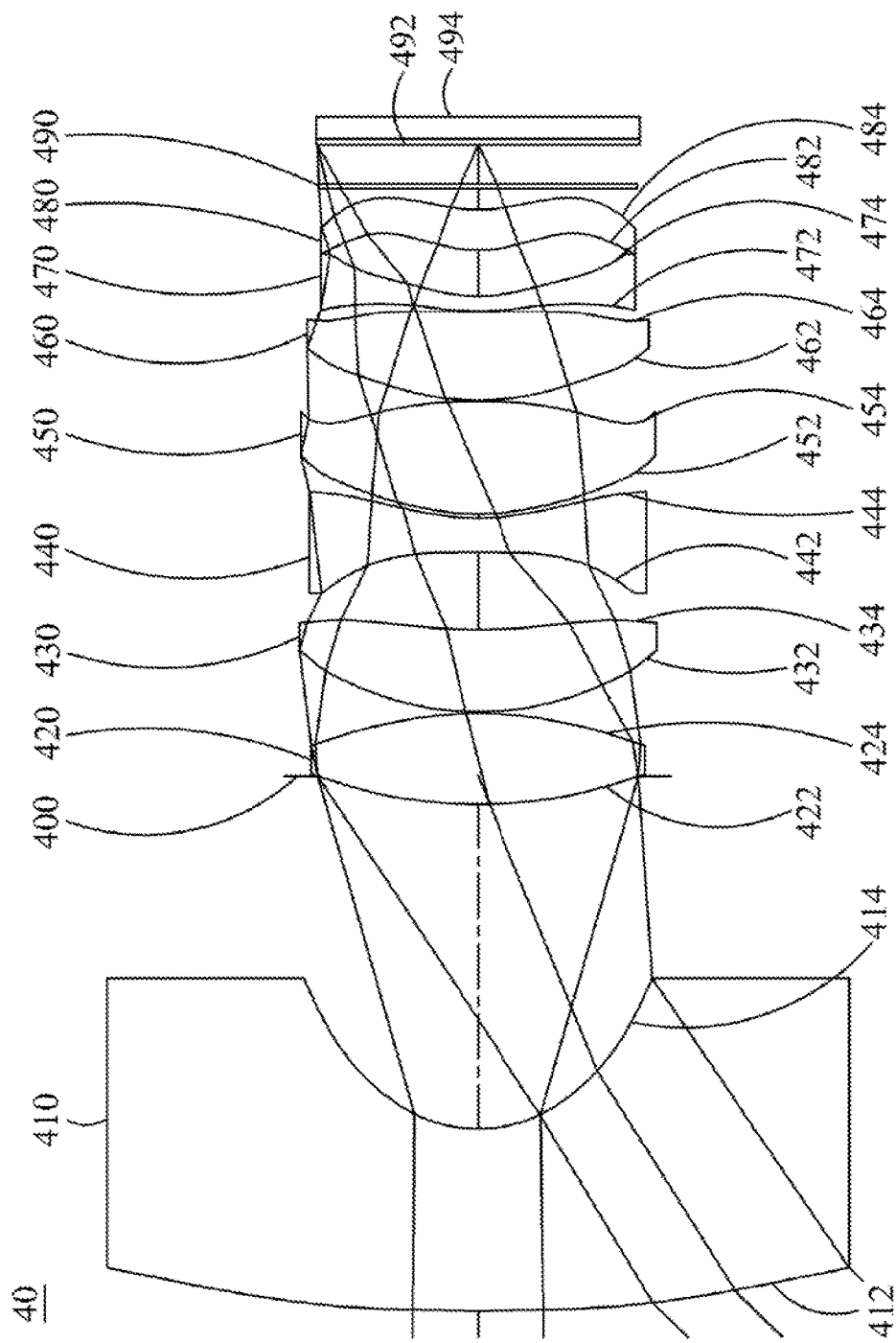
FIG. 4A is a schematic view of the optical image capturing system according to the fourth embodiment of the present invention.
Figure 4B:
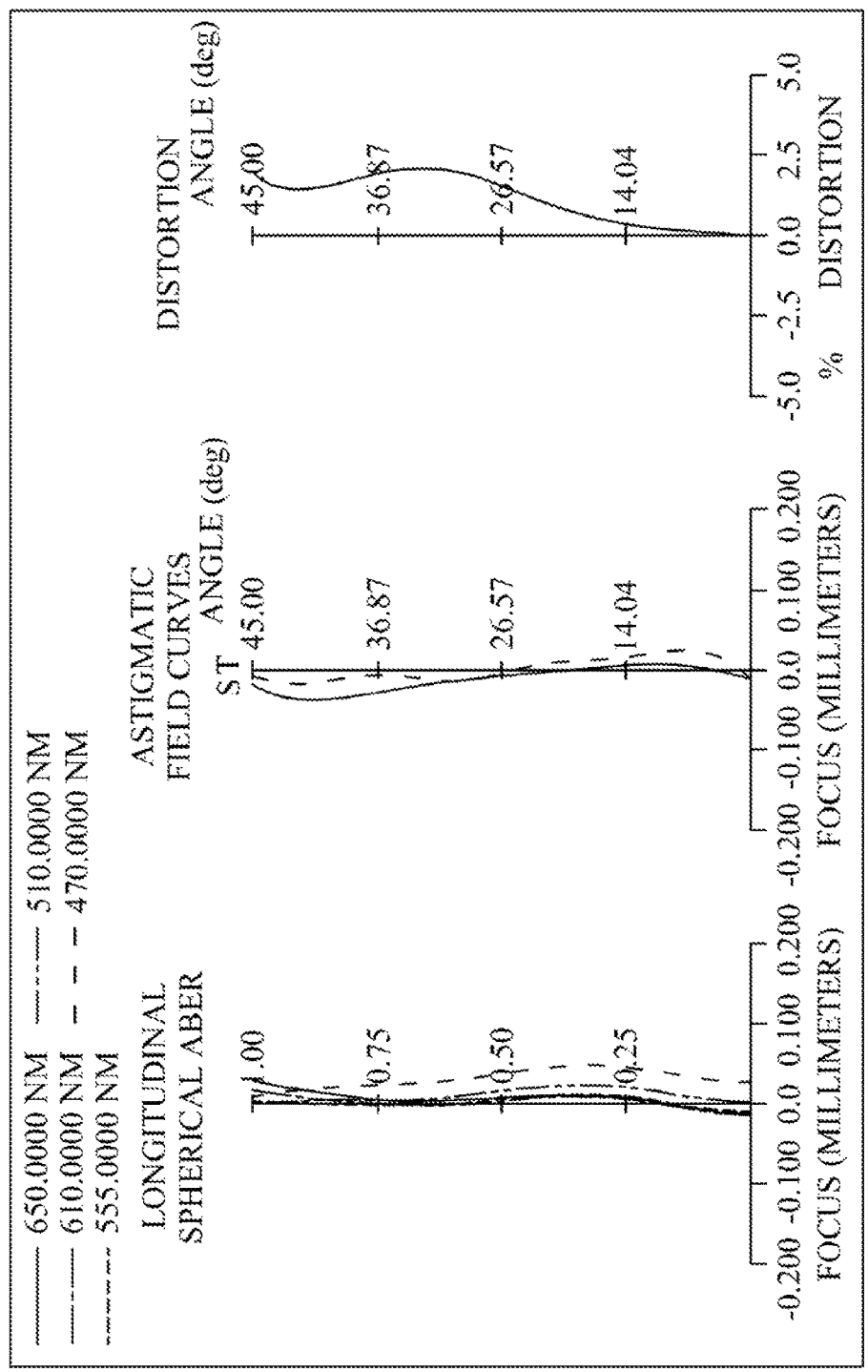
FIG. 4B shows the longitudinal spherical aberration curves, astigmatic field curves, and optical distortion curve of the optical image capturing system in the order from left to right according to the fourth embodiment of the present invention.
Figure 4C:
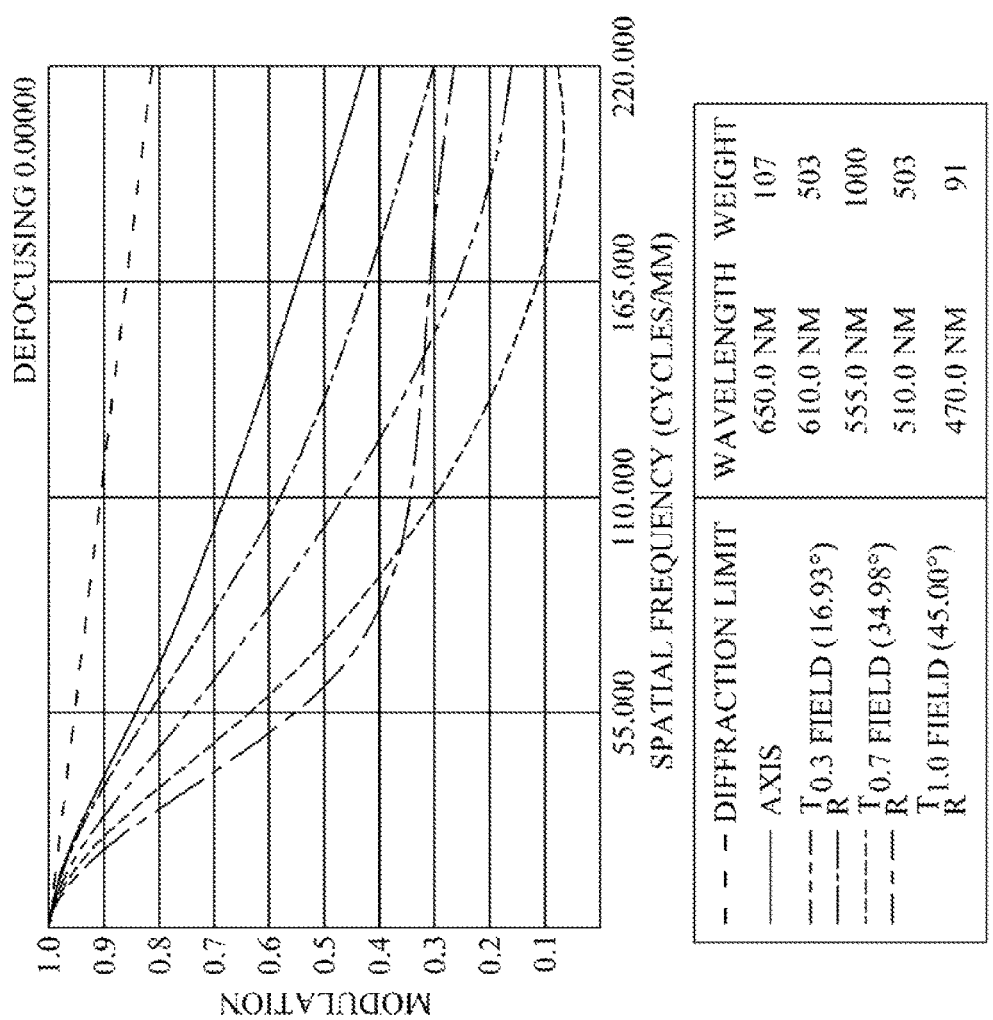
FIG. 4C is a characteristic diagram of modulation transfer of the visible light spectrum according to the fourth embodiment of the present disclosure.
Figure 4D:
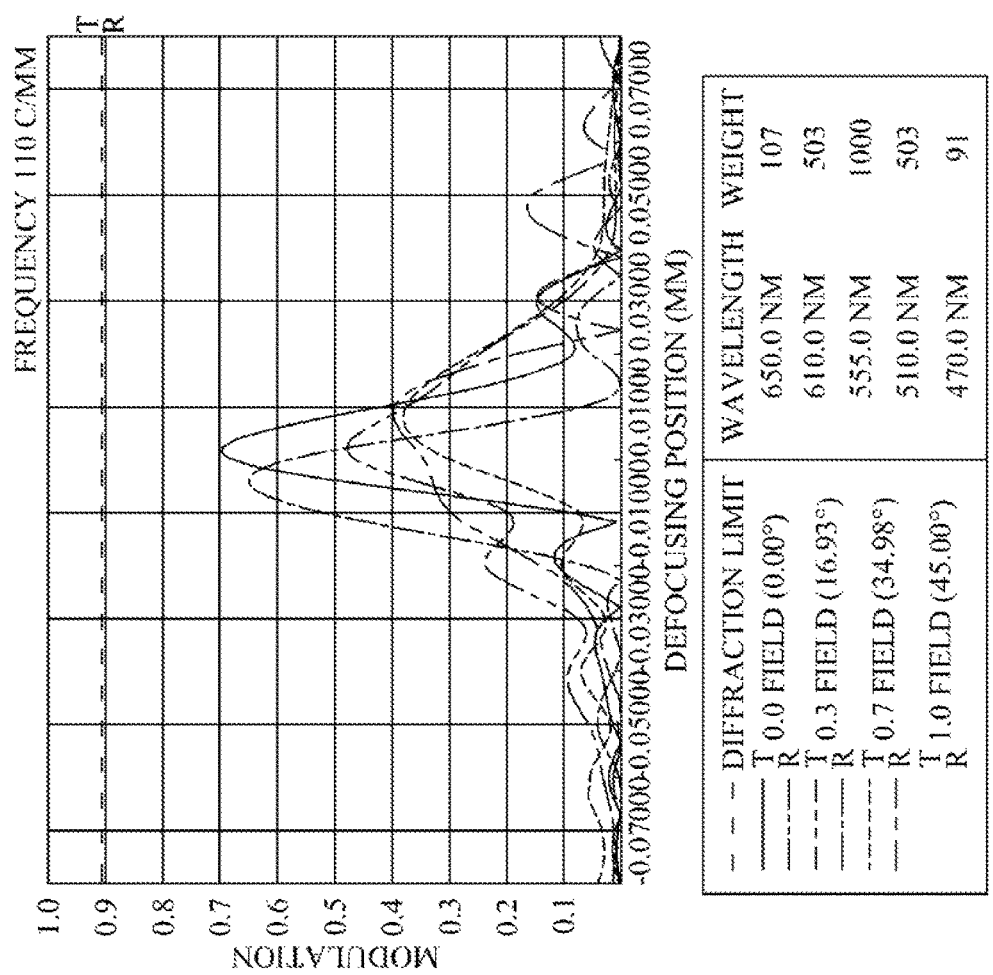
FIG. 4D is a diagram illustrating the through focus MTF values for the visible light spectrum at central field of view, 0.3 field of view and 0.7 field of view according to the fourth embodiment of the present disclosure.
Figure 4E:
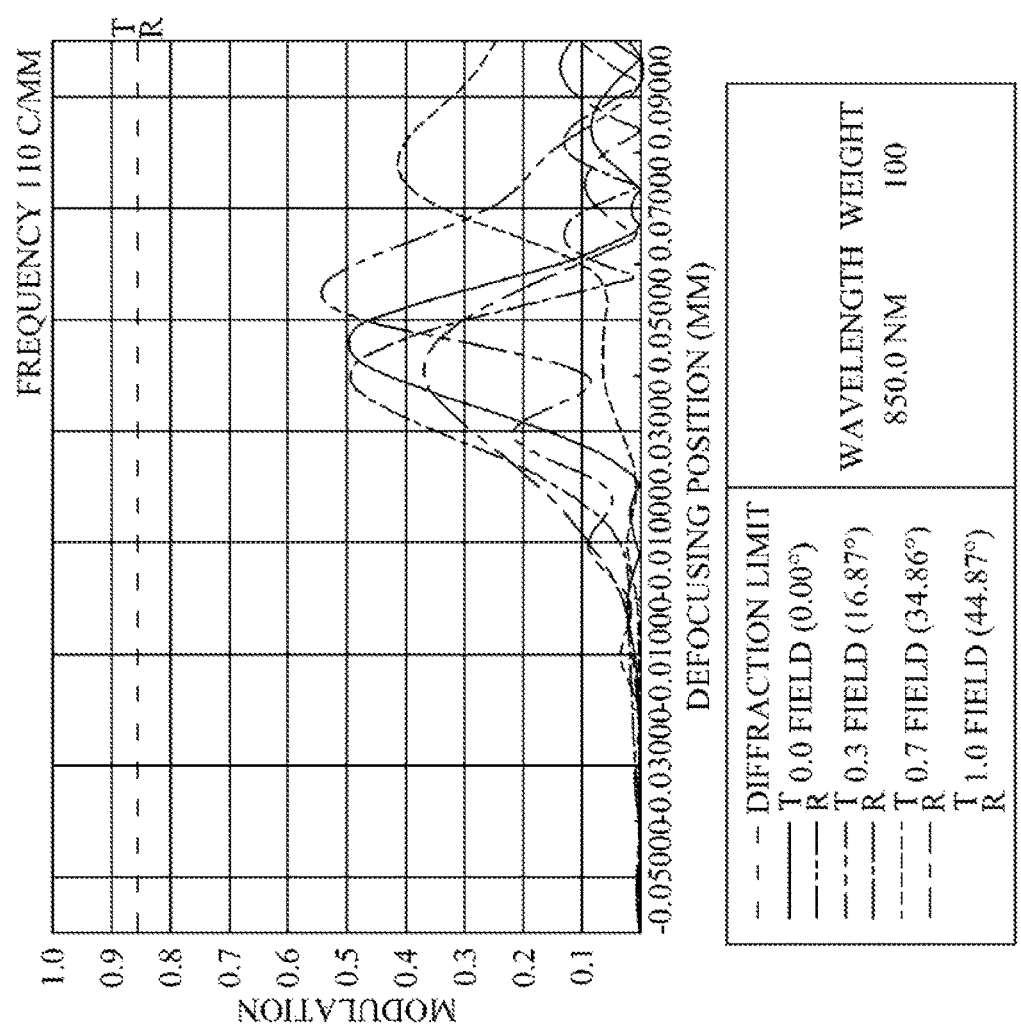
FIG. 4E is a diagram illustrating the through focus MTF values for the infrared light spectrum at central field of view, 0.3 field of view and 0.7 field of view according to the fourth embodiment of the present disclosure.

Please refer to FIG. 4A and FIG. 4B, wherein FIG. 4A is a schematic view of the optical image capturing system according to the fourth embodiment of the present invention and FIG. 4B shows the longitudinal spherical aberration curves, astigmatic field curves, and optical distortion curve of the optical image capturing system in the order from left to right according to the fourth embodiment of the present invention. FIG. 4C is a characteristic diagram of modulation transfer of the visible light spectrum according to the fourth embodiment of the present disclosure. FIG. 4D is a diagram illustrating the through focus MTF values for the visible light spectrum at central field of view, 0.3 field of view and 0.7 field of view according to the first embodiment of the present disclosure. FIG. 4E is a diagram illustrating the through focus MTF values for the infrared light spectrum at central field of view, 0.3 field of view and 0.7 field of view according to the fourth embodiment of the present disclosure.

As shown in FIG. 4A, in the order from an object side to an image side, the optical image capturing system includes a first lens 410, an aperture 400, a second lens 420, a third lens 430, a fourth lens 440, a fifth lens 450, a sixth lens 460, a seventh lens 470, an eighth lens 480, an infrared filter 490, a first image plane 492, a second image plane and an image sensing device 494.

The first lens 410 has negative refractive power and is made of plastic. The object side 412 of the first lens 410 is a convex surface and the image side 414 of the first lens 410 is a concave surface. Both the object side 412 and the image side 414 of the first lens 410 are aspheric.

The second lens 420 has positive refractive power and is made of plastic. The object side 422 of the second lens 420 is a convex surface and the image side 424 of the second lens 420 is a convex surface. Both the object side 422 and the image side 424 of the second lens 420 are aspheric.

The third lens 430 has positive refractive power and is made of plastic. The object side 432 of the third lens 430 is a convex surface and the image side 434 of the third lens 430 is a concave surface. Both the object side 432 and the image side 434 of the third lens 430 are aspheric. The image side 434 of the third lens 430 has one inflection point.

The fourth lens 440 has negative refractive power and is made of plastic. The object side 442 of the fourth lens 440 is a concave surface and the image side 444 of the fourth lens 440 is a concave surface. Both the object side 442 and the image side 444 of the fourth lens 440 are aspheric. The image side 444 of the fourth lens 440 has one inflection point.

The fifth lens 450 has positive refractive power and is made of plastic. The object side 452 of the fifth lens 450 is a convex surface and the image side 454 of the fifth lens 450 is a convex surface. Both the object side 452 and the image side 454 of the fifth lens 450 are aspheric. The image side 454 of the fifth lens 450 has one inflection point.

The sixth lens 460 has positive refractive power and is made of plastic. The object side 462 of the sixth lens 460 is a convex surface and the image side 464 of the sixth lens 460 is a concave surface. Both the object side 462 and the image side 464 of the sixth lens 460 are aspheric. The image side 464 of the sixth lens 460 has two inflection points. Hereby, the incident angle on the sixth lens 460 at each field of view may be effectively adjusted so as to improve the aberration.

The seventh lens 470 has negative refractive power and is made of plastic. The object side 472 of the seventh lens 470 is a convex surface and the image side 474 of the seventh lens 470 is a concave surface. Both the object side 472 and the image side 474 of the seventh lens 470 are aspheric. Hereby, this configuration is beneficial to shorten the back focal length of the optical image capturing system so as to keep its miniaturization. Besides, the object side 472 of the seventh lens 470 has two inflection points and this configuration can reduce the incident angle of the off-axis rays effectively, thereby further correcting the off-axis aberration.

The eighth lens 480 has positive refractive power and is made of plastic. The object side 482 of the eighth lens is a convex surface and the image side 484 of the eighth lens is a concave surface. Both the object side 482 and the image side 484 of the eighth lens are aspheric. Hereby, this configuration is beneficial to shorten the back focal length of the optical image capturing system so as to keep its miniaturization. Besides, the object side 482 of the eighth lens has two inflection points and the image side 484 of the eighth lens has one inflection point. Hence, this configuration can reduce the incident angle of the off-axis rays effectively, thereby further correcting the off-axis aberration.

The infrared filter 490 is made of glass and is disposed between the eighth lens 480 and the first image plane 492. The infrared filter 480 does not affect the focal length of the optical image capturing system.

The contents in Tables 7 and 8 below should be incorporated into the reference of the present embodiment.

TABLE 7

Lens Parameters for the Fourth Embodiment
f(focal length) = 7.3505 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 130.6954904 | 8.600 | Plastic | 1.544 | 55.96 | −12.991 |
| 2 | | 6.568941867 | 16.614 | | | | |
| 3 | Aperture | 1E+18 | −1.315 | | | | |
| 4 | Second Lens | 22.94517365 | 4.294 | Plastic | 1.544 | 55.96 | 18.461 |
| 5 | | −16.77705805 | 0.050 | | | | |
| 6 | Third Lens | 13.44795534 | 3.884 | Plastic | 1.515 | 56.55 | 65.475 |
| 7 | | 20.13686684 | 3.660 | | | | |
| 8 | Fourth Lens | −55.39944223 | 1.620 | Plastic | 1.661 | 20.40 | −14.217 |
| 9 | | 11.5711111 | 0.171 | | | | |

TABLE 7-continued

Lens Parameters for the Fourth Embodiment
f(focal length) = 7.3505 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 10 | Fifth Lens | 10.77965569 | 5.315 | Plastic | 1.544 | 55.96 | 14.336 |
| 11 | | −23.5686615 | 0.050 | | | | |
| 12 | Sixth Lens | 12.08398012 | 4.171 | Plastic | 1.544 | 55.96 | 24.845 |
| 13 | | 97.50158878 | 0.050 | | | | |
| 14 | Seventh Lens | 10.30872998 | 0.692 | Plastic | 1.661 | 20.40 | −24.656 |
| 15 | | 6.165671024 | 2.175 | | | | |
| 16 | Eighth Lens | 5.723746497 | 1.923 | Plastic | 1.544 | 55.96 | 35.405 |
| 17 | | 7.168238668 | 1.000 | | | | |
| 18 | Infrared Filter | 1E+18 | 0.200 | BK_7 | 1.517 | 64.2 | |
| 19 | | 1E+18 | 1.836 | | | | |
| 20 | First Image Plane | 1E+18 | 0.010 | | | | |

Reference Wavelength (d-line): 555 nm

TABLE 8

The Aspheric Coefficients of the Fourth Embodiment
Table 8: Aspheric Coefficients

| Surface No | 1 | 2 | 4 | 5 | 6 | 7 |
|---|---|---|---|---|---|---|
| k   | 4.162173E+01  | −4.456479E−01 | 3.508620E+00  | −2.181717E+00 | 3.278148E−01  | −1.931871E+01 |
| A4  | 5.696825E−05  | 1.533973E−04  | 2.998711E−05  | 1.454477E−04  | −9.184153E−05 | −2.532770E−04 |
| A6  | −3.948685E−07 | 6.587300E−07  | −7.122507E−07 | −1.991189E−06 | 1.346556E−06  | 1.885319E−06  |
| A8  | 1.064376E−09  | −7.405120E−08 | −9.327143E−09 | 1.672638E−09  | −2.570461E−08 | −1.364221E−08 |
| A10 | −1.046427E−12 | 3.612675E−10  | 3.900179E−11  | 5.441450E−11  | 2.865578E−10  | 9.765145E−12  |
| A12 | 0.000000E+00  | 0.000000E+00  | 0.000000E+00  | 0.000000E+00  | 0.000000E+00  | 0.000000E+00  |

| Surface No | 8 | 9 | 10 | 11 | 12 | 13 |
|---|---|---|---|---|---|---|
| k   | 4.438016E+01  | −6.952504E−01 | −5.144362E+00 | −2.529828E+01 | −2.733105E+00 | −5.000000E+01 |
| A4  | −3.969781E−04 | −5.102723E−04 | −5.520288E−05 | −3.640385E−04 | 3.819645E−05  | −3.595740E−04 |
| A6  | −6.172439E−06 | 2.582546E−06  | −2.833263E−07 | −6.991748E−07 | −2.690161E−06 | −1.287528E−06 |
| A8  | 9.317159E−08  | −2.330575E−08 | 5.426657E−08  | 1.280869E−07  | −4.230006E−09 | −2.006667E−09 |
| A10 | 1.926038E−11  | 1.666311E−10  | −2.058989E−10 | −2.559769E−10 | 8.178203E−10  | 1.297532E−09  |
| A12 | 0.000000E+00  | 0.000000E+00  | 0.000000E+00  | 0.000000E+00  | 0.000000E+00  | 0.000000E+00  |

| Surface No | 14 | 15 | 16 | 17 |
|---|---|---|---|---|
| k   | −5.000000E+01 | −1.554674E+01 | −5.190028E+00 | −8.320180E+00 |
| A4  | −2.634817E−04 | 2.420330E−04  | −1.007866E−03 | −9.167006E−04 |
| A6  | −3.126289E−06 | −4.577104E−07 | −6.233402E−06 | −6.252415E−06 |
| A8  | 1.783224E−08  | −1.103309E−07 | 3.841973E−08  | 9.001111E−08  |
| A10 | 6.844100E−10  | 2.551532E−09  | 2.049076E−09  | 1.889218E−10  |
| A12 | 0.000000E+00  | 0.000000E+00  | 0.000000E+00  | 0.000000E+00  |

In the fourth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 7 and Table 8.

| Fourth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.84 | 0.75 | 0.64 | 0.68 | 0.47 | 0.3 |
| ETP1 | ETP2 | ETP3 | ETP4 | ETP5 | ETP6 |
| 9.309 | 3.817 | 3.727 | 2.112 | 4.702 | 3.807 |
| ETP7 | ETP8 | ETL | EBL | EIN | EIR |
| 0.947 | 1.788 | 54.959 | 2.614 | 52.346 | 0.568 |

-continued

Fourth Embodiment (Primary Reference Wavelength = 555 nm)

| PIR | EIN/ETL | SETP/EIN | EIR/PIR | BL | EBL/BL |
|---|---|---|---|---|---|
| 1.000 | 0.952 | 0.577 | 0.568 | 3.0460 | 0.8582 |
| ETP1/TP1 | ETP2/TP2 | ETP3/TP3 | ETP4/TP4 | ETP5/TP5 | ETP6/TP6 |
| 1.083 | 0.889 | 0.960 | 1.304 | 0.885 | 0.913 |
| ETP7/TP7 | ETP8/TP8 | ED78 | | ED78/IN78 | |
| 1.368 | 0.930 | 2.237 | | 1.029 | |
| SETP | STP | SETP/STP | SED | SIN | SED/SIN |
| 30.211 | 30.498 | 0.991 | 22.135 | 21.456 | 1.032 |
| ED12 | ED23 | ED34 | ED45 | ED56 | ED67 |
| 14.760 | 0.664 | 3.341 | 0.206 | 0.643 | 0.285 |
| | | ED23/ | ED45/ | | ED67/ |
| ED12/IN12 | IN23 | ED34/IN34 | IN45 | ED56/IN56 | IN67 |
| 0.965 | 13.270 | 0.913 | 1.201 | 12.853 | 5.692 |
| |f/f1| | |f/f2| | |f/f3| | |f/f4| | |f/f5| | |f/f6| |
| 0.5658 | 0.3982 | 0.1123 | 0.5170 | 0.5127 | 0.2959 |
| |f/f7| | |f/f8| | |f1/f2| | |f2/f3| | |f6/f7| | |f7/f8| |
| 0.2981 | 0.2076 | 0.7037 | 0.2820 | 1.0077 | 0.6964 |
| IN12/f | IN78/f | (TP1 + IN12)/TP2 | | (TP8 + IN78)/TP7 | |
| 2.0814 | 0.2959 | 5.5660 | | 5.9171 | |
| HOS | InTL | HOS/HOI | InS/HOS | ODT % | TDT % |
| 55.0000 | 51.9540 | 7.3333 | 0.5416 | 2.0864 | 0.6605 |
| HVT11 | HVT12 | HVT21 | HVT22 | HVT31 | HVT32 |
| 0.0000 | 0.0000 | 0.0000 | 0.0000 | 0.0000 | 6.3693 |
| HVT41 | HVT42 | HVT51 | HVT52 | HVT61 | HVT62 |
| 0.0000 | 0.0000 | 0.0000 | 6.9928 | 0.0000 | 2.6036 |
| HVT71 | HVT72 | HVT81 | HVT82 | HVT82/HOI | HVT82/HOS |
| 4.6860 | 0.0000 | 4.5224 | 4.2454 | 0.5661 | 0.0772 |
| VSFS0 | VSFS3 | VSFS7 | VTFS0 | VTFS3 | VTFS7 |
| 0.000 mm | 0.000 mm | 0.010 mm | 0.000 mm | 0.000 mm | 0.010 mm |
| VSMTF0 | VSMTF3 | VSMTF7 | VTMTF0 | VTMTF3 | VTMTF7 |
| 0.678 | 0.580 | 0.397 | 0.678 | 0.464 | 0.376 |
| ISFS0 | ISFS3 | ISFS7 | ITFS0 | ITFS3 | ITFS7 |
| 0.050 mm | 0.040 mm | 0.040 mm | 0.050 mm | 0.060 mm | 0.080 mm |
| ISMTF0 | ISMTF3 | ISMTF7 | ITMTF0 | ITMTF3 | ITMTF7 |
| 0.460 | 0.495 | 0.369 | 0.460 | 0.487 | 0.410 |
| FS | | AIFS | | AVFS | AFS |
| 0.050 mm | | 0.053 mm | | 0.003 mm | 0.050 mm |

The following values for the conditional expressions can be obtained from the data in Table 7 and Table 8.

Values Related to Inflection Point of fourth Embodiment
(Primary Reference Wavelength = 555 nm)

| HIF321 | 3.2949 | HIF321/HOI | 0.4393 | SGI321 | 0.2151 | |SGI321|/(|SGI321| + TP3) | 0.0525 |
|---|---|---|---|---|---|---|---|
| HIF421 | 4.2685 | HIF421/HOI | 0.5691 | SGI421 | 0.6396 | |SGI421|/(|SGI421| + TP4) | 0.2831 |
| HIF521 | 5.3685 | HIF521/HOI | 0.7158 | SGI521 | −0.7243 | |SGI521|/(|SGI521| + TP5) | 0.1199 |
| HIF621 | 1.5128 | HIF621/HOI | 0.2017 | SGI621 | 0.0098 | |SGI621|/(|SGI621| + TP6) | 0.0023 |
| HIF622 | 6.0372 | HIF622/HOI | 0.8050 | SGI622 | −0.2812 | |SGI622|/(|SGI622| + TP6) | 0.0632 |
| HIF711 | 2.1805 | HIF711/HOI | 0.2907 | SGI711 | 0.1592 | |SGI711|/(|SGI711| + TP7) | 0.1869 |
| HIF712 | 6.6515 | HIF712/HOI | 0.8869 | SGI712 | 0.1607 | |SGI712|/(|SGI712| + TP7) | 0.1884 |
| HIF811 | 2.4102 | HIF811/HOI | 0.3214 | SGI811 | 0.4022 | |SGI811|/(|SGI811| + TP8) | 0.1730 |
| HIF812 | 6.6483 | HIF812/HOI | 0.8864 | SGI812 | 0.1425 | |SGI812|/(|SGI812| + TP8) | 0.0690 |
| HIF821 | 2.2716 | HIF821/HOI | 0.3029 | SGI821 | 0.2855 | |SGI821|/(|SGI821| + TP8) | 0.1293 |

Fifth Embodiment

Figure 5A:
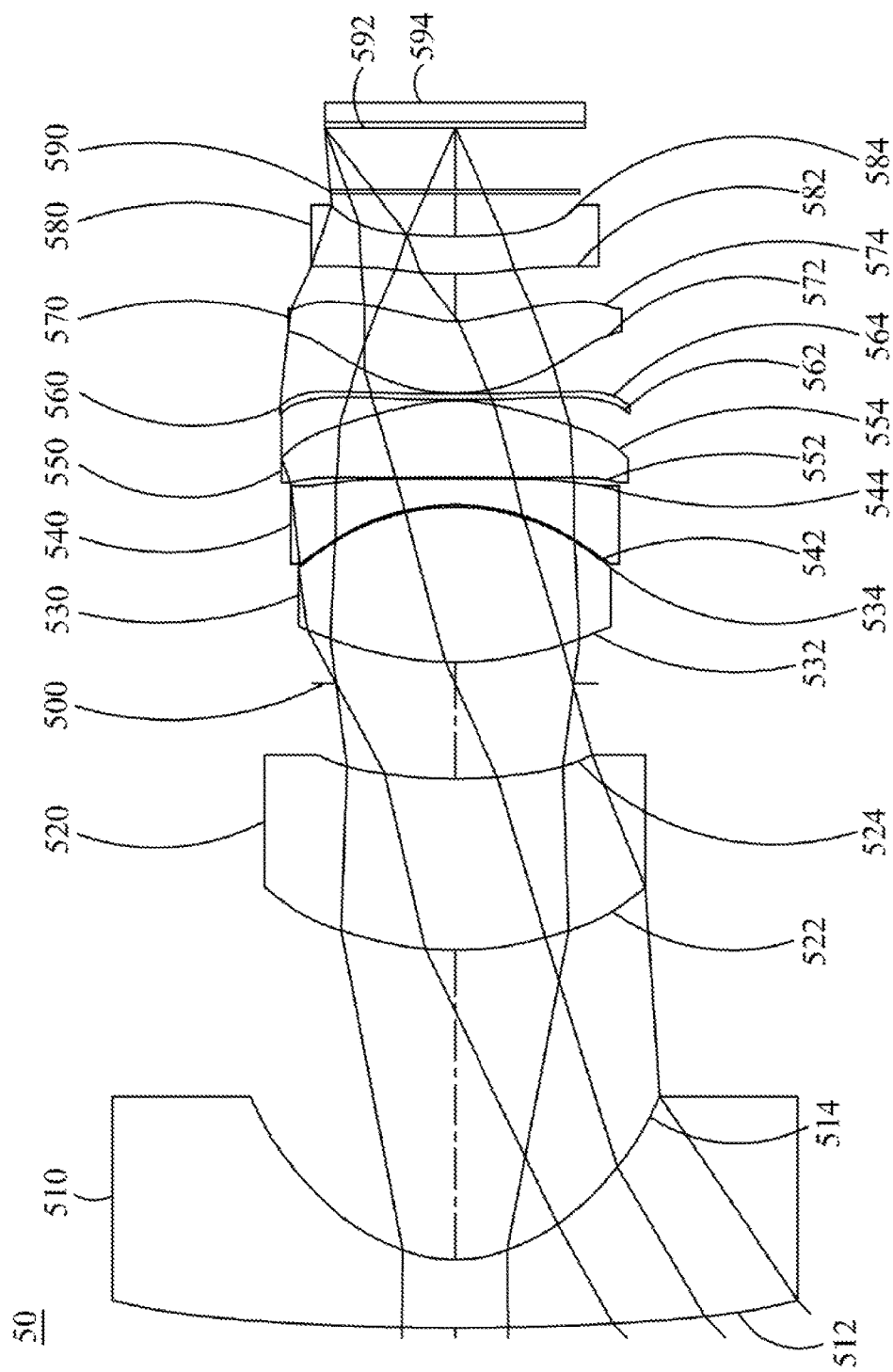
FIG. 5A is a schematic view of the optical image capturing system according to the fifth embodiment of the present invention.
Figure 5B:
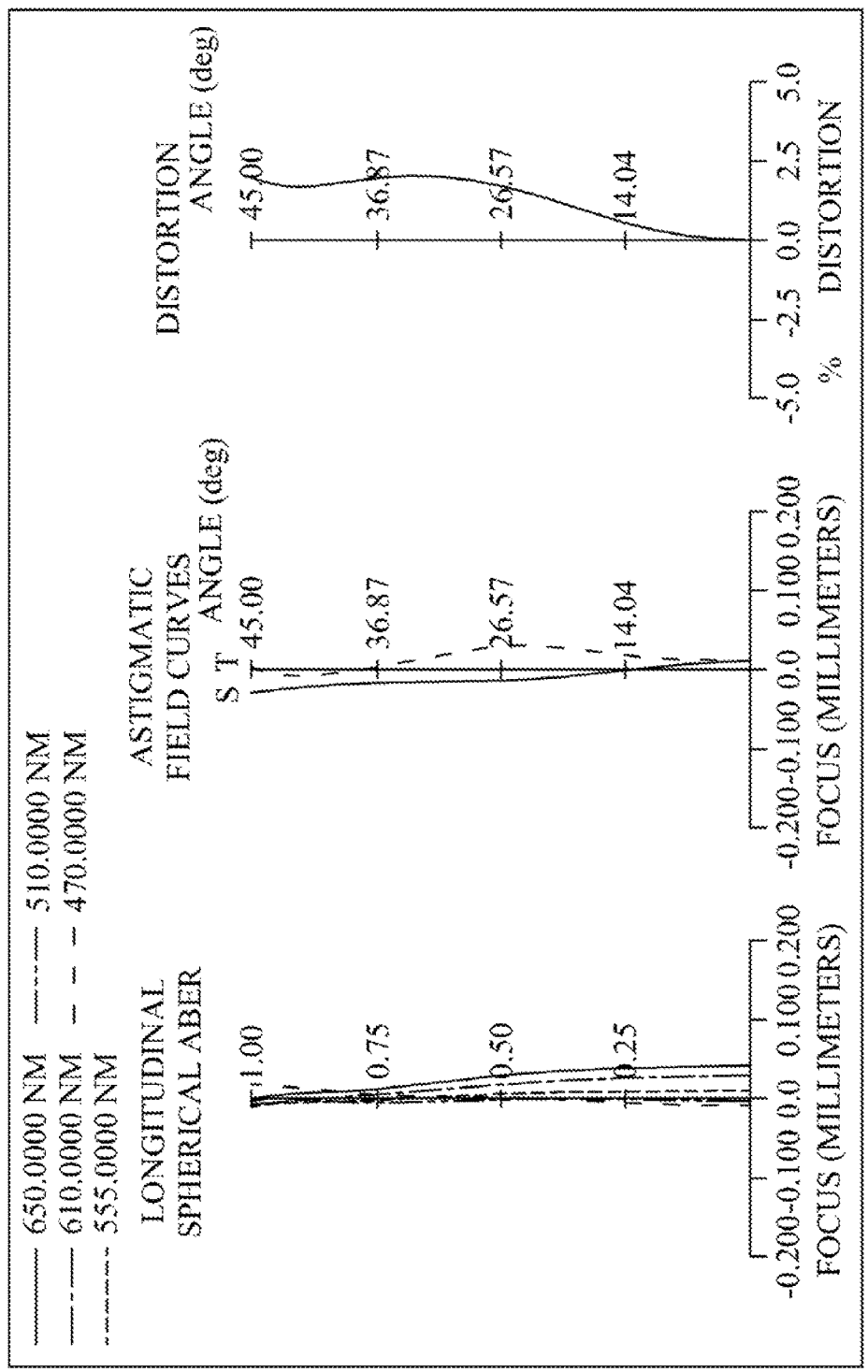
FIG. 5B shows the longitudinal spherical aberration curves, astigmatic field curves, and optical distortion curve of the optical image capturing system in the order from left to right according to the fifth embodiment of the present invention.
Figure 5C:
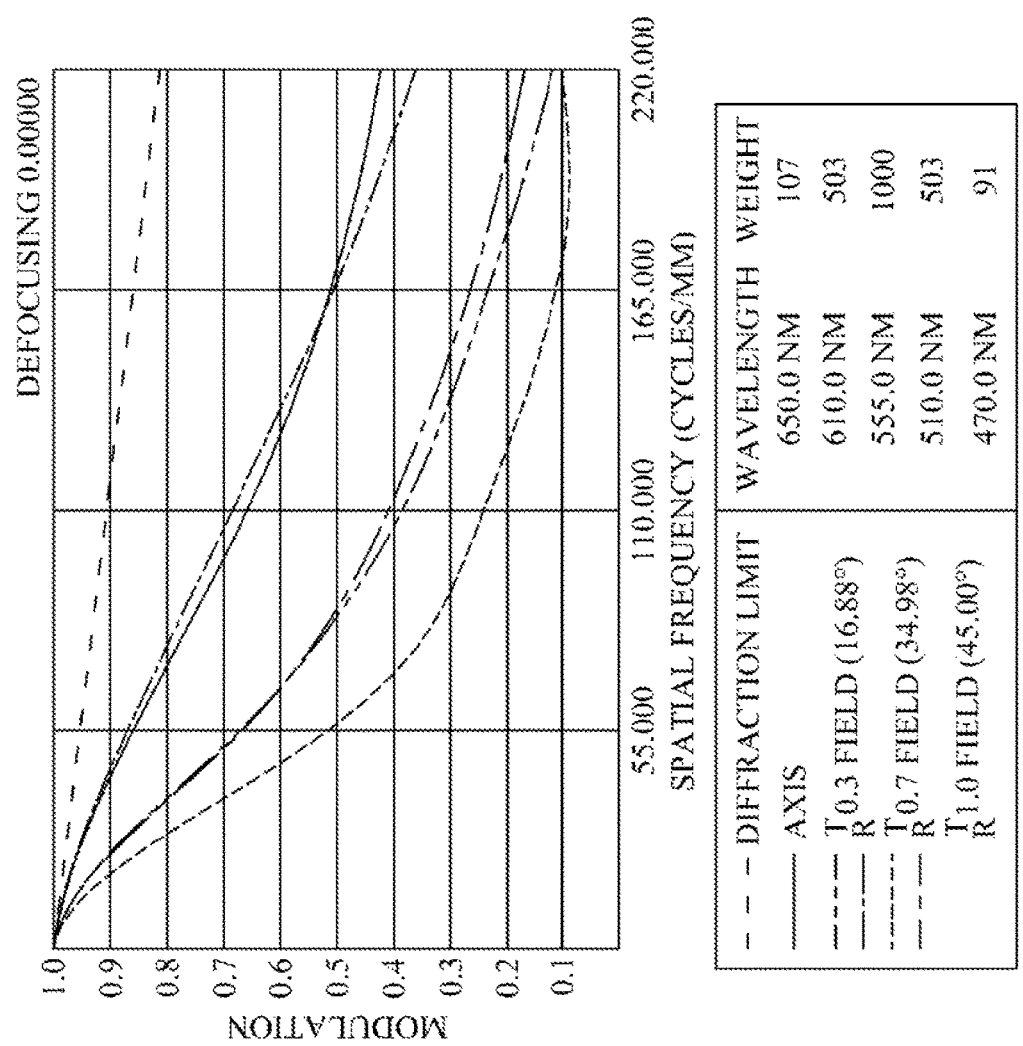
FIG. 5C is a characteristic diagram of modulation transfer of the visible light spectrum according to the fifth embodiment of the present disclosure.
Figure 5D:
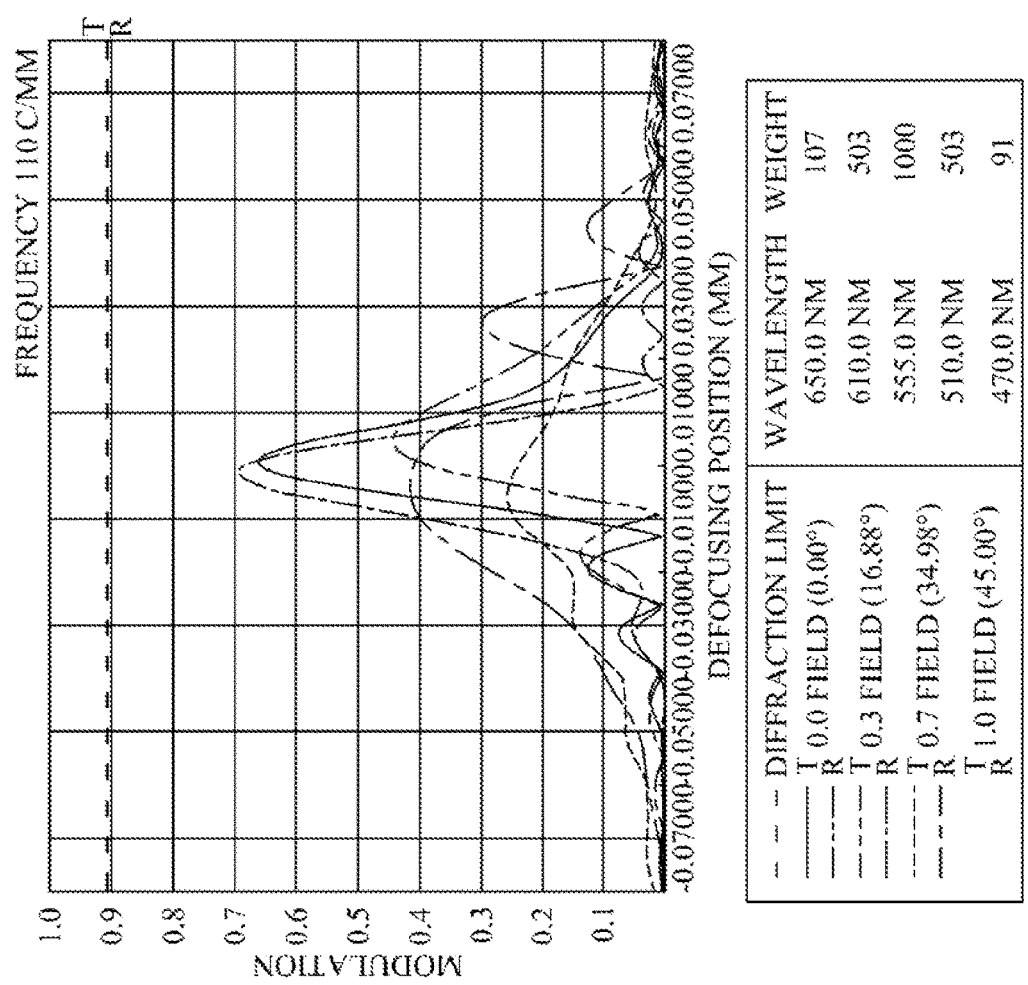
FIG. 5D is a diagram illustrating the through focus MTF values for the visible light spectrum at central field of view, 0.3 field of view and 0.7 field of view according to the fifth embodiment of the present disclosure.
Figure 5E:
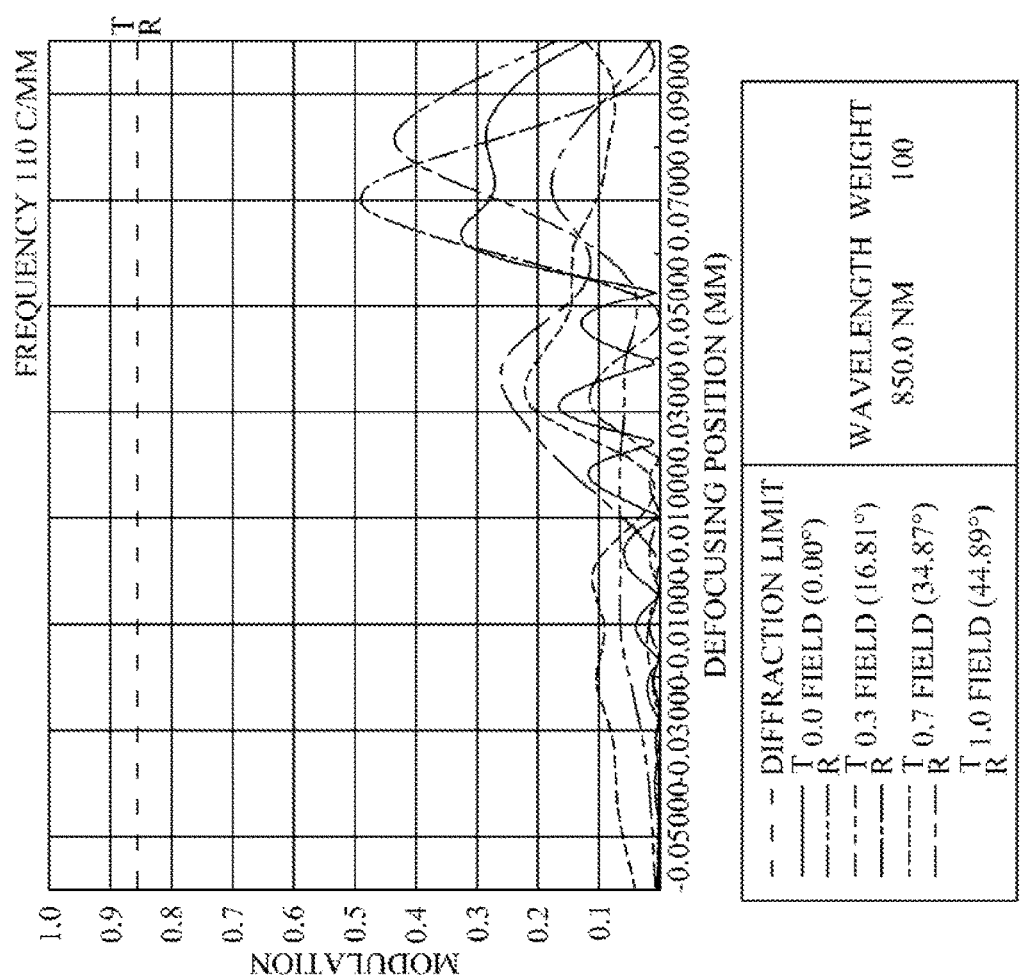
FIG. 5E is a diagram illustrating the through focus MTF values for the infrared light spectrum at central field of view, 0.3 field of view and 0.7 field of view according to the fifth embodiment of the present disclosure.

Please refer to FIG. 5A and FIG. 5B, wherein FIG. 5A is a schematic view of the optical image capturing system according to the fifth embodiment of the present invention and FIG. 5B shows the longitudinal spherical aberration curves, astigmatic field curves, and optical distortion curve of the optical image capturing system in the order from left to right according to the fifth embodiment of the present invention. FIG. 5C is a characteristic diagram of modulation transfer of the visible light spectrum according to the fifth embodiment of the present disclosure. FIG. 5D is a diagram illustrating the through focus MTF values for the visible light spectrum at central field of view, 0.3 field of view and 0.7 field of view according to the first embodiment of the present disclosure. FIG. 5E is a diagram illustrating the through focus MTF values for the infrared light spectrum at central field of view, 0.3 field of view and 0.7 field of view according to the fifth embodiment of the present disclosure.

As shown in FIG. 5A, in the order from an object side to an image side, the optical image capturing system includes a first lens 510, a second lens 520, an aperture 500, a third lens 530, a fourth lens 540, a fifth lens 550, a sixth lens 560, a seventh lens 570, an eighth lens 580, an infrared filter 590, a first image plane 592, a second image plane and an image sensing device 594.

The first lens 510 has negative refractive power and is made of plastic. The object side 512 of the first lens 510 is a convex surface and the image side 514 of the first lens 510 is a concave surface. Both the object side 512 and the image side 514 of the first lens 510 are aspheric.

The second lens 520 has positive refractive power and is made of plastic. The object side 522 of the second lens 520 is a convex surface and the image side 524 of the second lens 520 is a concave surface. Both the object side 522 and the image side 524 of the second lens 520 are aspheric.

The third lens 530 has positive refractive power and is made of plastic. The object side 532 of the third lens 530 is a convex surface and the image side 534 of the third lens 530 is a convex surface. Both the object side 532 and the image side 534 of the third lens 530 are aspheric.

The fourth lens 540 has negative refractive power and is made of plastic. The object side 542 of the fourth lens 540 is a concave surface and the image side 544 of the fourth lens 540 is a concave surface. Both the object side 542 and the image side 544 of the fourth lens 540 are aspheric. The object side 542 of the fourth lens 540 has one inflection point. The image side 544 of the fourth lens 540 has two inflection points.

The fifth lens 550 has positive refractive power and is made of plastic. The object side 552 of the fifth lens 550 is a concave surface and the image side 554 of the fifth lens 550 is a convex surface. Both object side 552 and image side 554 of the fifth lens 550 are aspheric. The object side 552 of the fifth lens 550 has two inflection points.

The sixth lens 560 has positive refractive power and is made of plastic. The object side 562 of the sixth lens 560 is a convex surface and the image side 564 of the sixth lens 560 is a concave surface. Both the object side 562 and the image side 564 of the sixth lens 560 are aspheric. Both the object side 562 and the image side 564 of the sixth lens 560 have one inflection point. Hereby, the incident angle on the sixth lens 560 at each field of view may be effectively adjusted so as to improve the aberration.

The seventh lens 570 has negative refractive power and is made of plastic. The object side 572 of the seventh lens is a convex surface and the image side 574 of the seventh lens is a concave surface. Both object side 572 and image side 574 of the seventh lens are aspheric. Hereby, the configuration is beneficial to shorten the back focal length of the optical image capturing system so as to keep its miniaturization. Besides, both object side 572 and image side 574 of the seventh lens have one inflection point and this configuration can reduce the incident angle of the off-axis rays effectively, thereby further correcting the off-axis aberration.

The eighth lens 580 has positive refractive power and is made of plastic. The object side 582 of the eighth lens is a convex surface and the image side 584 of the eighth lens is a concave surface. Both the object side 582 and the image side 584 of the eighth lens are aspheric. Hereby, this configuration is beneficial to shorten the back focal length of the optical image capturing system so as to keep its miniaturization. Besides, the image side of the eighth lens 584 has two inflection points, and this configuration can reduce the incident angle of the off-axis rays effectively, thereby further correcting the off-axis aberration.

The infrared filter 590 is made of glass and is disposed between the eighth lens 580 and the first image plane 592. The infrared filter 590 does not affect the focal length of the optical image capturing system.

The contents in Tables 9 and 10 below should be incorporated into the reference of the present embodiment.

TABLE 9

Lens Parameters for the Fifth Embodiment
f(focal length) = 7.3571 mm; f/HEP = 1.2; HAF(half angle of view) = 44.9997 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 149.2454576 | 4.001 | Plastic | 1.544 | 55.96 | −17.088 |
| 2 | | 8.694486638 | 18.047 | | | | |
| 3 | Second Lens | 19.19098407 | 10.000 | Plastic | 1.661 | 20.40 | 60.612 |
| 4 | | 28.92532783 | 5.536 | | | | |
| 5 | Aperture | 1E+18 | 1.259 | | | | |
| 6 | Third Lens | 16.81939528 | 9.042 | Plastic | 1.544 | 55.96 | 16.094 |
| 7 | | −14.89483591 | 0.145 | | | | |
| 8 | Fourth Lens | −12.37939063 | 1.525 | Plastic | 1.661 | 20.40 | −17.185 |
| 9 | | 161.6615218 | 0.084 | | | | |
| 10 | Fifth Lens | −163.347088 | 4.447 | Plastic | 1.544 | 55.96 | 20.102 |
| 11 | | −10.37943203 | 0.050 | | | | |
| 12 | Sixth Lens | 60.01492715 | 0.364 | Plastic | 1.544 | 55.96 | 169.298 |
| 13 | | 170.8702429 | 0.050 | | | | |
| 14 | Seventh Lens | 10.39138989 | 4.211 | Plastic | 1.544 | 55.96 | −219.381 |
| 15 | | 8.193541607 | 2.769 | | | | |
| 16 | Eighth Lens | 20.58579661 | 2.174 | Plastic | 1.585 | 27.86 | 61.486 |
| 17 | | 45.87539651 | 0.500 | | | | |
| 18 | Infrared Filter | 1E+18 | 0.200 | BK_7 | 1.517 | 64.2 | |
| 19 | | 1E+18 | 5.605 | | | | |
| 20 | First Image Plane | 1E+18 | −0.011 | | | | |

Reference Wavelength (d-line): 555 nm

TABLE 10

The Aspheric Coefficients of the Fifth Embodiment
Table 10: Aspheric Coefficients

| Surface No | 1 | 2 | 3 | 4 | 6 | 7 |
|---|---|---|---|---|---|---|
| k | 1.986691E+01 | −5.281953E−01 | −9.160089E−01 | 8.594970E+00 | 1.117947E−01 | 9.005434E−01 |
| A4 | 3.445215E−06 | −6.442926E−05 | −7.025456E−06 | −6.274507E−05 | −1.248868E−04 | −1.250503E−04 |
| A6 | −3.817675E−08 | −1.511598E−07 | 2.888502E−07 | 8.416746E−07 | 3.183830E−07 | 1.353870E−06 |
| A8 | 1.182963E−10 | −1.345124E−09 | −1.031081E−09 | −5.715452E−09 | 8.261522E−09 | −7.315375E−09 |

TABLE 10-continued

The Aspheric Coefficients of the Fifth Embodiment
Table 10: Aspheric Coefficients

| | | | | | | |
|---|---|---|---|---|---|---|
| A10 | −9.534673E−14 | −2.321608E−12 | 1.315692E−11 | 7.906733E−11 | −7.382921E−11 | 1.195825E−10 |
| A12 | 0.000000E+00 | 0.000000E+00 | 0.000000E+00 | 0.000000E+00 | 0.000000E+00 | 0.000000E+00 |

| Surface No | 8 | 9 | 10 | 11 | 12 | 13 |
|---|---|---|---|---|---|---|
| k | 2.180481E−01 | −5.000000E+01 | 4.180664E+01 | −6.845659E+00 | −4.164509E+01 | 5.000000E+01 |
| A4 | 7.693388E−05 | −1.926452E−04 | 8.685984E−05 | 8.969345E−05 | −6.872017E−05 | 7.120534E−06 |
| A6 | −1.710585E−06 | 4.296803E−07 | −4.524145E−07 | −8.047216E−07 | −4.457900E−07 | 4.756182E−07 |
| A8 | 2.088310E−08 | 5.043954E−09 | −5.767309E−09 | −9.242761E−09 | 5.930461E−09 | −9.886153E−09 |
| A10 | 4.244397E−11 | 4.216277E−11 | −5.839831E−12 | 2.822081E−11 | −8.580317E−11 | −5.276553E−11 |
| A12 | 0.000000E+00 | 0.000000E+00 | 0.000000E+00 | 0.000000E+00 | 0.000000E+00 | 0.000000E+00 |

| Surface No | 14 | 15 | 16 | 17 |
|---|---|---|---|---|
| k | −4.680110E−02 | −7.826917E+00 | −2.715940E+01 | 3.770944E+01 |
| A4 | −6.102086E−05 | −2.629936E−04 | −1.246684E−04 | 2.710741E−04 |
| A6 | −2.292008E−06 | 8.008647E−08 | −2.046634E−06 | 3.638254E−06 |
| A8 | 2.031550E−08 | −1.691147E−09 | 1.381005E−08 | −8.492884E−08 |
| A10 | −2.627500E−10 | 4.114340E−11 | 2.459707E−10 | 9.920610E−10 |
| A12 | 0.000000E+00 | 0.000000E+00 | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 9 and Table 10:

| Fifth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.86 | 0.67 | 0.52 | 0.66 | 0.38 | 0.24 |
| ETP1 | ETP2 | ETP3 | ETP4 | ETP5 | ETP6 |
| 4.512 | 5.453 | 8.438 | 1.919 | 4.070 | 0.323 |
| ETP7 | ETP8 | ETL | EBL | EIN | EIR |
| 4.211 | 2.118 | 69.968 | 6.160 | 63.808 | 0.366 |
| PIR | EIN/ETL | SETP/EIN | EIR/PIR | BL | EBL/BL |
| 0.500 | 0.912 | 0.487 | 0.733 | 6.2941 | 0.9787 |
| ETP1/TP1 | ETP2/TP2 | ETP3/TP3 | ETP4/TP4 | ETP5/TP5 | ETP6/TP6 |
| 1.128 | 0.985 | 0.933 | 1.258 | 0.915 | 0.886 |
| ETP7/TP7 | ETP8/TP8 | ED78 | | ED78/IN78 | |
| 1.000 | 0.974 | 2.504 | | 0.904 | |
| SETP | STP | SETP/STP | SED | SIN | SED/SIN |
| 31.045 | 31.301 | 0.992 | 32.762 | 32.405 | 1.011 |
| ED12 | ED23 | ED34 | ED45 | ED56 | ED67 |
| 27.749 | 1.368 | 0.096 | 0.050 | 0.519 | 0.476 |
| ED12/IN12 | ED23/IN23 | ED34/IN34 | ED45/IN45 | ED56/IN56 | ED67/IN67 |
| 0.989 | 1.087 | 0.660 | 0.596 | 10.379 | 9.525 |

| Fifth Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.4305 | 0.1214 | 0.4571 | 0.4281 | 0.3660 | 0.0435 |
| \|f/f7\| | \|f/f8\| | \|f1/f2\| | \|f2/f3\| | \|f6/f7\| | \|f7/f8\| |
| 0.0335 | 0.1197 | 0.2819 | 3.7662 | 0.7717 | 3.5680 |
| IN12/f | IN78/f | (TP1 + IN12)/TP2 | | (TP8 + IN78)/TP7 | |
| 2.4531 | 0.3764 | 2.2049 | | 1.1739 | |
| HOS | InTL | HOS/HOI | InS/HOS | ODT % | TDT % |
| 70.0000 | 63.7059 | 9.3333 | 0.4631 | 2.0446 | 0.3703 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 2.8677 | 0.0000 | 0.0000 | 6.2336 | 7.2512 |
| HVT71 | HVT72 | HVT81 | HVT82 | HVT82/HOI | HVT82/HOS |
| 0.0000 | 7.0151 | 0.0000 | 0.0000 | 0.0000 | 0.0000 |
| VSFS0 | VSFS3 | VSFS7 | VTFS0 | VTFS3 | VTFS7 |
| 0.000 mm | 0.000 mm | 0.000 mm | 0.000 mm | 0.010 mm | −0.010 mm |
| VSMTF0 | VSMTF3 | VSMTF7 | VTMTF0 | VTMTF3 | VTMTF7 |
| 0.658 | 0.685 | 0.410 | 0.658 | 0.396 | 0.244 |
| ISFS0 | ISFS3 | ISFS7 | ITFS0 | ITFS3 | ITFS7 |
| 0.060 mm | 0.070 mm | 0.040 mm | 0.060 mm | 0.080 mm | 0.030 mm |
| ISMTF0 | ISMTF3 | ISMTF7 | ITMTF0 | ITMTF3 | ITMTF7 |
| 0.290 | 0.490 | 0.254 | 0.290 | 0.432 | 0.201 |
| FS | | AIFS | | AVFS | AFS |
| 0.060 mm | | 0.057 mm | | 0.000 mm | 0.057 mm |

The following values for the conditional expressions can be obtained from the data in Table 9 and Table 10.

| Values Related to Inflection Point of Fifth Embodiment (Primary Reference Wavelength = 555 nm) | | | | | | | |
|---|---|---|---|---|---|---|---|
| HIF411 | 8.1265 | HIF411/HOI | 1.0835 | SGI411 | −2.8646 | \|SGI411\|/(\|SGI411\| + TP4) | 0.6525 |
| HIF421 | 1.6425 | HIF421/HOI | 0.2190 | SGI421 | 0.0069 | \|SGI421\|/(\|SGI421\| + TP4) | 0.0045 |
| HIF422 | 7.4335 | HIF422/HOI | 0.9911 | SGI422 | −0.2803 | \|SGI422\|/(\|SGI422\| + TP4) | 0.1552 |
| HIF511 | 2.5754 | HIF511/HOI | 0.3434 | SGI511 | −0.0167 | \|SGI511\|/(\|SGI511\| + TP5) | 0.0037 |
| HIF512 | 5.8064 | HIF512/HOI | 0.7742 | SGI512 | −0.0309 | \|SGI512\|/(\|SGI512\| + TP5) | 0.0069 |
| HIF611 | 3.7228 | HIF611/HOI | 0.4964 | SGI611 | 0.0971 | \|SGI611\|/(\|SGI611\| + TP6) | 0.2104 |
| HIF621 | 5.6966 | HIF621/HOI | 0.7595 | SGI621 | 0.1072 | \|SGI621\|/(\|SGI621\| + TP6) | 0.2274 |
| HIF711 | 7.2665 | HIF711/HOI | 0.9689 | SGI711 | 2.4786 | \|SGI711\|/(\|SGI711\| + TP7) | 0.3705 |
| HIF721 | 3.4458 | HIF721/HOI | 0.4594 | SGI721 | 0.5460 | \|SGI721\|/(\|SGI721\| + TP7) | 0.1148 |
| HIF811 | 3.3080 | HIF811/HOI | 0.4411 | SGI811 | 0.2143 | \|SGI811\|/(\|SGI811\| + TP8) | 0.0897 |
| HIF812 | 6.9658 | HIF812/HOI | 0.9288 | SGI812 | 0.4014 | \|SGI812\|/(\|SGI812\| + TP8) | 0.1558 |

Sixth Embodiment

Figure 6A:
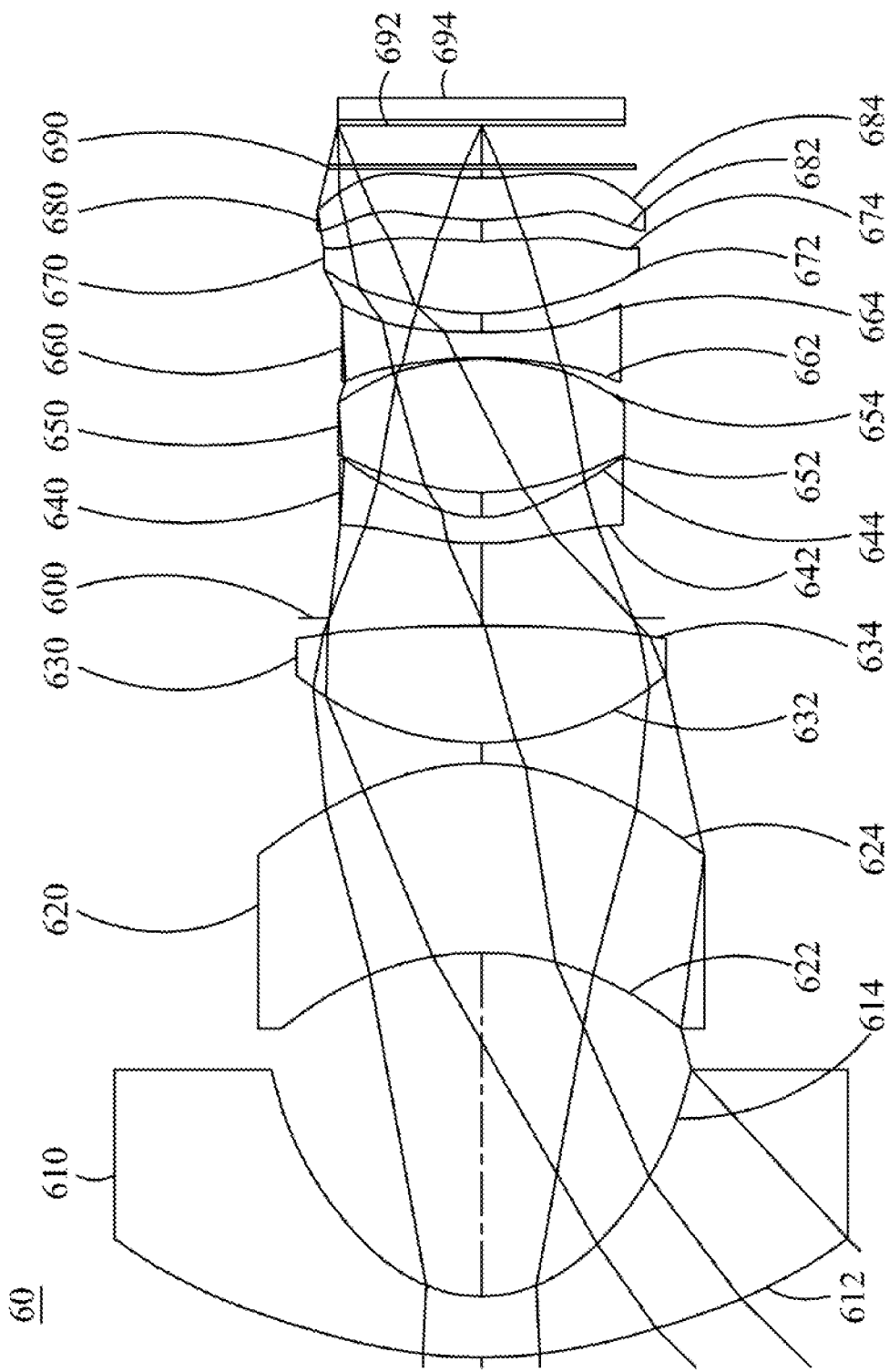
FIG. 6A is a schematic view of the optical image capturing system according to the sixth embodiment of the present invention.
Figure 6B:
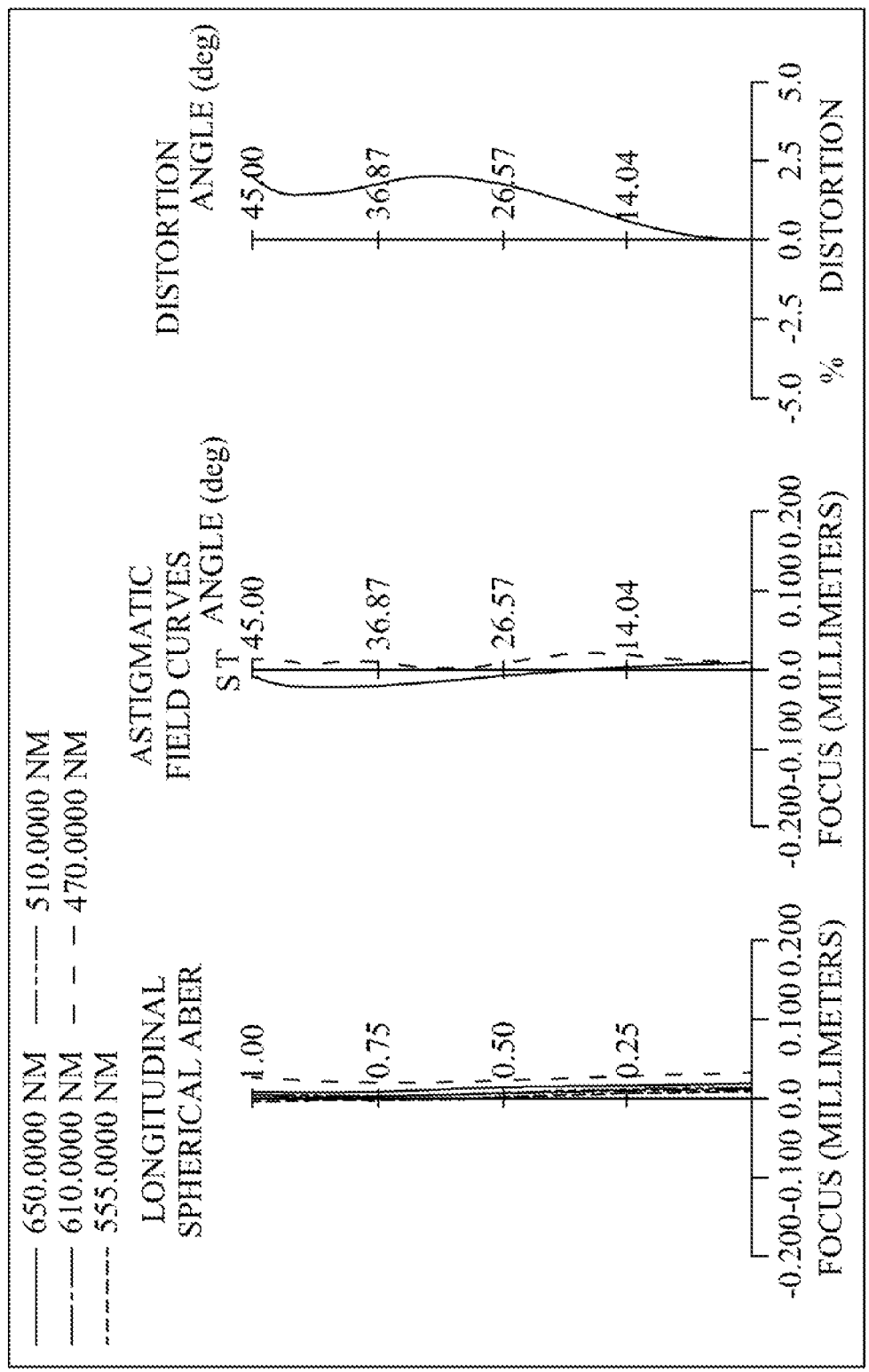
FIG. 6B shows the longitudinal spherical aberration curves, astigmatic field curves, and optical distortion curve of the optical image capturing system in the order from left to right according to the sixth embodiment of the present invention.
Figure 6C:
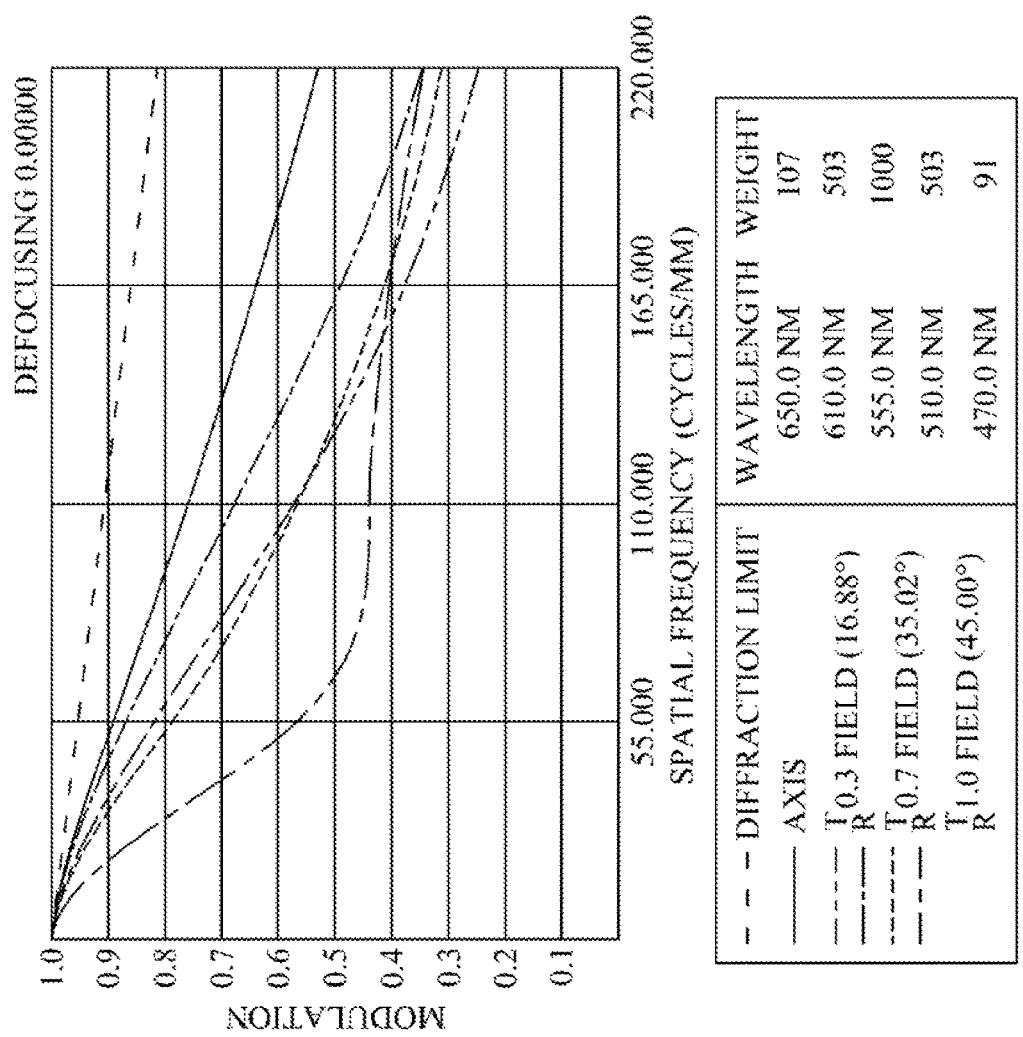
FIG. 6C is a characteristic diagram of modulation transfer of the visible light spectrum according to the sixth embodiment of the present disclosure.
Figure 6D:
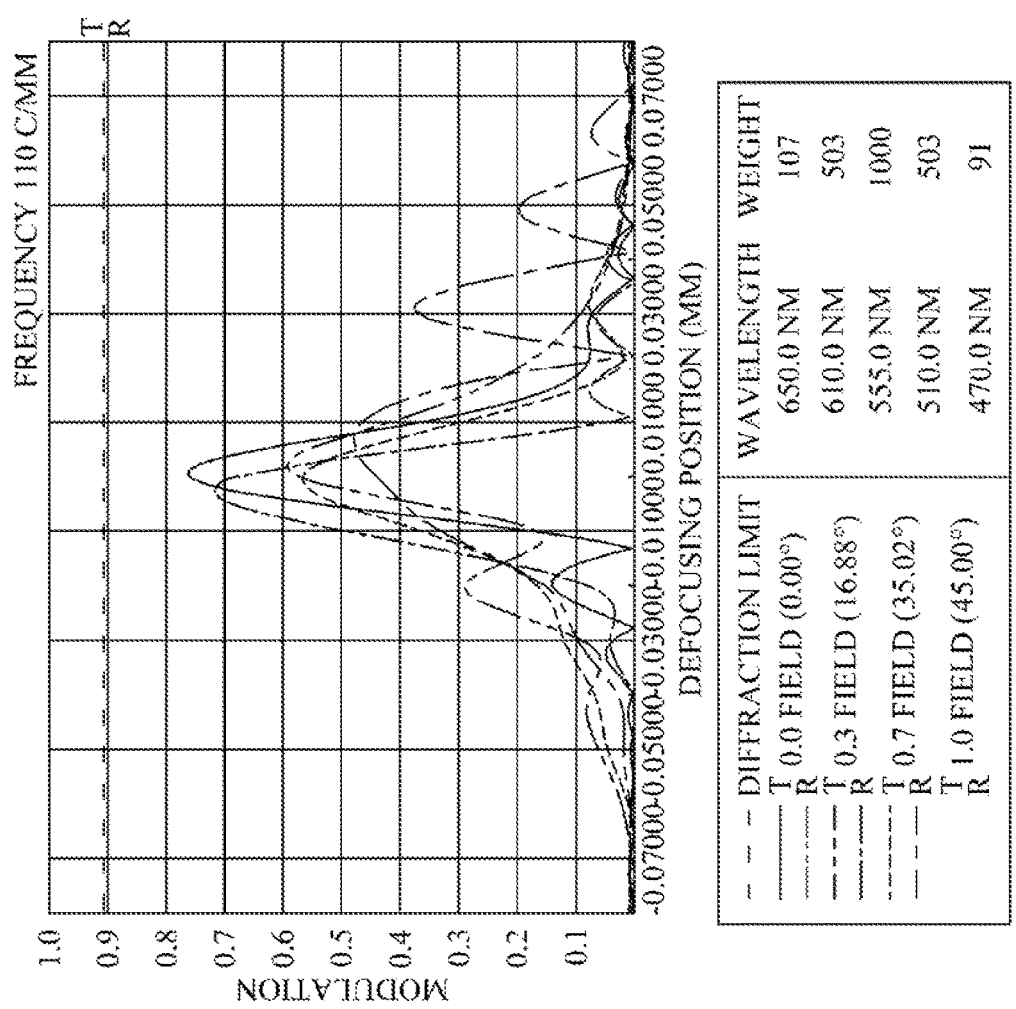
FIG. 6D is a diagram illustrating the through focus MTF values for the visible light spectrum at central field of view, 0.3 field of view and 0.7 field of view according to the sixth embodiment of the present disclosure.
Figure 6E:
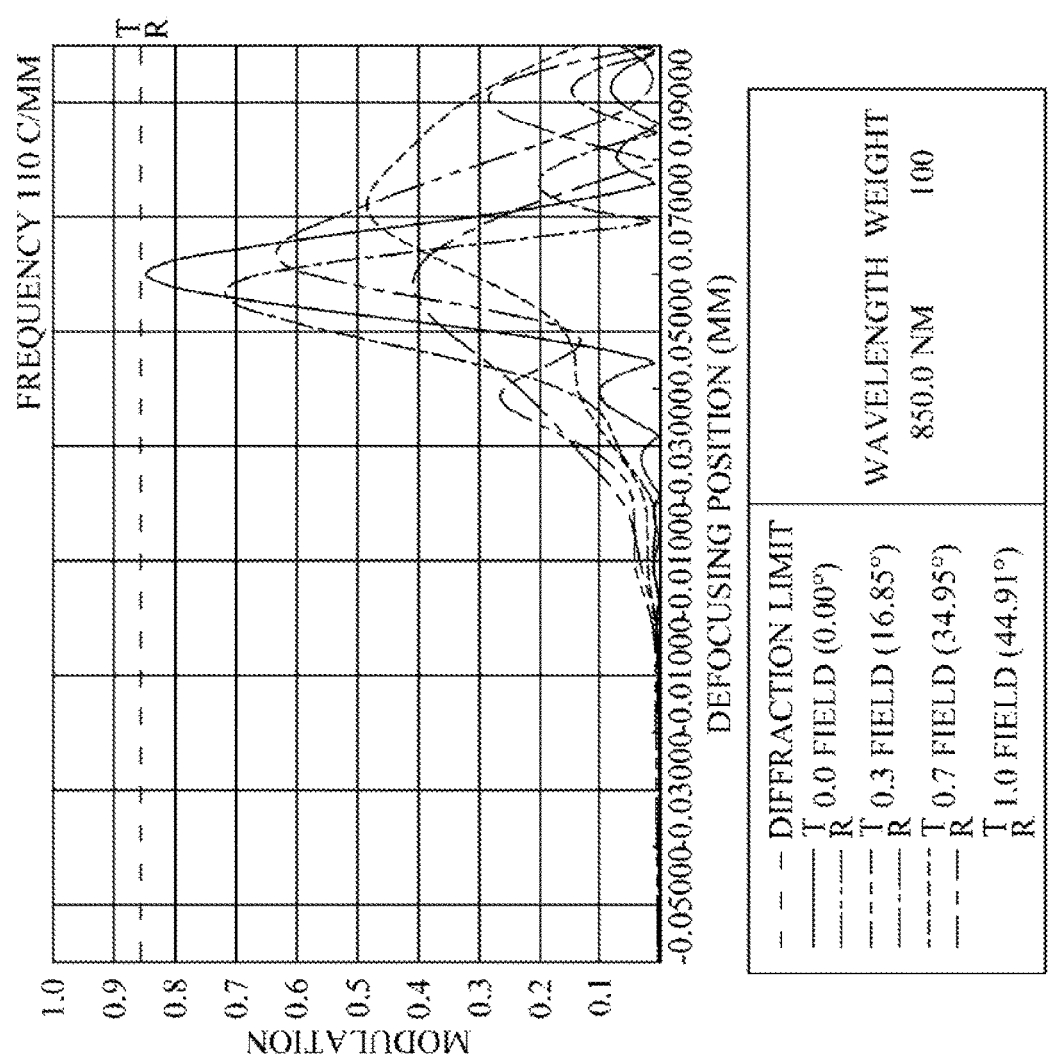
FIG. 6E is a diagram illustrating the through focus MTF values for the infrared light spectrum at central field of view, 0.3 field of view and 0.7 field of view according to the sixth embodiment of the present disclosure.

Please refer to FIG. 6A and FIG. 6B, wherein FIG. 6A is a schematic view of the optical image capturing system according to the sixth embodiment of the present invention and FIG. 6B shows the longitudinal spherical aberration curves, astigmatic field curves, and optical distortion curve of the optical image capturing system in the order from left to right according to the sixth embodiment of the present invention. FIG. 6C is a characteristic diagram of modulation transfer of the visible light spectrum according to the sixth embodiment of the present disclosure. FIG. 6D is a diagram illustrating the through focus MTF values for the visible light spectrum at the central field of view, 0.3 field of view and 0.7 field of view according to the first embodiment of the present disclosure. FIG. 6E is a diagram illustrating the through focus MTF values for the infrared light spectrum at the central field of view, 0.3 field of view and 0.7 field of view according to the sixth embodiment of the present disclosure.

As shown in FIG. 6A, in the order from an object side to an image side, the optical image capturing system includes a first lens 610, a second lens 620, a third lens 630, an aperture 600, a fourth lens 640, a fifth lens 650, a sixth lens 660, a seventh lens 670, an eighth lens 680, an infrared filter 690, a first image plane 692, a second image plane and an image sensing device 694.

The first lens 610 has negative refractive power and is made of plastic. The object side 612 of the first lens 610 is a convex surface and the image side 614 of the first lens 610 is a concave surface. Both the object side 612 and the image side 614 of the first lens 610 are aspheric.

The second lens 620 has positive refractive power and is made of plastic. The object side 622 of the second lens 620 is a concave surface and the image side 624 of the second lens 620 is a convex surface. Both the object side 622 and the image side 624 of the second lens 620 are aspheric.

The third lens 630 has positive refractive power and is made of plastic. The object side 632 of the third lens 630 is a convex surface and the image side 634 of the third lens 630 is a convex surface. Both the object side 632 and the image side 634 of the third lens 630 are aspheric.

The fourth lens 640 has negative refractive power and is made of plastic. The object side 642 of the fourth lens 640 is a convex surface and the image side 644 of the fourth lens 640 is a concave surface. Both the object side 642 and the image side 644 of the fourth lens 640 are aspheric. The object side 642 of the fourth lens 640 has one inflection point.

The fifth lens 650 has positive refractive power and is made of plastic. The object side 652 of the fifth lens 650 is a convex surface and the image side 654 of the fifth lens 650 is a convex surface. Both the object side 652 and the image side 654 of the fifth lens 650 are aspheric.

The sixth lens 660 has negative refractive power and is made of plastic. The object side 662 of the sixth lens is a concave surface and the image side 664 of the sixth lens is a concave surface. The image side 664 of the sixth lens has one inflection point. Hereby, the incident angle on the sixth lens 660 at each field of view may be effectively adjusted so as to improve the aberration.

The seventh lens 670 has positive refractive power and is made of plastic. The object side 672 of the seventh lens is a convex surface and the image side 674 of the seventh lens is a concave surface. Both the object side 672 and the image side 674 of the seventh lens are aspheric. Hereby, this configuration is beneficial to shorten the back focal length of the optical image capturing system so as to keep its miniaturization. Besides, the image side 674 of the seventh lens has two inflection points and the incident angle of the off-axis rays can be reduced effectively, thereby further correcting the off-axis aberration.

The eighth lens 680 has positive refractive power and is made of plastic. The object side 682 of the eighth lens is a convex surface and the image side 684 of the eighth lens is a concave surface. Both the object side 682 and the image side 684 of the eighth lens are aspheric. Hereby, the configuration is beneficial to shorten the back focal length of the optical image capturing system so as to keep its miniaturization. Besides, the object side 684 of the eighth lens has two inflection points and the incident angle of the off-axis rays can be reduced effectively, thereby further correcting the off-axis aberration.

The infrared filter 690 is made of glass and is disposed between the eighth lens 680 and the first image plane 692. The infrared filter 690 does not affect the focal length of the optical image capturing system.

The contents in Tables 11 and 12 below should be incorporated into the reference of the present embodiment.

TABLE 11

Lens Parameters for the Sixth Embodiment
f(focal length) = 7.3531 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+13 | | | | |
| 1 | First Lens | 24.9075617 | 3.214 | Plastic | 1.544 | 55.96 | −18.760 |
| 2 | | 6.925415043 | 18.126 | | | | |
| 3 | Second Lens | −15.28352775 | 10.000 | Plastic | 1.544 | 55.96 | 61.509 |
| 4 | | −12.92832646 | 1.097 | | | | |
| 5 | Third Lens | 15.06441645 | 6.171 | Plastic | 1.544 | 55.96 | 24.301 |
| 6 | | −94.85564658 | 0.373 | | | | |
| 7 | Aperture | 1E+18 | 3.967 | | | | |
| 8 | Fourth Lens | 13.2312653 | 1.426 | Plastic | 1.661 | 20.40 | −21.175 |
| 9 | | 6.536072626 | 1.261 | | | | |
| 10 | Fifth Lens | 11.72773733 | 7.050 | Plastic | 1.544 | 55.96 | 13.337 |
| 11 | | −15.11697129 | 0.050 | | | | |
| 12 | Sixth Lens | −20.33731539 | 1.378 | Plastic | 1.661 | 20.40 | −19.467 |

TABLE 11-continued

Lens Parameters for the Sixth Embodiment
f(focal length) = 7.3531 mm; f/HEP = 1.2; HAF(half angle of view) = 45 deg

| Surface No | | Curvature Radius | Thickness (mm) | Material | Refractive Index | Coefficient of Dispersion | Focal Length |
|---|---|---|---|---|---|---|---|
| 13 | | 36.85459385 | 0.967 | | | | |
| 14 | Seventh Lens | 11.66567627 | 3.829 | Plastic | 1.544 | 55.96 | 36.881 |
| 15 | | 24.53000752 | 1.116 | | | | |
| 16 | Eighth Lens | 11.07671935 | 2.218 | Plastic | 1.544 | 55.96 | 57.262 |
| 17 | | 15.94484917 | 0.500 | | | | |
| 18 | Infrared Filter | 1E+18 | 0.200 | BK_7 | 1.517 | 64.2 | |
| 19 | | 1E+18 | 2.065 | | | | |
| 20 | First Image Plane | 1E+18 | −0.009 | | | | |

Reference Wavelength (d-line): 555 nm

TABLE 12

The Aspheric Coefficients of the Sixth Embodiment
Table 12: Aspheric Coefficients

| Surface No | 1 | 2 | 3 | 4 | 5 | 6 |
|---|---|---|---|---|---|---|
| k | −5.903833E+00 | −6.284402E−01 | −1.060348E−01 | −5.108237E−01 | −2.671403E−01 | 3.924666E+01 |
| A4 | 1.730627E−05 | −2.971559E−05 | −3.479391E−05 | 6.552243E−05 | 3.704974E−05 | −8.231106E−06 |
| A6 | −1.001672E−07 | −3.967353E−07 | 5.752757E−07 | −1.494390E−07 | −5.145991E−08 | −1.970678E−07 |
| A8 | 3.243862E−10 | −1.574672E−09 | −4.243890E−09 | 5.958865E−10 | −1.654385E−09 | 8.403642E−10 |
| A10 | −2.879641E−13 | −1.545706E−11 | 2.231149E−11 | 1.613342E−12 | 2.488785E−12 | 1.872257E−12 |
| A12 | 0.000000E+00 | 0.000000E+00 | 0.000000E+00 | 0.000000E+00 | 0.000000E+00 | 0.000000E+00 |

| Surface No | 8 | 9 | 10 | 11 | 12 | 13 |
|---|---|---|---|---|---|---|
| k | −4.409373E+00 | −5.023494E−01 | −7.476458E−01 | 4.020210E−02 | −2.098997E+01 | 1.606360E+01 |
| A4 | −1.719753E−04 | −7.265707E−04 | −2.044166E−04 | −2.052647E−04 | −8.231208E−05 | 9.706853E−05 |
| A6 | −1.126433E−06 | 2.790998E−06 | 1.251767E−06 | 1.087788E−06 | −2.301963E−07 | 4.684983E−06 |
| A8 | −2.638073E−08 | −6.607737E−08 | 1.124577E−08 | 4.670362E−08 | −6.810348E−09 | −3.103645E−08 |
| A10 | 4.432152E−10 | 4.919844E−10 | −2.167425E−10 | −6.646516E−10 | −3.517111E−10 | −5.300518E−10 |
| A12 | 0.000000E+00 | 0.000000E+00 | 0.000000E+00 | 0.000000E+00 | 0.000000E+00 | 0.000000E+00 |

| Surface No | 14 | 15 | 16 | 17 |
|---|---|---|---|---|
| k | −6.602454E+00 | −3.351592E+01 | 1.864447E−01 | −9.214718E+00 |
| A4 | −3.920000E−05 | −6.044105E−04 | −1.458535E−03 | −7.126849E−04 |
| A6 | 8.821735E−07 | 2.425457E−06 | 5.757181E−06 | −4.195083E−06 |
| A8 | 1.703334E−08 | −6.168510E−09 | 3.246285E−08 | 1.068011E−07 |
| A10 | −4.963404E−11 | 6.724603E−10 | −1.073703E−10 | −4.485247E−10 |
| A12 | 0.000000E+00 | 0.000000E+00 | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the conditional expressions can be obtained from the data in Table 11 and Table 12.

| Sixth Embodiment (Primary Reference Wavelength = 555 nm) | | | | | |
|---|---|---|---|---|---|
| MTFE0 | MTFE3 | MTFE7 | MTFQ0 | MTFQ3 | MTFQ7 |
| 0.89 | 0.82 | 0.78 | 0.76 | 0.78 | 0.77 |
| ETP1 | ETP2 | ETP3 | ETP4 | ETP5 | ETP6 |
| 3.715 | 9.953 | 5.803 | 1.779 | 6.334 | 1.738 |
| ETP7 | ETP8 | ETL | EBL | EIN | EIR |
| 3.583 | 2.118 | 64.813 | 2.547 | 62.266 | 0.291 |
| PIR | EIN/ETL | SETP/EIN | EIR/PIR | BL | EBL/BL |
| 0.500 | 0.961 | 0.562 | 0.581 | 2.7568 | 0.9239 |
| ETP1/TP1 | ETP2/TP2 | ETP3/TP3 | ETP4/TP4 | ETP5/TP5 | ETP6/TP6 |
| 1.156 | 0.995 | 0.940 | 1.248 | 0.898 | 1.261 |
| ETP7/TP7 | ETP8/TP8 | ED78 | | ED78/IN78 | |
| 0.936 | 0.955 | 1.306 | | 1.170 | |
| SETP | STP | SETP/STP | SED | SIN | SED/SIN |
| 35.022 | 35.286 | 0.993 | 27.244 | 26.957 | 1.011 |
| ED12 | ED23 | ED34 | ED45 | ED56 | ED67 |
| 17.126 | 1.774 | 4.714 | 0.969 | 0.164 | 1.191 |
| ED12/IN12 | ED23/ IN23 | ED34/IN34 | ED45/ IN45 | ED56/IN56 | ED67/ IN67 |
| 0.945 | 1.617 | 1.086 | 0.769 | 3.279 | 1.231 |
| |f/f1| | |f/f2| | |f/f3| | |f/f4| | |f/f5| | |f/f6| |

-continued

Sixth Embodiment (Primary Reference Wavelength = 555 nm)

| 0.3920 | 0.1195 | 0.3026 | 0.3473 | 0.5513 | 0.3777 |
|---|---|---|---|---|---|
| \|f/f7\| | \|f/f8\| | \|f1/f2\| | \|f2/f3\| | \|f6/f7\| | \|f7/f8\| |
| 0.1994 | 0.1284 | 0.3050 | 2.5311 | 0.5278 | 0.6441 |
| IN12/f | IN78/f | (TP1 + IN12)/TP2 | | (TP8 + IN78)/TP7 | |
| 2.4651 | 0.1518 | 2.1340 | | 0.8709 | |
| HOS | InTL | HOS/HOI | InS/HOS | ODT % | TDT % |
| 65.0000 | 62.2432 | 8.6667 | 0.4003 | 2.0037 | 0.6237 |
| HVT11 | HVT12 | HVT21 | HVT22 | HVT31 | HVT32 |
| 0.0000 | 0.0000 | 0.0000 | 0.0000 | 0.0000 | 0.0000 |
| HVT41 | HVT42 | HVT51 | HVT52 | HVT61 | HVT62 |
| 0.0000 | 0.0000 | 0.0000 | 0.0000 | 0.0000 | 0.0000 |
| HVT71 | HVT72 | HVT81 | HVT82 | HVT82/HOI | HVT82/HOS |
| 0.0000 | 3.7355 | 4.4583 | 4.0712 | 0.5428 | 0.0626 |
| VSFS0 | VSFS3 | VSFS7 | VTFS0 | VTFS3 | VTFS7 |
| 0.000 mm | 0.000 mm | 0.010 mm | 0.000 mm | 0.000 mm | 0.000 mm |
| VSMTF0 | VSMTF3 | VSMTF7 | VTMTF0 | VTMTF3 | VTMTF7 |
| 0.760 | 0.677 | 0.465 | 0.760 | 0.571 | 0.566 |
| ISFS0 | ISFS3 | ISFS7 | ITFS0 | ITFS3 | ITFS7 |
| 0.060 mm | 0.060 mm | 0.060 mm | 0.060 mm | 0.060 mm | 0.070 mm |
| ISMTF0 | ISMTF3 | ISMTF7 | ITMTF0 | ITMTF3 | ITMTF7 |
| 0.848 | 0.660 | 0.407 | 0.848 | 0.580 | 0.478 |
| FS | | AIFS | | AVFS | AFS |
| 0.060 mm | | 0.062 mm | | 0.002 mm | 0.060 mm |

The following values for the conditional expressions can be obtained from the data in Table 11 and Table 12:

Values Related to Inflection Point of Sixth Embodiment
(Primary Reference Wavelength = 555 nm)

| HIF411 | 4.1340 | HIF411/HOI | 0.5512 | SGI411 | 0.5420 | \|SGI411\|/(\|SGI411\| + TP4) | 0.2755 |
|---|---|---|---|---|---|---|---|
| HIF621 | 7.1316 | HIF621/HOI | 0.9509 | SGI621 | 1.3414 | \|SGI621\|/(\|SGI621\| + TP6) | 0.4933 |
| HIF721 | 2.0724 | HIF721/HOI | 0.2763 | SGI721 | 0.0720 | \|SGI721\|/(\|SGI721\| + TP7) | 0.0185 |
| HIF722 | 6.5145 | HIF722/HOI | 0.8686 | SGI722 | −0.2160 | \|SGI722\|/(\|SGI722\| + TP7) | 0.0534 |
| HIF811 | 2.4547 | HIF811/HOI | 0.3273 | SGI811 | 0.2244 | \|SGI811\|/(\|SGI811\| + TP8) | 0.0919 |
| HIF812 | 7.2133 | HIF812/HOI | 0.9618 | SGI812 | −0.1855 | \|SGI812\|/(\|SGI812\| + TP8) | 0.0771 |
| HIF821 | 2.3299 | HIF821/HOI | 0.3107 | SGI821 | 0.1418 | \|SGI821\|/(\|SGI821\| + TP8) | 0.0601 |

Although the present invention is disclosed by the aforementioned embodiments, those embodiments do not serve to limit the scope of the present invention. A person skilled in the art can perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
   a first lens with negative refractive power;
   a second lens with positive refractive power;
   a third lens with positive refractive power;
   a fourth lens with negative refractive power;
   a fifth lens with positive refractive power;
   a sixth lens with positive refractive power;
   a seventh lens with positive or negative refractive power;
   an eighth lens with positive or negative refractive power;
   a first image plane, which is an image plane specifically for visible light and perpendicular to an optical axis, and a through focus modulation transfer rate (MTF) at central field of view of the first image plane has a maximum value at a first spatial frequency; and
   a second image plane, which is an image plane specifically for infrared light and perpendicular to the optical axis, and a through focus modulation transfer rate (MTF) at central field of view of the second image plane has a maximum value at the first spatial frequency;
   wherein focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a distance on the optical axis from an object side of the first lens to the first image plane is denoted as HOS, a distance on the optical axis from the object side of the first lens to an image side of the eighth lens is denoted as InTL, a half maximum angle of view of the optical image capturing system is denoted as HAF, the optical image capturing system has a maximum image height HOI perpendicular to the optical axis on the first image plane, a distance on the optical axis between the first image plane and the second image plane is denoted as FS, a vertical height between the optical axis and an intersection point, where an incident ray at the maximum angle of view passing through most marginal entrance pupil intersects with surface of the lenses is denoted as EHD, and a vertical height of ½HEP from the optical axis is smaller than the EHD of any one of the eight lenses, thicknesses of the first lens to the eighth lens at height of ½ HEP and in parallel with the optical axis are denoted as ETP1, ETP2, ETP3, ETP4, ETP5, ETP6, ETP7 and ETP8 respectively, a sum of the ETP1 to the ETP8 described above is SETP, thicknesses of the first lens to the eighth lens on the optical axis are TP1, TP2, TP3, TP4, TP5, TP6, TP7 and TP8 respectively, a sum of the TP1 to the TP8 described above is STP, and conditions as follows are satisfied: $1.0 \leq f/HEP \leq 10.0$, $0 \deg < HAF \leq 60 \deg$, $0.5 \leq SETP/STP < 1$ and $|FS| \leq 100$ μm.

2. The optical image capturing system of claim 1, wherein a wavelength of the infrared light ranges from 700 nm to 1300 nm, the first spatial frequency is denoted as SP1, and a condition as follows is satisfied: $SP1 \leq 440$ cycles/mm.

3. The optical image capturing system of claim 1, wherein modulation transfer rates (MTF values) for visible light at a spatial frequency of 55 cycles/mm at positions of the optical axis, 0.3 HOI and 0.7 HOI on the first image plane are denoted as MTFE0, MTFE3 and MTFE7 respectively, and conditions as follows are satisfied: $MTFE0 \geq 0.2$, $MTFE3 \geq 0.01$, and $MTFE7 \geq 0.01$.

4. The optical image capturing system of claim 1, wherein thicknesses of the first lens to the eighth lens at height of ½ HEP and in parallel with the optical axis are denoted as ETP1, ETP2, ETP3, ETP4, ETP5, ETP6, ETP7 and ETP8 respectively, a sum of the ETP1 to the ETP8 described above is SETP, and a condition as follows is satisfied: 0.3≤SETP/EIN<1.

5. The optical image capturing system of claim 1, wherein the optical image capturing system comprises a light filtering element, the light filtering element is located between the eighth lens and the first image plane, a distance in parallel with the optical axis from a coordinate point on the image side of the eighth lens at height of ½ HEP to the light filtering element is denoted as EIR, a distance in parallel with the optical axis from an intersection point where the image side of the eighth lens crosses the optical axis to the light filtering element is denoted as PIR, and a formula as follows is satisfied: 0.1≤EIR/PIR≤1.1.

6. The optical image capturing system of claim 1, wherein a horizontal distance paralleling to the optical axis between a coordinate point at ½ HEP height on the object side of the first lens to the first image plane is denoted as ETL, a horizontal distance parallel to the optical axis between a coordinate point at ½ HEP height on the object side of the first lens and a first coordinate point at ½ HEP height on the image side of the eighth lens is denoted as EN, and a condition as follows is satisfied: 0.2≤EIN/ETL<1.

7. The optical image capturing system of claim 1, wherein a horizontal distance in parallel with the optical axis from a first coordinate point at ½ HEP height on an image side of the eighth lens to the first image plane is denoted as EBL, a horizontal distance in parallel with the optical axis from an intersection point where the image side of the eighth lens crosses the optical axis to the first image plane is denoted as BL, and a formula as follows is satisfied: 0.1≤EBL/BL≤1.5.

8. The optical image capturing system of claim 1, further comprising an aperture, wherein a distance on the optical axis from the aperture to the first image plane is denoted as InS, and a condition as follows is satisfied: 0.2≤InS/HOS≤1.1.

9. An optical image capturing system, from an object side to an image side, comprising:
a first lens with negative refractive power;
a second lens with positive refractive power;
a third lens with positive refractive power;
a fourth lens with negative refractive power;
a fifth lens with positive refractive power;
a sixth lens with positive refractive power;
a seventh lens with positive or negative refractive power;
an eighth lens with positive or negative refractive power;
a first image plane, which is an image plane specifically for visible light and perpendicular to an optical axis, and a through focus modulation transfer rate (MTF) at central field of view of the first image plane has a maximum value at a first spatial frequency of 110 cycles/mm; and
a second image plane, which is an image plane specifically for infrared light and perpendicular to the optical axis, and a through focus modulation transfer rate (MTF) at central field of view of the second image plane has a maximum value at the first spatial frequency of 110 cycles/mm;
wherein, the optical image capturing system comprises eight lenses with refractive power, at least one lens among the first lens to the eighth lens is made of plastic, the optical image capturing system has a maximum image height HOI perpendicular to the optical axis on the first image plane, focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a distance on the optical axis from an object side of the first lens to the first image plane is denoted as HOS, a distance on the optical axis from the object side of the first lens to an image side of the eighth lens is denoted as InTL, a half maximum angle of view of the optical image capturing system is denoted as HAF, a distance on the optical axis between the first image plane and the second image plane is denoted as FS, a vertical height between the optical axis and an intersection point, where an incident ray at the maximum angle of view passing through most marginal entrance pupil intersects with surface of the lenses is denoted as EHD, and a vertical height of ½HEP from the optical axis is smaller than the EHD of any one of the eight lenses, a horizontal distance in parallel with the optical axis from a coordinate point at ½ HEP height on the object side of the first lens to the first image plane is denoted as ETL, a horizontal distance in parallel with the optical axis from a coordinate point at ½ HEP height on the object side of the first lens to a first coordinate point at ½ HEP height on the image side of the eighth lens is denoted as EIN, a horizontal distance in parallel with the optical axis between a second coordinate point at ½ HEP height on an image side of the seventh lens to a third coordinate point at ½ HEP height on an object side of the eighth lens is ED78, a distance on the optical axis between the seventh lens and the eighth lens is IN78, and conditions as follows are satisfied: 1.0≤f/HEP≤10.0, 0 deg<HAF≤60 deg, 0.2≤EIN/ETL<1, 0<ED78/IN78≤50, and |FS|≤100 μm.

10. The optical image capturing system of claim 9, wherein modulation transfer rates (MTF values) for visible light at the first spatial frequency of 110 cycles/mm at positions of the optical axis, 0.3 HOT and 0.7 HOI on the first image plane are denoted as MTFQ0, MTFQ3 and MTFQ7 respectively, and conditions as follows are satisfied: MTFQ0≥0.2, MTFQ3≥0.01 and MTFQ7≥0.01.

11. The optical image capturing system of claim 9, wherein an air gap is disposed between each pair of neighboring lenses.

12. The optical image capturing system of claim 9, wherein at least one surface of at least one lens among the first lens to the eighth lens has at least one inflection point.

13. The optical image capturing system of claim 9, wherein a thickness of the eighth lens at ½ HEP height and in parallel with the optical axis is ETP8, a thickness of the eighth lens on the optical axis is TP8, and a condition as follows is satisfied: 0<ETP8/TP8≤5.

14. The optical image capturing system of claim 9, wherein a thickness of the seventh lens at ½ HEP height and in parallel with the optical axis is ETP7, a thickness on the optical axis of the seventh lens is TP7, and a condition as follows is satisfied: 0<ETP7/TP7≤5.

15. The optical image capturing system of claim 9, wherein the optical image capturing system has the maximum image height HOI perpendicular to the optical axis on the first image plane, and a condition as follows is satisfied: HOS/HOI≥1.2.

16. The optical image capturing system of claim 9, wherein at least one lens among the first lens, the second lens, the third lens, the fourth lens, the fifth lens, the sixth lens, the seventh lens and the eighth lens is a light filter element which filters light with wavelength less than 500 nm.

17. An optical image capturing system, from an object side to an image side, comprising:
- a first lens with negative refractive power;
- a second lens with positive refractive power;
- a third lens with positive refractive power;
- a fourth lens with negative refractive power;
- a fifth lens with positive refractive power;
- a sixth lens with positive refractive power;
- a seventh lens with positive or negative refractive power;
- an eighth lens with positive or negative refractive power;
- a first average image plane, which is an image plane specifically for visible light and perpendicular to an optical axis, and the first average image plane is disposed at an average position of defocusing positions, where through focus modulation transfer rates (values of MTF) of visible light at central field of view, 0.3 field of view, and 0.7 field of view of the optical image capturing system are at respective maximum value at a first spatial frequency of 110 cycles/mm; and
- a second average image plane, which is an image plane specifically for infrared light and perpendicular to the optical axis, and the second average image plane is disposed at an average position of defocusing positions, where through focus modulation transfer rates of infrared light (values of MTF) at central field of view, 0.3 field of view, and 0.7 field of view of the optical image capturing system are at their respective maximum value at the first spatial frequency of 110 cycles/mm;

wherein, the optical image capturing system has eight lenses with refractive power, at least one lens among the first lens to the eighth lens is made of plastic, the optical image capturing system has a maximum image height HOI perpendicular to the optical axis on the first average image plane, focal lengths of the eight lenses are denoted as f1, f2, f3, f4, f5, f6, f7 and f8 respectively, a focal length of the optical image capturing system is denoted as f, an entrance pupil diameter of the optical image capturing system is denoted as HEP, a half maximum angle of view of the optical image capturing system is denoted as HAF, a distance on the optical axis from an object side of the first lens to the first average image plane is denoted as HOS, a distance on the optical axis from the object side of the first lens to an image side of the eighth lens is denoted as InTL, a distance on the optical axis between the first average image plane and the second average image plane is denoted as AFS, a vertical height between the optical axis and an intersection point, where an incident ray at the maximum angle of view passing through most marginal entrance pupil intersects with surface of the lenses is denoted as EHD, and a vertical height of ½HEP from the optical axis is smaller than the EHD of any one of the eight lenses, a horizontal distance in parallel with the optical axis from a coordinate point at ½ HEP height on the object side of the first lens to the first average image plane is denoted as ETL, a horizontal distance in parallel with the optical axis from a coordinate point at ½ HEP height on the object side of the first lens to a second coordinate point at ½ HEP height on the image side of the eighth lens is denoted as EIN, a horizontal distance in parallel with the optical axis between a second coordinate point at ½ HEP height on an image side of the seventh lens to a third coordinate point at ½ HEP height on an object side of the eighth lens is ED78, a distance on the optical axis between the seventh lens and the eighth lens is IN78, and conditions as follows are satisfied: $1 \leq f/HEP \leq 10$, $0 \deg < HAF \leq 60 \deg$, $0.2 \leq EIN/ETL < 1$, $0 < ED78/IN78 \leq 50$, and $|AFS| \leq 100$ μm.

18. The optical image capturing system of claim 17, wherein modulation transfer rates (MTF values) for visible light at a second spatial frequency of 55 cycles/mm at positions of the optical axis, 0.3 HOI and 0.7 HOI on the first average image plane are MTFE0, MTFE3 and MTFE7 respectively, and conditions as follows are satisfied: $MTFE0 \geq 0.2$, $MTFE3 \geq 0.01$, and $MTFE7 \geq 0.01$.

19. The optical image capturing system of claim 17, wherein the optical image capturing system has the maximum image height HOI on the first average image plane and perpendicular to the optical axis, and a condition as follows is satisfied: $0.5 \leq HOS/HOI \leq 30$.

20. The optical image capturing system of claim 17, further comprising an aperture and an image sensing element, wherein the image sensing element is disposed after the first average image plane and at least equipped with 100 thousand pixels, a distance on the optical axis from the aperture to the first average image plane is denoted as InS, and a formula as follows is satisfied: $0.2 \leq InS/HOS \leq 1.1$.

* * * * *